US012754896B2

(12) United States Patent
Reese et al.

(10) Patent No.: US 12,754,896 B2
(45) Date of Patent: Oct. 6, 2026

(54) MACHINE-LEARNING BASED AUTOMATED DOCUMENT INTEGRATION INTO GENEALOGICAL TREES

(71) Applicant: Ancestry.com Operations Inc., Lehi, UT (US)

(72) Inventors: Jack Reese, Lindon, UT (US); Luca Lugini, San Mateo, CA (US); Yingrui Yang, San Mateo, CA (US); Simon Chu, Mounatin View, CA (US); Gopalkrishna Balkrishna Veni, Lehi, UT (US)

(73) Assignee: Ancestry.com Operations Inc., Draper, UT (US)

( * ) Notice: Subject to any disclaimer, the term of this patent is extended or adjusted under 35 U.S.C. 154(b) by 0 days.

(21) Appl. No.: 18/948,459

(22) Filed: Nov. 14, 2024

(65) Prior Publication Data

US 2025/0147943 A1 May 8, 2025

Related U.S. Application Data

(63) Continuation of application No. 18/121,997, filed on Mar. 15, 2023, now Pat. No. 12,248,451.

(60) Provisional application No. 63/319,847, filed on Mar. 15, 2022.

(51) Int. Cl.

| | |
|---|---|
| ***G06F 16/22*** | (2019.01) |
| ***G06F 40/295*** | (2020.01) |
| ***G06V 30/32*** | (2022.01) |
| ***G06V 30/413*** | (2022.01) |
| ***G06V 30/416*** | (2022.01) |

(52) U.S. Cl.
CPC ........ *G06F 16/2246* (2019.01); *G06F 40/295* (2020.01); *G06V 30/333* (2022.01); *G06V 30/413* (2022.01); *G06V 30/416* (2022.01)

(58) Field of Classification Search
CPC .......................... G06F 16/2246; G06V 30/333
See application file for complete search history.

(56) References Cited

U.S. PATENT DOCUMENTS

| | | | |
|---|---|---|---|
| 11,226,720 | B1 | 1/2022 | Vandivere et al. |
| 2006/0221357 | A1 | 10/2006 | Uzuxses |
| 2011/0096983 | A1 | 4/2011 | Jensen |
| 2013/0080866 | A1 | 3/2013 | Ogilvie et al. |
| 2013/0265334 | A1 | 10/2013 | Brookhart |

(Continued)

OTHER PUBLICATIONS

Bertrand Coüasnon et al. "Access by Content to Handwritten Archive Documents: Generic Document Recognition Method and Platform for Annotations." International Journal of Document Analysis and Recognition (IJDAR), vol. 9, Nos. 2-4, Apr. 2007, DD. 223-242.

(Continued)

*Primary Examiner* — Courtney Harmon
(74) *Attorney, Agent, or Firm* — Keller Preece PLLC

(57) ABSTRACT

Systems and methods for importing documents are described. An input image is received and preprocessed. OCR and/or page segmentation and chapter detection are performed. Special-case processing is performed for lists, tables, free text, and other categories. Anaphora analysis, stemming, lemmatization, and relationship detection are performed. A genealogical tree is generated, augmented, or merged based on the extracted entities and relationships.

20 Claims, 37 Drawing Sheets

(56) References Cited

U.S. PATENT DOCUMENTS

| | | | | |
|---|---|---|---|---|
| 2015/0039636 | A1* | 2/2015 | Sederberg | G06F 40/14 707/755 |
| 2017/0329924 | A1* | 11/2017 | Macpherson | G16B 50/30 |
| 2019/0347511 | A1 | 11/2019 | Jiang et al. | |
| 2020/0320289 | A1 | 10/2020 | Su | |
| 2021/0019569 | A1* | 1/2021 | Anderson | G06N 3/045 |
| 2021/0232632 | A1 | 7/2021 | Howard | |
| 2021/0390704 | A1* | 12/2021 | Fujimoto | G06V 30/414 |
| 2021/0406533 | A1* | 12/2021 | Arroyo | G06F 40/18 |
| 2022/0044761 | A1* | 2/2022 | O'Connell | G16B 20/20 |

OTHER PUBLICATIONS

PCT International Search Report and Written Opinion, PCT Application No. PCT/IB2023/052488, Aug. 7, 2023, 11 pages.

U.S. Appl. No. 18/121,997, Mar. 21, 2024, Office Action.

U.S. Appl. No. 18/121,997, Aug. 16, 2024, Notice of Allowance.

* cited by examiner

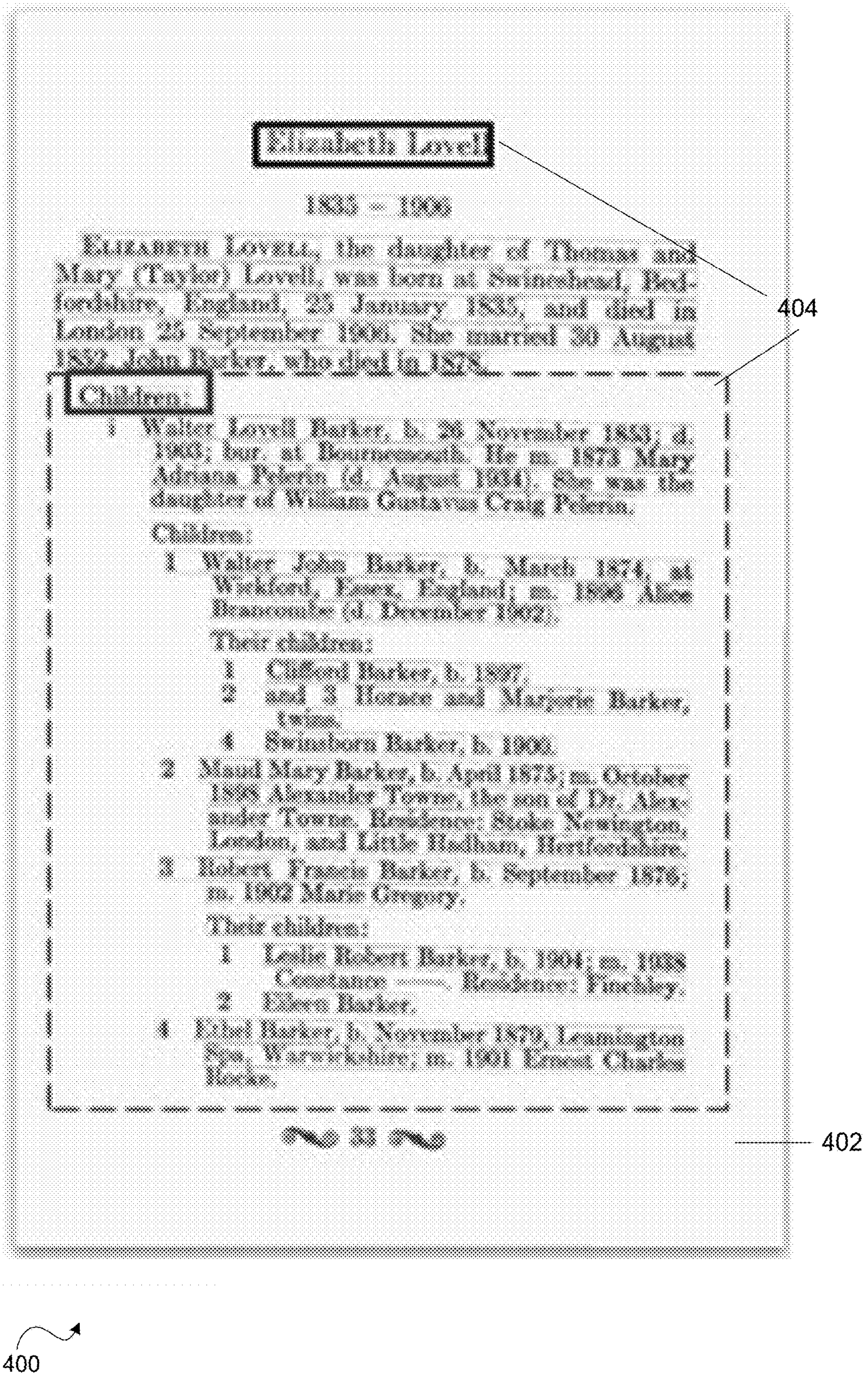

Elizabeth Lovell

1835 – 1906

ELIZABETH LOVELL, the daughter of Thomas and Mary (Taylor) Lovell, was born at Swineshead, Bedfordshire, England, 25 January 1835, and died in London 25 September 1906. She married 30 August 1852 John Barker, who died in 1878.

Children:

1 Walter Lovell Barker, b. 28 November 1853; d. 1903; bur. at Bournemouth. He m. 1873 Mary Adriana Pelerin (d. August 1934). She was the daughter of William Gustavus Craig Pelerin.

Children:

1 Walter John Barker, b. March 1874, at Wickford, Essex, England; m. 1896 Alice Branscombe (d. December 1902).

Their children:

1 Clifford Barker, b. 1897.
2 and 3 Horace and Marjorie Barker, twins.
4 Swinsborn Barker, b. 1900.

2 Maud Mary Barker, b. April 1875; m. October 1898 Alexander Towne, the son of Dr. Alexander Towne. Residence: Stoke Newington, London, and Little Hadham, Hertfordshire.

3 Robert Francis Barker, b. September 1876; m. 1902 Marie Gregory.

Their children:

1 Leslie Robert Barker, b. 1904; m. 1928 Constance ——. Residence: Finchley.
2 Eileen Barker.

4 Ethel Barker, b. November 1879, Leamington Spa, Warwickshire; m. 1901 Ernest Charles Hocke.

~ 33 ~

FIG. 4A

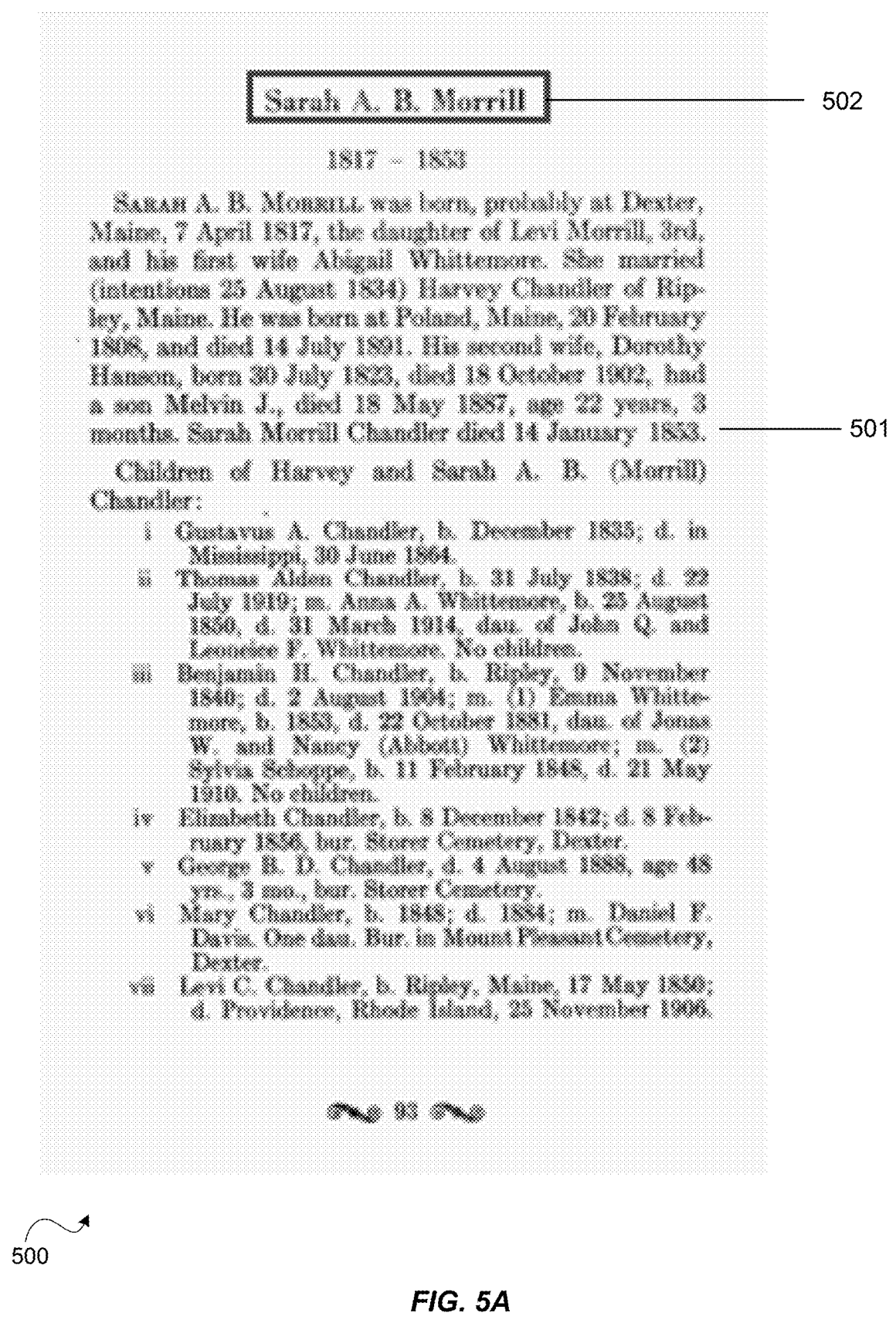

Sarah A. B. Morrill 502

1817 – 1853

SARAH A. B. MORRILL was born, probably at Dexter, Maine, 7 April 1817, the daughter of Levi Morrill, 3rd, and his first wife Abigail Whittemore. She married (intentions 25 August 1834) Harvey Chandler of Ripley, Maine. He was born at Poland, Maine, 20 February 1808, and died 14 July 1891. His second wife, Dorothy Hanson, born 30 July 1823, died 18 October 1902, had a son Melvin J., died 18 May 1887, age 22 years, 3 months. Sarah Morrill Chandler died 14 January 1853. 501

Children of Harvey and Sarah A. B. (Morrill) Chandler:

- i Gustavus A. Chandler, b. December 1835; d. in Mississippi, 30 June 1864.
- ii Thomas Alden Chandler, b. 31 July 1838; d. 22 July 1919; m. Anna A. Whittemore, b. 25 August 1850, d. 31 March 1914, dau. of John Q. and Louoice F. Whittemore. No children.
- iii Benjamin H. Chandler, b. Ripley, 9 November 1840; d. 2 August 1904; m. (1) Emma Whittemore, b. 1853, d. 22 October 1881, dau. of Jonas W. and Nancy (Abbott) Whittemore; m. (2) Sylvia Schoppe, b. 11 February 1848, d. 21 May 1910. No children.
- iv Elizabeth Chandler, b. 8 December 1842; d. 8 February 1856, bur. Storer Cemetery, Dexter.
- v George B. D. Chandler, d. 4 August 1888, age 48 yrs., 3 mo., bur. Storer Cemetery.
- vi Mary Chandler, b. 1848; d. 1884; m. Daniel F. Davis. One dau. Bur. in Mount Pleasant Cemetery, Dexter.
- vii Levi C. Chandler, b. Ripley, Maine, 17 May 1850; d. Providence, Rhode Island, 25 November 1906.

93

500

FIG. 5A

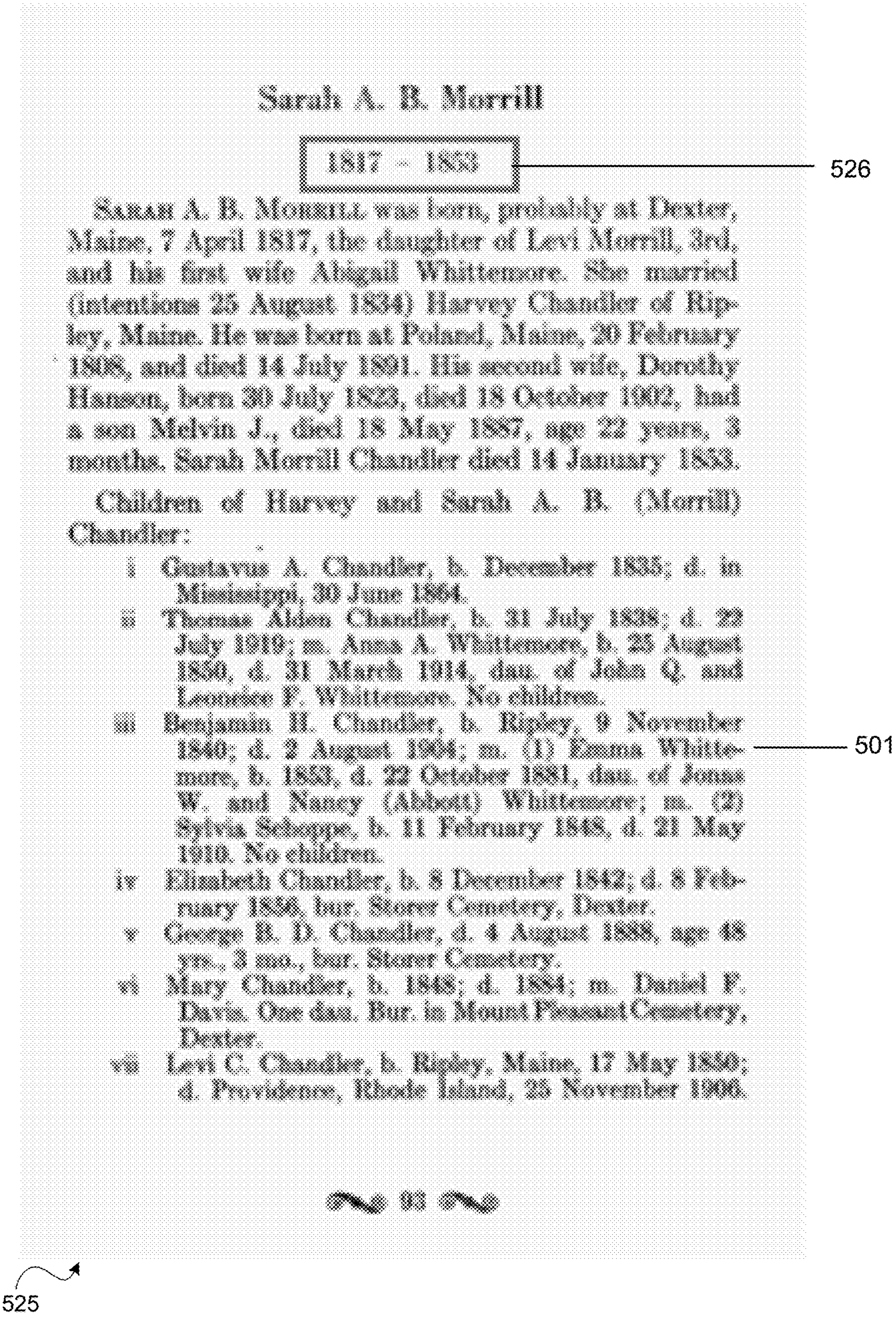

Sarah A. B. Morrill

1817 - 1853

SARAH A. B. MORRILL was born, probably at Dexter, Maine, 7 April 1817, the daughter of Levi Morrill, 3rd, and his first wife Abigail Whittemore. She married (intentions 25 August 1834) Harvey Chandler of Ripley, Maine. He was born at Poland, Maine, 20 February 1808, and died 14 July 1891. His second wife, Dorothy Hanson, born 30 July 1823, died 18 October 1902, had a son Melvin J., died 18 May 1887, age 22 years, 3 months. Sarah Morrill Chandler died 14 January 1853.

Children of Harvey and Sarah A. B. (Morrill) Chandler:

- i Gustavus A. Chandler, b. December 1835; d. in Mississippi, 30 June 1864.
- ii Thomas Alden Chandler, b. 31 July 1838; d. 22 July 1919; m. Anna A. Whittemore, b. 25 August 1850, d. 31 March 1914, dau. of John Q. and Leonice F. Whittemore. No children.
- iii Benjamin H. Chandler, b. Ripley, 9 November 1840; d. 2 August 1904; m. (1) Emma Whittemore, b. 1853, d. 22 October 1881, dau. of Jonas W. and Nancy (Abbott) Whittemore; m. (2) Sylvia Schoppe, b. 11 February 1848, d. 21 May 1910. No children.
- iv Elizabeth Chandler, b. 8 December 1842; d. 8 February 1856, bur. Storer Cemetery, Dexter.
- v George B. D. Chandler, d. 4 August 1888, age 48 yrs., 3 mo., bur. Storer Cemetery.
- vi Mary Chandler, b. 1848; d. 1884; m. Daniel F. Davis. One dau. Bur. in Mount Pleasant Cemetery, Dexter.
- vii Levi C. Chandler, b. Ripley, Maine, 17 May 1850; d. Providence, Rhode Island, 25 November 1906.

93

FIG. 5B

Sarah A. B. Morrill

1817 – 1853

Sarah A. B. Morrill was born, probably at Dexter, Maine, 7 April 1817, the daughter of Levi Morrill, 3rd, and his first wife Abigail Whittemore. She married (intentions 25 August 1834) Harvey Chandler of Ripley, Maine. He was born at Poland, Maine, 20 February 1808, and died 14 July 1891. His second wife, Dorothy Hanson, born 30 July 1823, died 18 October 1902, had a son Melvin J., died 18 May 1887, age 22 years, 3 months. Sarah Morrill Chandler died 14 January 1853.

552

Children of Harvey and Sarah A. B. (Morrill) Chandler:

i Gustavus A. Chandler, b. December 1835; d. in Mississippi, 30 June 1864.

ii Thomas Alden Chandler, b. 31 July 1838; d. 22 July 1919; m. Anna A. Whittemore, b. 25 August 1850, d. 31 March 1914, dau. of John Q. and Leonaise F. Whittemore. No children.

iii Benjamin H. Chandler, b. Ripley, 9 November 1840; d. 2 August 1904; m. (1) Emma Whittemore, b. 1853, d. 22 October 1881, dau. of Jonas W. and Nancy (Abbott) Whittemore; m. (2) Sylvia Schoppe, b. 11 February 1848, d. 21 May 1910. No children.

501 iv Elizabeth Chandler, b. 8 December 1842; d. 8 February 1856, bur. Storer Cemetery, Dexter.

v George B. D. Chandler, d. 4 August 1888, age 48 yrs., 3 mo., bur. Storer Cemetery.

vi Mary Chandler, b. 1848; d. 1884; m. Daniel F. Davis. One dau. Bur. in Mount Pleasant Cemetery, Dexter.

vii Levi C. Chandler, b. Ripley, Maine, 17 May 1850; d. Providence, Rhode Island, 25 November 1906.

~ 93 ~

550

FIG. 5C

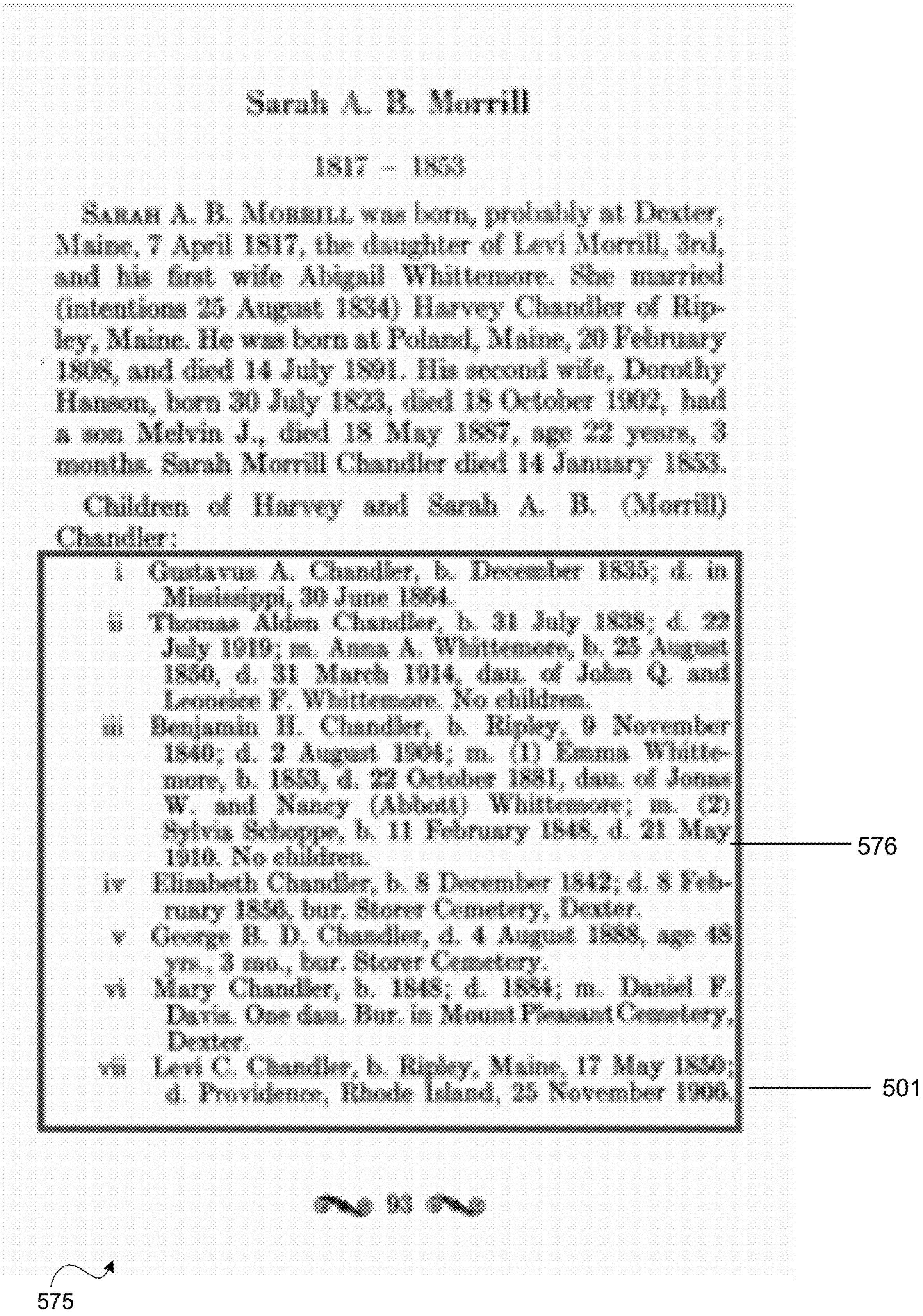

Sarah A. B. Morrill

1817 – 1853

SARAH A. B. MORRILL was born, probably at Dexter, Maine, 7 April 1817, the daughter of Levi Morrill, 3rd, and his first wife Abigail Whittemore. She married (intentions 25 August 1834) Harvey Chandler of Ripley, Maine. He was born at Poland, Maine, 20 February 1808, and died 14 July 1891. His second wife, Dorothy Hanson, born 30 July 1823, died 18 October 1902, had a son Melvin J., died 18 May 1887, age 22 years, 3 months. Sarah Morrill Chandler died 14 January 1853.

Children of Harvey and Sarah A. B. (Morrill) Chandler:

i Gustavus A. Chandler, b. December 1835; d. in Mississippi, 30 June 1864.
ii Thomas Alden Chandler, b. 31 July 1838; d. 22 July 1919; m. Anna A. Whittemore, b. 25 August 1850, d. 31 March 1914, dau. of John Q. and Leonice F. Whittemore. No children.
iii Benjamin H. Chandler, b. Ripley, 9 November 1840; d. 2 August 1904; m. (1) Emma Whittemore, b. 1853, d. 22 October 1881, dau. of Jonas W. and Nancy (Abbott) Whittemore; m. (2) Sylvia Schoppe, b. 11 February 1848, d. 21 May 1910. No children.
iv Elizabeth Chandler, b. 8 December 1842; d. 8 February 1856, bur. Storer Cemetery, Dexter.
v George B. D. Chandler, d. 4 August 1888, age 48 yrs., 3 mo., bur. Storer Cemetery.
vi Mary Chandler, b. 1848; d. 1884; m. Daniel F. Davis. One dau. Bur. in Mount Pleasant Cemetery, Dexter.
vii Levi C. Chandler, b. Ripley, Maine, 17 May 1850; d. Providence, Rhode Island, 25 November 1906.

~ 93 ~

FIG. 5D

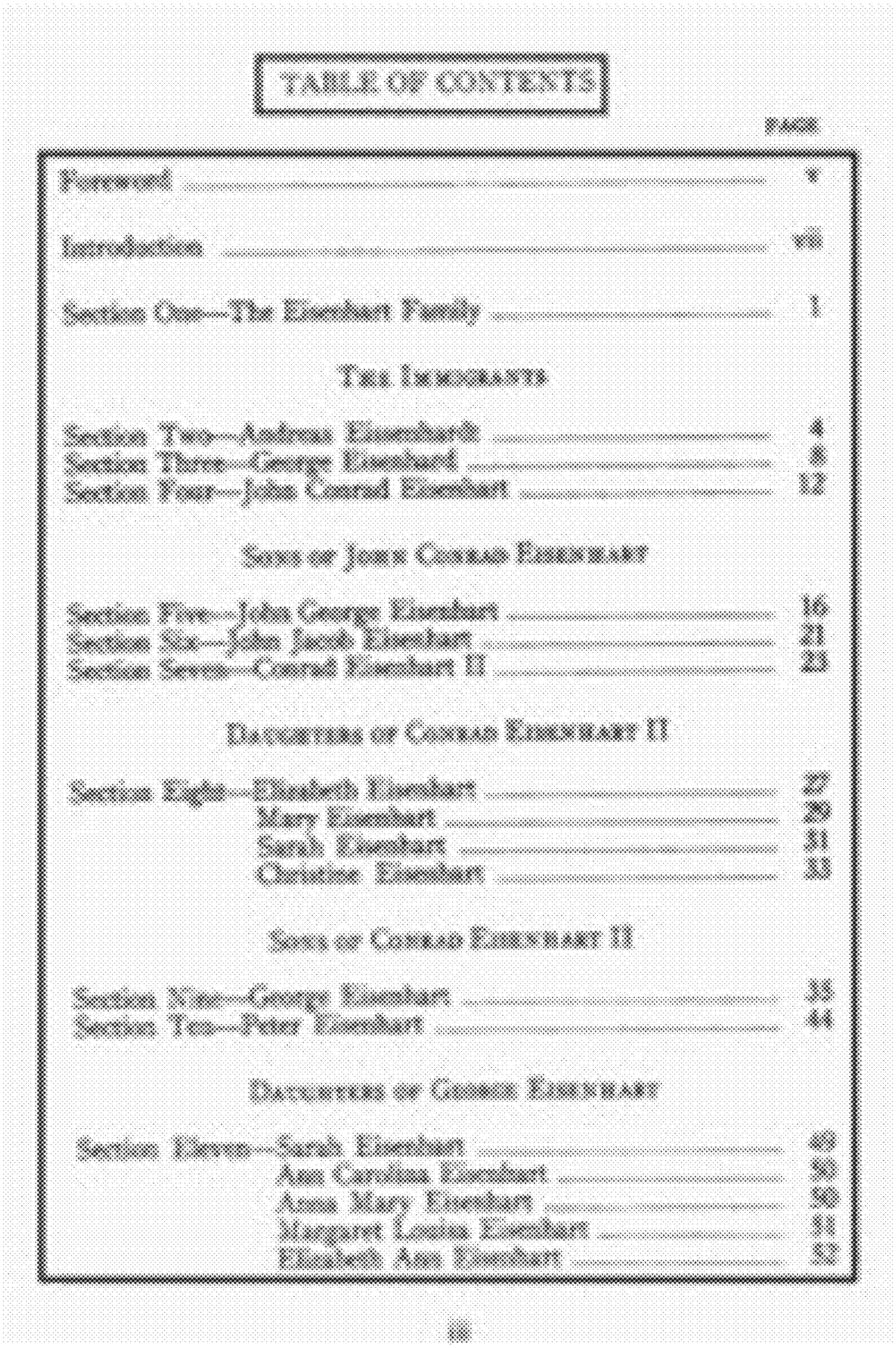

TABLE OF CONTENTS

PAGE

Foreword ... v

Introduction ... vii

Section One—The Eisenhart Family ... 1

The Immigrants

Section Two—Andreas Eisenhardt ... 4
Section Three—George Eisenhard ... 8
Section Four—John Conrad Eisenhart ... 12

Sons of John Conrad Eisenhart

Section Five—John George Eisenhart ... 16
Section Six—John Jacob Eisenhart ... 21
Section Seven—Conrad Eisenhart II ... 23

Daughters of Conrad Eisenhart II

Section Eight—Elizabeth Eisenhart ... 27
Mary Eisenhart ... 29
Sarah Eisenhart ... 31
Christine Eisenhart ... 33

Sons of Conrad Eisenhart II

Section Nine—George Eisenhart ... 35
Section Ten—Peter Eisenhart ... 44

Daughters of George Eisenhart

Section Eleven—Sarah Eisenhart ... 49
Ann Carolina Eisenhart ... 50
Anna Mary Eisenhart ... 50
Margaret Louisa Eisenhart ... 51
Elizabeth Ann Eisenhart ... 52 iii

600

FIG. 6A

THE STATE OF ALABAMA, ETOWAH COUNTY

THE STATE OF ALABAMA, ETOWAH COUNTY

610

615

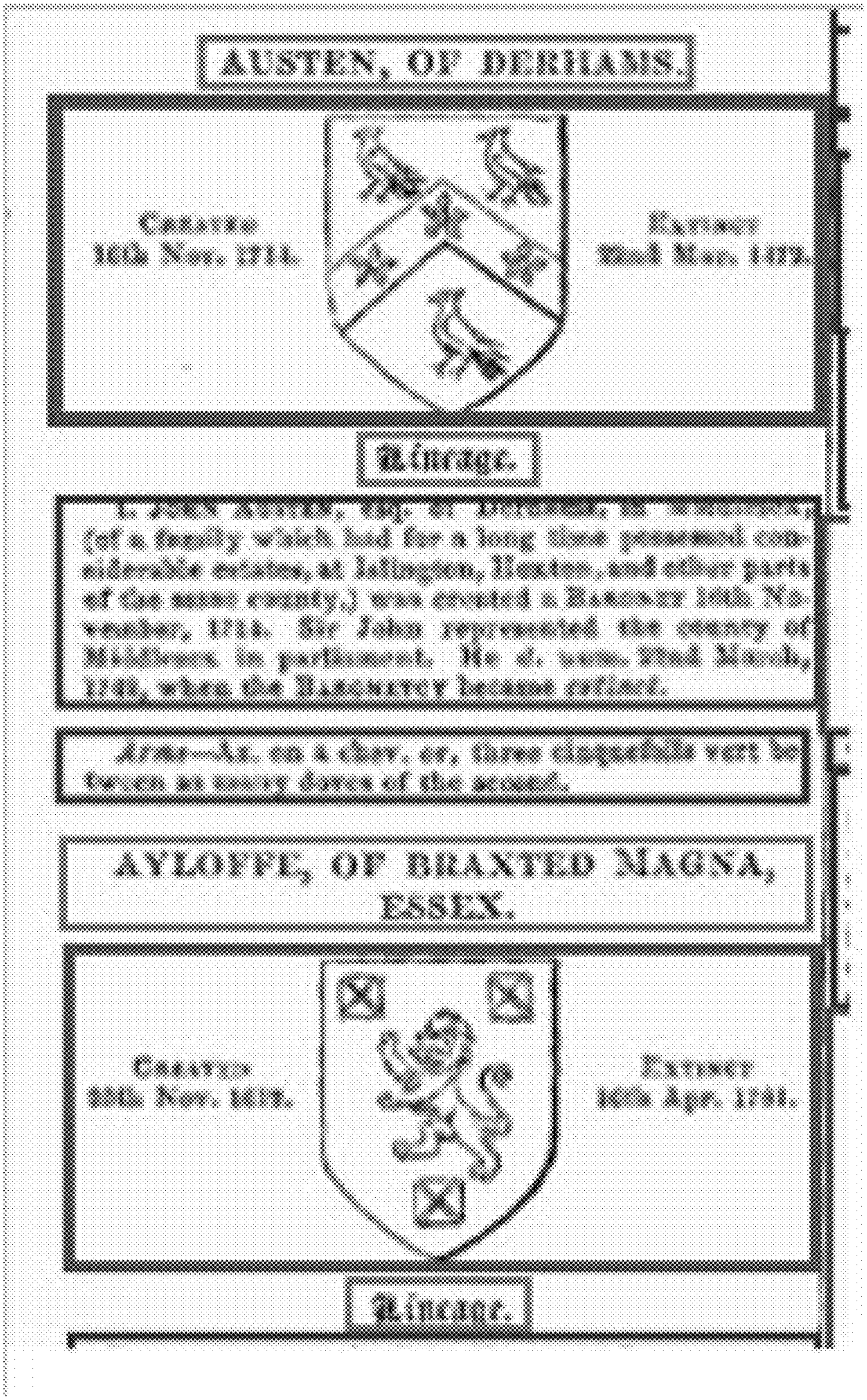

AUSTEN, OF DERHAMS.

Created 10th Nov. 1714. | Extinct 22nd Mar. [illegible]

Lineage.

[illegible] (of a family which had for a long time possessed considerable estates, at Islington, Hoxton, and other parts of the same county,) was created a Baronet 10th November, 1714. Sir John represented the county of Middlesex in parliament. He d. unm. 22nd March, [illegible], when the Baronetcy became extinct.

*Arms*—Ar. on a chev. or, three cinquefoils vert between as many doves of the second.

AYLOFFE, OF BRAXTED MAGNA, ESSEX.

Created [illegible] Nov. [illegible] | Extinct [illegible] Apr. [illegible]

Lineage.

620

FIG. 6E

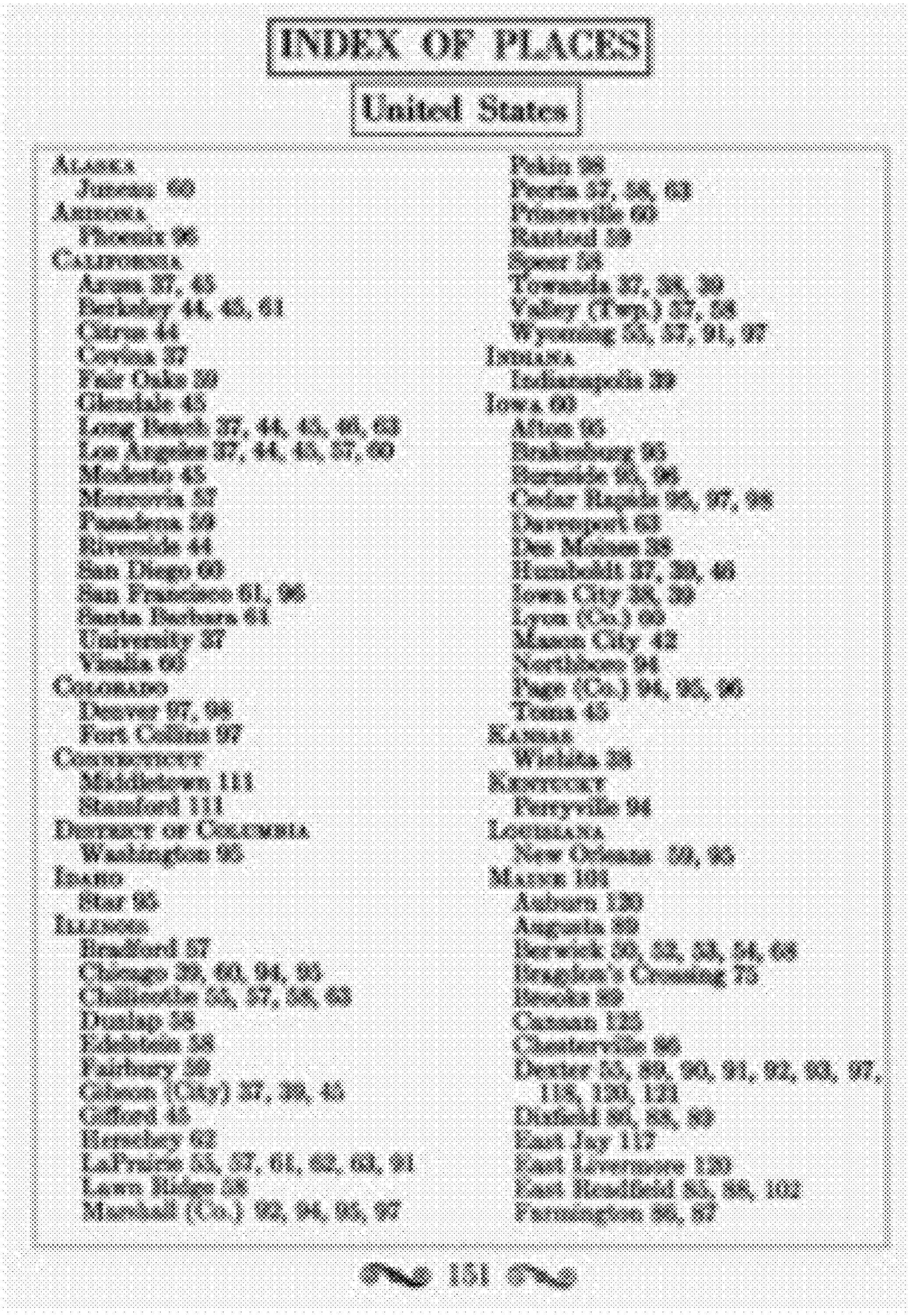

INDEX OF PLACES

United States

Alaska
Juneau 60
Arizona
Phoenix 96
California
Azusa 37, 43
Berkeley 44, 45, 61
Citrus 44
Covina 37
Fair Oaks 39
Glendale 45
Long Beach 37, 44, 45, 46, 63
Los Angeles 37, 44, 45, 57, 60
Modesto 45
Monrovia 37
Pasadena 39
Riverside 44
San Diego 60
San Francisco 61, 96
Santa Barbara 61
University 37
Visalia 60
Colorado
Denver 97, 98
Fort Collins 97
Connecticut
Middletown 111
Stamford 111
District of Columbia
Washington 95
Idaho
Star 95
Illinois
Bradford 57
Chicago 39, 60, 94, 95
Chillicothe 55, 57, 58, 63
Dunlap 58
Edelstein 58
Fairbury 59
Gibson (City) 37, 39, 45
Gifford 45
Hensley 63
LaPrairie 55, 57, 61, 62, 63, 91
Lawn Ridge 58
Marshall (Co.) 92, 94, 95, 97
Pekin 98
Peoria 57, 58, 63
Princeville 63
Rantoul 59
Speer 58
Towanda 37, 38, 39
Valley (Twp.) 57, 58
Wyoming 55, 57, 91, 97
Indiana
Indianapolis 39
Iowa 60
Afton 95
Brakenburg 95
Burnside 95, 96
Cedar Rapids 96, 97, 98
Davenport 63
Des Moines 39
Humboldt 37, 39, 45
Iowa City 38, 39
Lyon (Co.) 60
Mason City 42
Northboro 94
Page (Co.) 94, 95, 96
Toma 45
Kansas
Wichita 38
Kentucky
Perryville 94
Louisiana
New Orleans 59, 95
Maine 101
Auburn 130
Augusta 89
Berwick 50, 52, 53, 54, 68
Bragdon's Crossing 75
Brooks 89
Canaan 125
Chesterville 90
Dexter 55, 89, 90, 91, 92, 93, 97, 115, 120, 121
Dixfield 90, 95, 99
East Jay 117
East Livermore 120
East Readfield 93, 98, 102
Farmington 90, 97

635

FIG. 6H

The Ancestry of
THOMAS LOVELL
and his wife
MARY ELLEN RICKER by
FREDERICK W. LOVELL
and
EVA G. LOVELL

640

645

650

John Lovell

18[redacted] 1906

JOHN LOVELL, th[redacted] and Mary (Taylor) Lovell, was born at [redacted]land, 17 June 1837, and died at Odell[redacted]22 June 1906. He married 27 Novem[redacted]den, Northamptonshire, Annie Skin[redacted], the daughter of George Skinner an[redacted]whose surname was Banks. He was c[redacted] Rushden for fifty years and lived t[redacted]en.

John Lovell and Annie Skinner are thought to have [redacted]n this line that had been plan-[redacted]as interrupted by the outbreak [redacted]9. Possibly the connection is [redacted], the daughter of Robert and [redacted]l, who married Reuben Banks, Hall Weston, Huntingdonshire, 23 November 1800.

John and Annie (Skinner) Lovell had one son, Robert, who was born 18 December 1862, Cambridgeshi[redacted]n 20 January 1909. He married at [redacted]ust 1890, Ada Frances Ellmers wh[redacted]Their son, John Robert Lovell, wa[redacted]1893, and married September 19[redacted]ynor Vickers, who was born in 18[redacted] George and Annie Vickers. R[redacted]d, Clapham, London, S.W. 12, England.

~ 36 ~

700

FIG. 7A

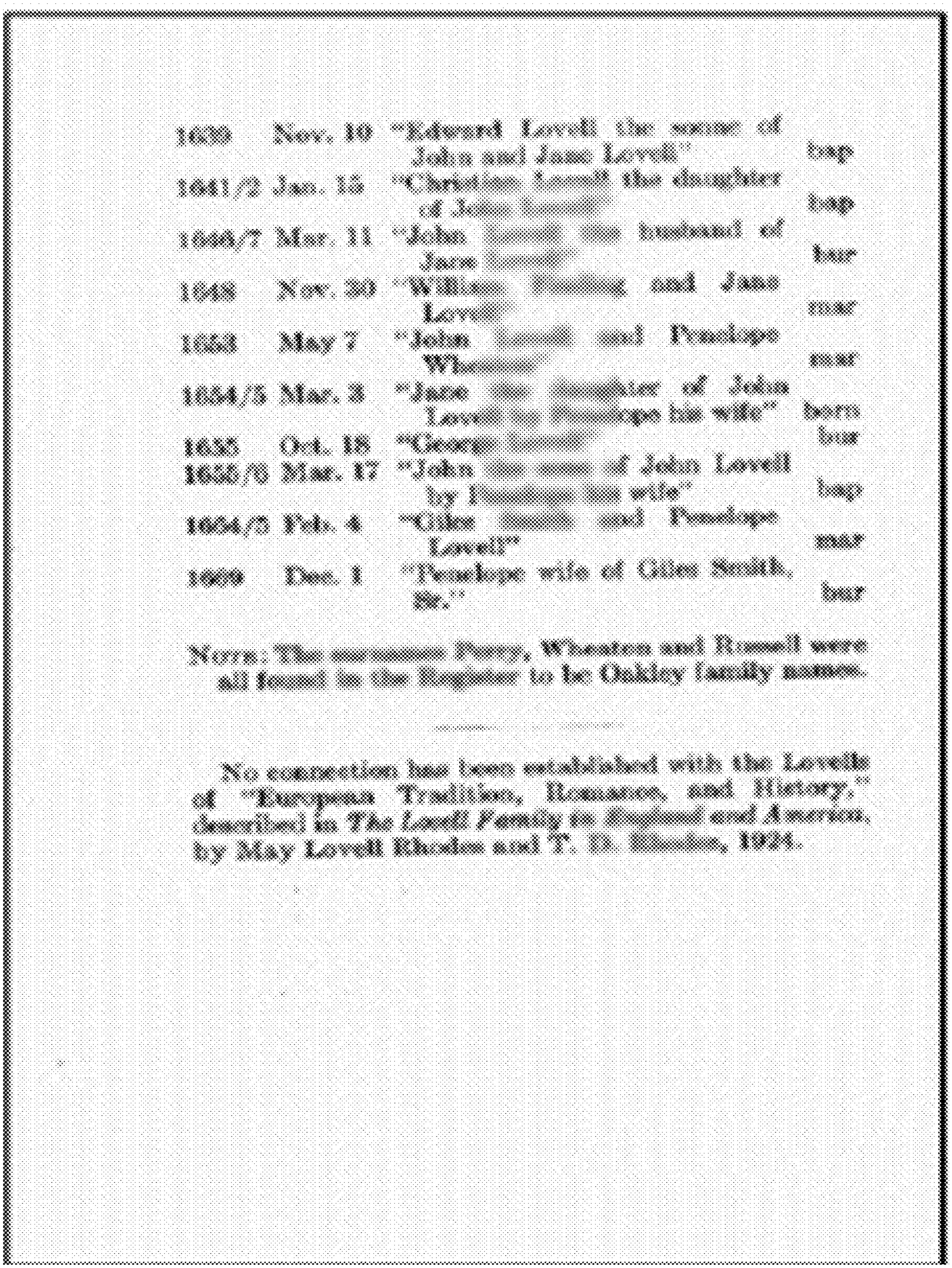

| | | | |
|---|---|---|---|
| 1639 | Nov. 10 | "Edward Lovell the sonne of John and Jane Lovell" | bap |
| 1641/2 | Jan. 15 | "Christian Lovell the daughter of J[illegible] | bap |
| 1646/7 | Mar. 11 | "John [illegible] the husband of Jane [illegible] | bur |
| 1648 | Nov. 30 | "William [illegible] and Jane Lov[illegible] | mar |
| 1653 | May 7 | "John [illegible] and Penelope Wh[illegible] | mar |
| 1654/5 | Mar. 3 | "Jane [illegible] daughter of John Lovell [illegible] Penelope his wife" | born |
| 1655 | Oct. 18 | "George [illegible] | bur |
| 1655/6 | Mar. 17 | "John [illegible] of John Lovell by [illegible] wife" | bap |
| 1664/5 | Feb. 4 | "Giles [illegible] and Penelope Lovell" | mar |
| 1669 | Dec. 1 | "Penelope wife of Giles Smith, Sr." | bur |

NOTE: The [illegible] Perry, Wheaton and Russell were all found in the Register to be Oakley family names.

No connection has been established with the Lovells of "European Tradition, Romance, and History," described in *The Lovell Family in England and America*, by May Lovell Rhodes and T. D. Rhodes, 1924.

725

FIG. 7B (a)

MACHINE-LEARNING BASED AUTOMATED DOCUMENT INTEGRATION INTO GENEALOGICAL TREES

CROSS-REFERENCE TO RELATED APPLICATION

The present application is a continuation of U.S. application Ser. No. 18/121,997, filed Mar. 15, 2023, which claims the benefit of U.S. Provisional Patent Application No. 63/319,847, filed on Mar. 15, 2022, which is hereby incorporated by reference in its entirety.

FIELD

The disclosed embodiments relate to systems, methods, and/or computer-program products configured for importing documents, such as family history books, to a database, such as a genealogical research service.

BACKGROUND

Family history books, also known as genealogy books or published family histories, include books or other resources that document the family history of a particular lineage, usually over numerous generations. Such family history books are a valuable source of genealogical information, as they are often compiled by a professional or amateur genealogist and/or a member of the lineage of interest, and have access to intimate details of family relationships as well as pertinent cultural milieu and historical context. Family history books provide more narrative, evidence, context, and opportunities for tree expansion compared to government documents, such as birth, marriage, and death records, alone. For example, family history books often provide further information such as occupation, interests, associations, and otherwise. Further, family history books often contain information that is not established in government records.

Hundreds of thousands of such published family histories exist in various repositories and libraries. Family history books were once a primary tool for genealogy research, but due to the difficulty of accessing and interpreting them, they have been underutilized in genealogical research. There is tremendous, untapped value in family history books, which have an average of over 6,000 names with biographic data and relationships associated therewith.

Family history books are, for the most part, not formally published. Even those that are published are often published in as few as five to ten copies. As such, knowledge and location of and access to these sources of information alone, to say nothing of the task of extracting information therefrom, has been difficult if not impossible for persons conducting genealogical research.

SUMMARY

Disclosed herein relates to example embodiments that are related to a computer-implemented method, including: receiving a genealogical record, the genealogical record including one or more images of a historical physical record; segmenting the gencalogical record into one or more segments; extracting a plurality of named entities in one of the segments; detecting a relationship among the plurality of named entities extracted in one of the segments; adding one or more named entities in the plurality of named entities to a genealogical tree; and causing to display the genealogical tree with added named entities at a graphical user interface, the genealogical tree including an access to at least one of the images of the historical physical record.

In some embodiments, the genealogical record includes a family history book that includes a plurality of pages, each page corresponding to one of the images.

In some embodiments, segmenting the genealogical record into one or more segments includes: identifying that two or more segments that are from different images are related; and connecting the two or more segments as a joint segment that is to be processed together.

In some embodiments, segmenting the genealogical record into one or more segments includes: using one or more document structure detection models to identify one or more types of document structures in the genealogical record; generating at least one of the segments based on one of the identified types of document structures.

In some embodiments, the one or more document structure detection models include one or more of the following: a form detection model, a table detection model, a list detection model, a genealogical tree detection model, or a free-text detection model.

In some embodiments, extracting the plurality of named entities in one of the segments includes: identifying a text string that corresponds to a named entity in the one of the segments; retrieving data associated with the named entity in the genealogical record; and matching the data to data in a genealogical database to determine that the named entity corresponds to an existing named entity data entity of the genealogical database.

In some embodiments, at least one of the plurality of named entities is a deceased historical person.

In some embodiments, detecting the relationship among the plurality of named entities extracted in one of the segments includes: performing an anaphora analysis, a stemming analysis, and/or a lemmatization analysis on data in the one of the segments; and identifying the relationship among the plurality of named entities based on results from the anaphora analysis, the stemming analysis, and/or the lemmatization analysis.

In some embodiments, detecting the relationship among the plurality of named entities extracted in one of the segments includes accounting for reciprocity in relationships.

In some embodiments, segmenting the genealogical record into one or more segments is performed by a first machine learning model, extracting the plurality of named entities in one of the segments is performed by a second machine learning model, and detecting the relationship among the plurality of named entities is performed by a third machine learning model.

In some embodiments, adding one or more named entities in the plurality of named entities to the genealogical tree includes: retrieving an existing genealogical tree; identifying that the existing genealogical tree includes a first named entity that is one of the plurality of named entities extracted in the one of the segments; and adding a second named entity of the plurality of named entities as a node of the existing genealogical tree based on the detected relationship between the first named entity and the second named entity.

In some embodiments, adding one or more named entities in the plurality of named entities to the genealogical tree includes: generating a new genealogical tree; and adding the plurality of named entities as nodes of the new genealogical tree based on the detected relationship among the plurality of named entities.

In some embodiments, adding one or more named entities in the plurality of named entities to the genealogical tree includes: merging the new genealogical tree to an existing genealogical tree.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure

FIG. 4A and FIG. 4B are conceptual diagrams illustrating example historical physical documents digitalized and processed by an importation process, in accordance with some embodiments.

FIGS. 5A, 5B, 5C, 5D, and 5E are conceptual diagrams illustrating example historical physical documents that are processed by an importation process, in accordance with some embodiments.

FIGS. 6A, 6B, 6C, 6D, 6E, 6F, 6G, 6H, 6I, 6J, 6K and 6L are conceptual diagrams illustrating additional example historical physical documents that are processed by an importation process, in accordance with some embodiments.

FIGS. 7A, 7B, and 7C are conceptual diagrams illustrating example historical physical documents that are processed by cut-out augmentation methods, in accordance with some embodiments.

Figure 1:
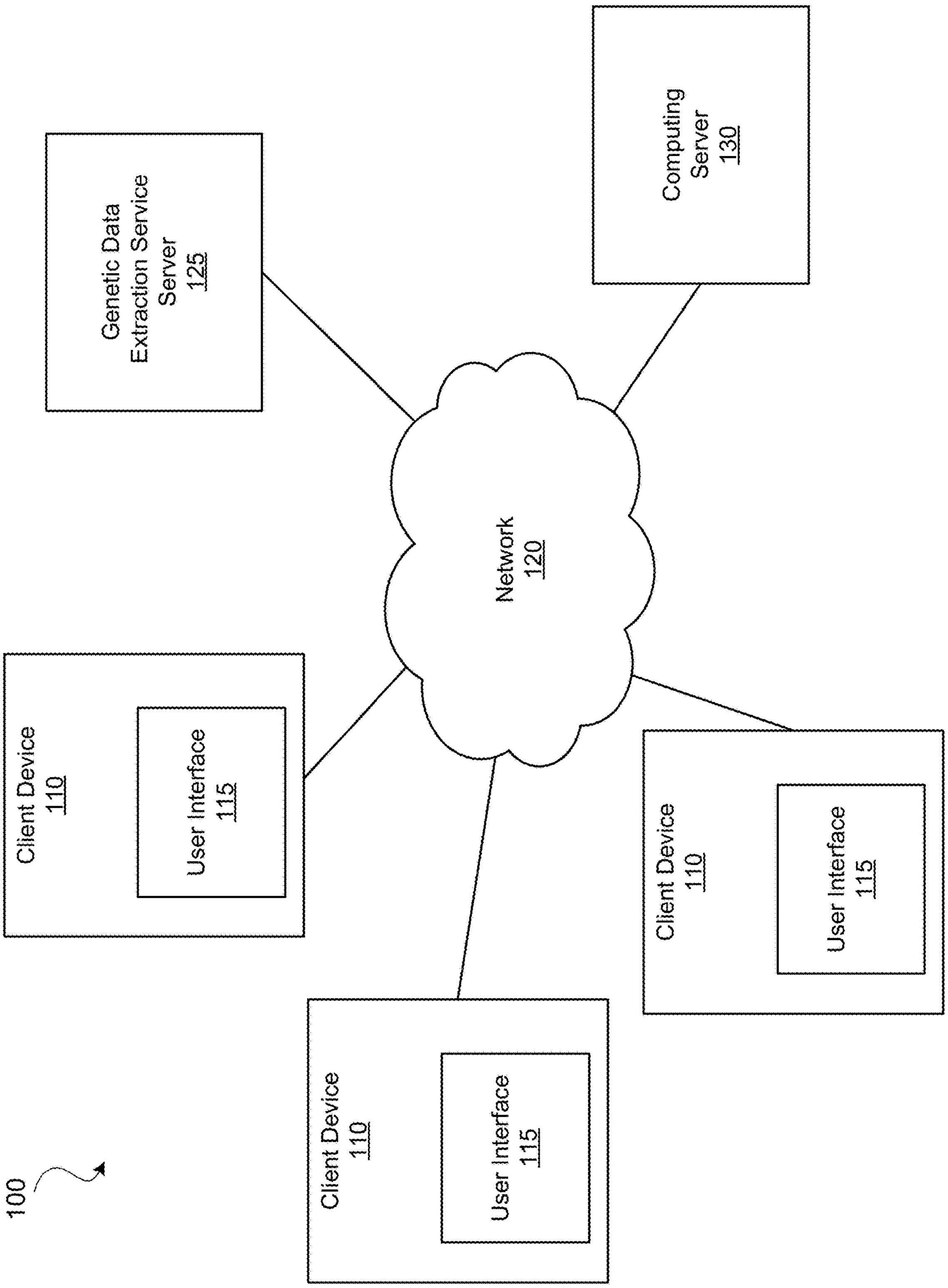
(FIG. 1 illustrates a diagram of a system environment of an example computing system, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Owing to the complex nature of family history and other books, in which information is variously compiled in tables, lists, genealogical trees, free text, images, coats of arms, letters, forms, certificates, maps, indexes, and other formats, which are often intermingled, extracting information therefrom is necessarily, at best, a highly tedious, costly, and time-consuming manual effort that does not lend itself well to single, general-purpose natural language processing ("NLP") models. For example, each author of a family history book organized the information therein differently from other authors and from different families/communities, with widely varying use of tables, lists, pedigrees, images, graphics, and other components.

Even to the extent that such books are digitized, existing computer vision modalities such as optical character recognition ("OCR") are ill-suited to the daunting task of extracting and accurately representing the information from family history books, due to the diversity of formats and interrelations therebetween. As most family history books were authored by a different person, there is an enormous variety of layouts, formats, and organization of information in family history books. As such, naïve exploration of OCR-extracted content is not an effective way to relate people described therein.

Existing attempts at importing family history books are limited to OCR and entity-extraction attempts, as well as some attempts at manually indexing relationships. The existing approaches, however, have not met with success allowing for scalable and accurate importing of information from family history books. OCR data is unstructured, inconsistent, unorganized, and inaccessible, and names, places, and dates may occur without co-occurring dates and/or locations. Likewise, data can be sparse, with pages of a document such as a family history book entirely lacking date or location information. For example, natural-scene object detection is configured to identify randomly arranged natural scene objects in a 3D space with substantial overlap and occlusion therebetween.

Objects in natural-scene object detection generally have widely differing scale and size within the image, occur at arbitrary rotations or orientations, exhibit various lighting effects such as specular highlights, reflects, shadows, etc., and do not have historical document damage such as fading, bleed-through, image compression artifacts, page skew, torn, stained, and/or damaged pages, etc. Natural-scene object detection-related images also do not typically have the particular color schemes, such as bimodal or grayscale color schemes, that are particularly noticed in the foreground and background of historical documents.

Further, even to the extent that page element object detection has been attempted, such attempts have focused only on parsing scientific literature which is more structured than genealogical information, conforms to LaTeX and modern office document templates, and do not exhibit historical document phenomena such as variation, degradation, and other challenges, among other distinctions. Existing efforts at page element object detection have attempted to parse only a few, similar categories within a single document or type of documents, and then with at best middling success.

Training of computer vision models, such as object detection models, is heavily dependent on labeled data, and for such models to function with high precision, existing models require a large volume of labeled data from extensive collections or parts thereof. This is highly costly and impractical in many instances.

In view of the foregoing, there is a need for an improved system, method, and/or computer-program product for importing family history books to a genealogical research service.

Embodiments of importing family history books according to the present disclosure advantageously enable accurate, scalable, and cost-effective identification, segmentation, and/or importing of information from family history books or other resources. The embodiments provide a family history book importing approach configured to perform at least one of: image preprocessing, OCR extraction, full page segmentation, chapter detection page wrapping, form detection, table detection, list detection, free-text detection, form special-case processing, table special-case processing, list special-case processing, list continuation within or across pages, paragraph continuation within or across pages, chapter streaming, entity extraction, dependency detection, anaphora analysis, stemming, lemmatization, relationship detection, relationship classification, tree analysis, creation of trees, adding of a node/leaf to trees, merging of trees, and outputting of trees.

The embodiments may facilitate receiving one or more family history books and accurately building, augmenting, or correcting one or more family trees in, e.g., a genealogical database or research service therefrom. This is performed in some embodiments by providing a family history book importing system, method, or computer-program product configured to accurately segment and predict class labels and bounding boxes delincating page elements or blocks of data on pages of a family history book, and then invoke suitable, corresponding natural language processing ("NLP") modalities configured to extract entities and determine relationships therefrom.

Page element detection modalities provided in some embodiments of the disclosure may be configured to identify elements across a plurality of categories, in some embodiments 38 categories. This is four times the number of categories identifiable using existing modalities. Page element/object detection models used in some embodiments may be based on Faster R-CNN. Further, it has been found that using the bootstrapping and data augmentation strategies described regarding certain some embodiments facilitates state-of-the-art performance using a fraction of the amount of manually labeled data required by existing modalities. In some embodiments, the page-element detection modalities may be configured to identify page headers, sub-headers, page footers, paragraphs, lists, tables, images, captions, certificates, genealogical trees, graphics, maps, letters, indexes and index pages, title pages, delimiters, miscellaneous sections, forms, blank pages, handwriting, wills, and/or others.

It has been surprisingly found that standard data augmentation strategies using in, e.g., natural scene object detection are ill-suited to the task of document element segmentation, wherein page elements are arranged in a two-dimensional plane. Novel data augmentation strategies are described herein, including pixel-value perturbation-based approaches, approaches for compositing examples from existing elements, approaches for using OCR parameter perturbation, combinations and/or modifications thereof, and others. The novel data augmentation strategies of the disclosure advantageously regularize the model parameters such that the model(s) makes good predictions for examples from unseen family history books, and further reduces the costs of providing manual labels.

In some embodiments, a bootstrapping data labeling and training method includes the use of a limited subset of labeled examples retrieved from a few volumes for the models to begin to learn class-specific features. The model (s) trained on limited annotated data is then used to make predictions for examples from new volumes to identify examples for which the model prediction is poor. These examples are then considered for further labeling and iterative training with new training data (thereby combining both existing and new annotated examples). In particular, in some embodiments, the class imbalance problem is addressed by applying bootstrapping and combining it with novel page synthesis to composite entirely new and novel pages of underrepresented page elements.

Entity-relationship models of embodiments are advantageously configured to receive the output of a page segmentation and/or object detection model to determine relationships in a genealogical research service. One or both of a rule-based and machine-learned approach may be provided for extracting entities and determining relationships. For example, the rule-based relationship extraction model may include accommodations for stemming and lemmatization. A deep learning model for entity and relationship extraction, by contrast, may be configured to consider names and pronouns. The rule-based and deep learning models may be used in parallel, in series, alternately, or in any suitable manner.

To further reduce the number of annotated examples required to train the model, novel data augmentation strategies have been developed to regularize the model parameters such that it makes good predictions for examples from the unseen volumes, and further reduces the data labeling cost.

It has been surprisingly found that accurately identifying objects within a document using the disclosed embodiments, and applying a proper NLP modality thereto, yields valuable and more-accurate information than is obtainable using existing approaches.

While family history books have been described, it will be appreciated that other sources of information may also be processed and transformed using the disclosed embodiments, such as local and community history books, yearbooks, newspapers, wills and probates records, historical records, financial records, legal documents, modifications, equivalents, and/or combinations thereof, and others. Similarly, any suitable source of information may utilize any suitable, individual component or combinations of components of the embodiments, approaches for training and/or using the same, or otherwise.

Example System Environment

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
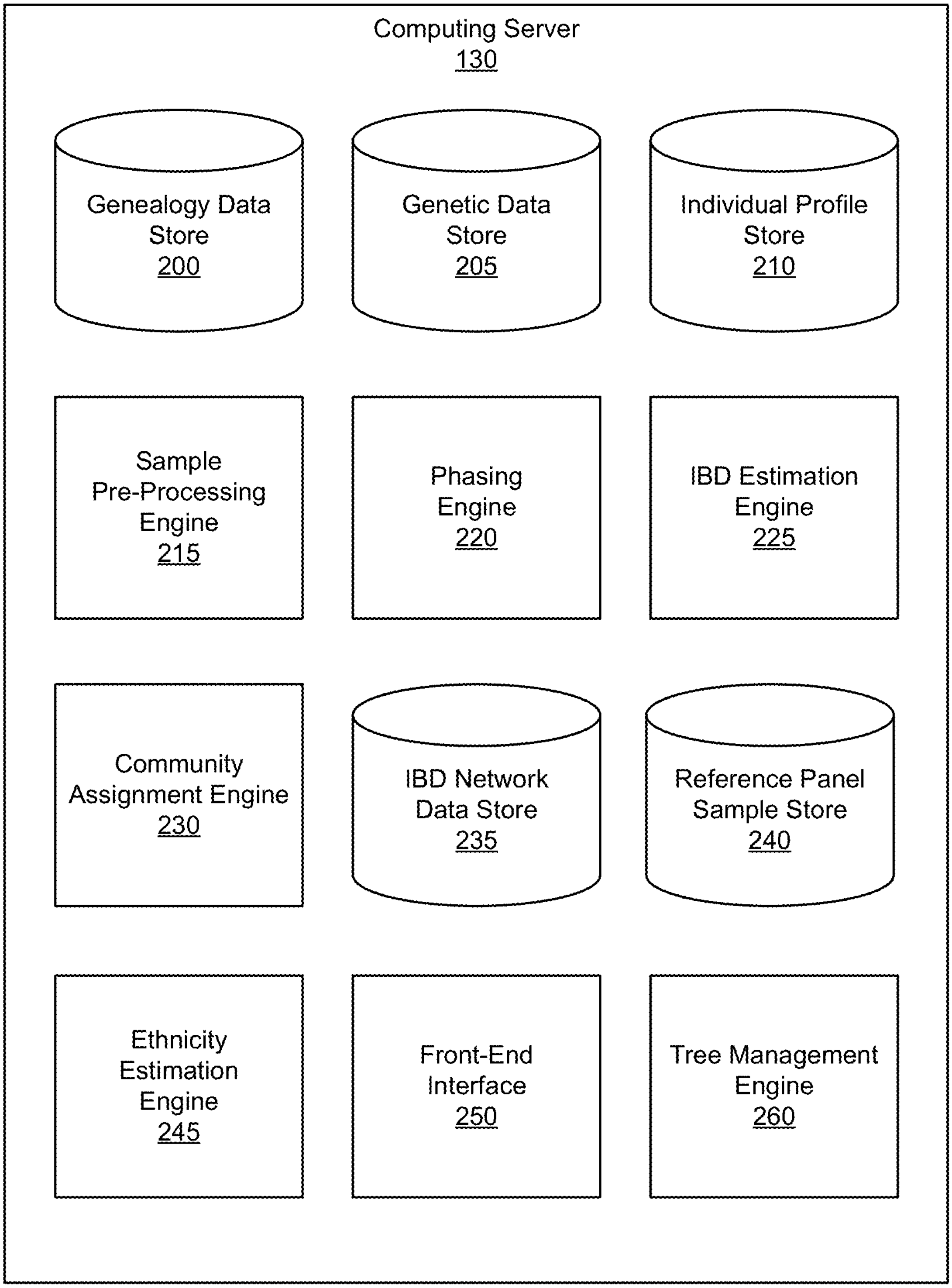
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

In some embodiments, the genealogical records may be historical physical records that are digitalized and automatically processed by various pipelines that will be discussed in further detail in FIG. 3A through FIG. 3D.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g. stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing. Other example phasing embodiments are described in U.S. Patent Application Publication No. US 2021/0034647, entitled "Clustering of Matched Segments to Determine Linkage of Dataset in a Database," published on Feb. 4, 2021.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Document Processing Pipelines

Embodiments of systems and methods for importing documents such as family history books address shortcomings in the art by providing an automated pipeline for receiving a document such as a family history book, segmenting the pages thereof by detecting and providing bounding boxes and classification labels for components therewithin, then extracting entities and relationships therebetween from the identified components. The embodiments may be configured to extract, e.g., names, places, dates, and relationships, to aggregate, e.g., common names, dates, and places, and/or to connect the content of the imported document, such as a family history book, with one or more individuals, such as users of a genealogical research service or otherwise. The embodiments may likewise be configured to perform object detection, page/document/book segmentation, and/or to perform entity resolution.

Facts and relationships, including names, dates, and places, for example, may be extracted using a named entity resolution model. This may include relationships that are explicitly stated in the extracted text, including family relationships, birth/marriage/death dates, and/or birth/marriage/death places. In some embodiments, relationships may be inferred based on the position of a name relative to other names.

To aggregate names, dates, and places, a moving average of commonly occurring names, dates, and places may be determined. Alternatively or in addition, GPS coordinates for places and Soundex/Edit Distance may be used for names. A digital signature is determined for the entire imported document, such as an entirety of an imported family history book, as well as, in some embodiments, for discrete portions thereof. The imported document and/or portions thereof may be categorized by suitable metadata, such as time, place, ethnicity, DNA community, or otherwise in the embodiment of a family history book import. This allows for determining a profile or fingerprint for pages of a document or entire documents, with histograms of the data representing the signature or fingerprint. Each book, person, genealogical tree, and/or collection of documents may be assigned a signature of names, dates, and/or places, with the intersection therebetween used to identify matches and/or provide search results.

Such fingerprints can be used for navigating and indexing the document for later searching. For example, a user interested only in discussions within a family history book that pertain to a community or people in a city called Mantua as opposed to nearby communities in Avon or Tremonton (which are also documented in the family history book) may be easily and automatically directed to the pages or documents pertaining particularly to Mantua. Geographic digital signatures may be determined for the content in space, e.g., to show the signatures on a map. Temporal digital signatures may be determined for the content in time, e.g., to show events or people on a timeline.

Figure 3A:
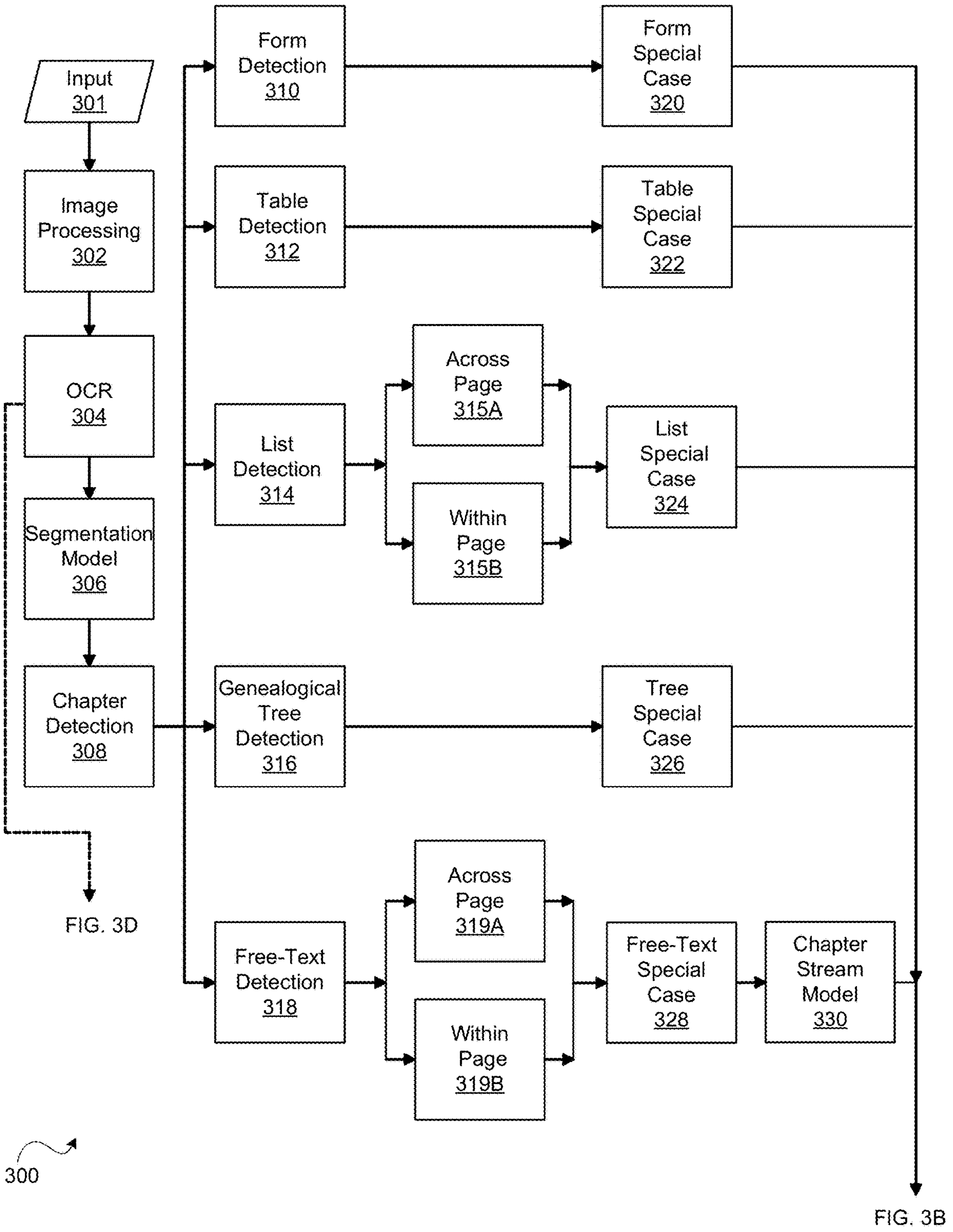
FIG. 3A is a block diagram illustrating a first pipeline section of an example process for automated importing and processing of a document, in accordance with some embodiments.

FIG. 3A is a block diagram illustration a first pipeline section 300 of an example process for automated importing and processing document, in accordance with some embodiments. The pipeline may be performed by the computing server 130, or any suitable computing devices. The first pipeline section 300 may include receiving an input 301. The input 301 may be a digital scan of a physical historical document, such as a genealogical record that is suitable to be classified and stored in genealogy data store 200. For example, in some embodiments, the input 301 may be images of a family history book or other source of information. The input 301 may be passed to for image preprocessing 302. This may include any suitable preprocessing step, such as resizing, denoising, smoothing, or otherwise. The computing server computing server 130 may perform OCR 304 on a version of the input 301, such as the raw version of the input 301 or a version that is preprocessed 302. OCR 304 may be performed using any suitable modality, such as AMAZON TEXTRACT available from Amazon.com, Inc. of Seattle, WA. In some embodiments, ABBYY models may be used.

The computing server 130 may apply a full page segmentation model 306 to a version of the input 301, such as the raw version, a version that is pre-processed 302, or a version that has been OCR-extracted 304. Where images are resized (for example to aid with processing requirements), the bounding boxes detected by the segmentation model 306 may be resized to match the original, larger image size. The full page segmentation model 306 may be configured to detect elements on a document page, provide bounding boxes therearound, and provide a classification and/or confidence level. The full page segmentation model may be configured to detect elements amid challenging artifacts and damage such as fading, bleed-through, image compression artifacts, page skew, tears, staining, damaged pages, etc. The full page segmentation model may be a model based on Faster-RCNN. The backbone of the neural network in some embodiments may be built with Feature Pyramid Network using ResNext-100. The model may include a backbone CNN component, followed by an intermediate representation model, the output of which may be utilized by a region proposal network (which is configured to identify regions of interest in the image) and/or a detection network (which is configured to detect the objects in the image with the corresponding bounding boxes). Additional components may include a regression layer and a classification layer for one or both of the region proposal network and the detection network.

In some embodiments, object detection modalities described in U.S. Patent Application Publication No. 2021/0390704, published Dec. 16, 2021, which is hereby incorporated in its entirety by reference, may be utilized.

For better prediction of the bounding boxes around the data block(s), ROI Polling in the detection network may be replaced with ROI Align. In some embodiments, all inputs are scaled to a fixed size, for example 1300×800 which may be derived empirically. The performance of the model is observed to improve with these modifications. Training may be conducted using any datasets of the genealogy data store 200. For example, 1935 annotated examples from 10 different volumes of Family History Books, with about 200 examples drawn from each volume, may be used for training of the full page segmentation model 306. 80% of the examples were used for training and 20% reserved for validation. In an embodiment, 18 categories may be identified, though more, fewer, and/or different categories are envisioned. For example, the embodiments may be configured to detect and properly label wills or other estate-related documents embedded in a family history book.

It has been surprisingly found that page-segmentation modalities perform poorly in certain types of documents, such as family history books. In particular, certain classes or categories within certain documents have been found to perform poorly, partly because such categories appear with low frequency in training data. Such low-frequency categories include, in embodiments, title pages and maps.

To improve the performance of the full-page segmentation model on these low-frequency classes, data augmentation may be performed in embodiments to increase the quantity and/or quality of training and testing data on these classes. For example, suitable color, huc, saturation, translation, and/or rotation techniques may be performed on portions of certain training data to improve the full-page segmentation model's performance. In embodiments, the data augmentation techniques may be performed specifically on the portions of training data (which may include whole family history books) that pertain to title pages and/or maps, among other possibilities. In embodiments, random transformations may be applied. Suitable transformations may include, for example, augmenting image data with color jitter, random erasing, random cropping and resizing, adding noise, flipping, scaling, adjusting brightness, adjusting contrast, augmenting colors, deforming elastically, adding Gaussian blur, changing saturation, combinations and/or modifications thereof, or any other suitable technique.

By applying data augmentation techniques as described above, it has been surprisingly found that the full-page segmentation model's performance jumped significantly, from a precision score of 0.8162, a recall score of 0.8369, and an F1 score of 0.8166 to a precision score of 0.9297, a recall score of 0.9480, and an F1 score of 0.9378.

Additionally, or alternatively, additional collection(s) of family history books may added to the corpus of training data. This has been found to substantially improve the generalization of the full-page segmentation model so as to better handle the inherent and substantial variability observed within family history books, which are typically authored by different genealogists (of the professional or amateur varieties) in vastly different styles, formats, and subject-matter.

In embodiments, a Mask RCNN-based model such as Detectron 2 may be utilized and modified to perform full-page segmentation. Such models are typically built for natural-scene object detection, and are not well-suited, without substantial modification and fine-tuning, to the nuanced challenges of importing complex documents like family history books or other complex documents. While Detectron 2 is discussed, it will be appreciated that the disclosure is not limited thereto, but rather any suitable model may be used, such as YOLO or others. YOLO has been found to be fast but to have poorer performance. Notwithstanding the inferior performance of YOLO, it may be utilized as an alternative to or in parallel or series with a Mask RCNN-based model in embodiments.

An output of the full-page segmentation model may be a prediction of a bounding box about each data block in an input image, along with an associated label and confidence score. The categories and number of samples for training data and validation are shown in Table 1 below.

TABLE 1

| | Title Page | Paragraph | List | Image | Graphic/ Figure | Caption | Page Sub-header | Page footer |
|---|---|---|---|---|---|---|---|---|
| Training Data | 13 | 6535 | 2700 | 80 | 282 | 46 | 1093 | 800 |
| Validation Data | 6 | 1556 | 670 | 30 | 86 | 25 | 271 | 218 |

| | Table | Indices | Forms | Certificate/ Letter | Delimiter | Misc | Blank page | Total |
|---|---|---|---|---|---|---|---|---|
| Training Data | 54 | 57 | 122 | 9 | 217 | 509 | 15 | 12830 |
| Validation Data | 9 | 13 | 26 | 2 | 45 | 145 | 5 | 3193 |

It has been surprisingly found that identifying, segmenting, and processing yet another class, particularly footnotes, substantially improves the performance of the overall import process. It has also been found that identification of footnotes improves performance by improving the detection of other classes individually. That is, by detecting a footnote adjacent to or below a list, for example, the performance of the model on the associated list is improved by discretizing the footnote(s) from the list which facilitates improved segmentation of the list. This has been found with regards to many of the other classes that are detected. Discretizing the footnotes from other classes improves the performance of downstream models which may be specific to a particular class of input; removing the footnotes which are often of a fundamentally different type or style of format and content than adjacent sections like lists, pedigree charts, or otherwise, improves the performance of models specific to the adjacent sections, which are not well-suited to the footnotes and content thereof.

The computing server 130 may apply a chapter detection and page wrapping model 308 that is configured to detect distinct chapters of a family history book and/or where elements or sections continue across different pages and therefore require merging together.

A version of the input 301 or a portion thereof, which may be processed by the pre-processing 302, OCR model 304, segmentation 306, and/or chapter and page wrap detection model 308, may be passed to one or more document structure detection models to detect document structures. Example document structure detection models may include a form detection 310, a table detection 312, a list detection 314, a genealogical tree detection 316, and a free-text detection 318, as the case may be. For example, individual segments of the input 301 may be passed, based on the assigned classification label, to a pertinent model. Thus lists may be passed to the list detection model 314, paragraphs may be passed to the free-text detection model 318, and so on. A segment may be sent to more than one downstream model as appropriate. Where a particular segment was not classifiable or had a classification confidence level below a predetermined threshold, the segment may be sent to a plurality or all of the downstream models.

The list detection model 314 may have downstream thereof a list continuation across pages model 315A and/or a list continuation within pages model 315B. In some embodiments, the models 315A, 315B facilitate detection of lists that have discontinuations, such as lists that wrap around different pages of a family history book and/or lists that are interrupted or wrap around images, paragraphs, or other elements within a page. Similarly, the free-text detection model 318 may have downstream thereof a paragraph continuation across pages model 319A and/or a paragraph continuation within pages model 319B. In some embodiments, the models 319A, 319B facilitate detection of paragraphs that have discontinuations across and within pages, such as interruptions due to the arrangement of other elements.

Downstream of various detection models 310, 312, 314, 316, 318 and associated components or steps 315A, 315B, 319A, 319B, special-case processing models 320, 322, 324, 326, 328 may be provided. The special-case processing models 320, 322, 324, 326, 328 (corresponding respectively to form special-case processing, table special-case processing, list special-case processing, genealogical tree special-case processing, and paragraph special-case processing) may include one or more of rule- or heuristic-based models, machine learned models such as deep learning models, combinations thereof, or otherwise.

For example, heuristic rules may facilitate proper handling of edge cases and/or extraction of contextual information. A heuristic rule for list processing may analyze the previous paragraph for clues about what is in the list. Complete deep learning models for forms, by contrast, may identify label-value pairs, in another example. Forms and tables may have more deep learning models for layout analysis, finding labels, values, etc. Lists have both rules and deep learning models as well as NLP models, in some embodiments.

A chapter streaming model 330 may be provided downstream of the paragraph or free-text special-case processing model 328. The chapter streaming model 330 may include a machine learned and/or heuristic-based model for parsing the text by paragraphs rather than by pages in order to increase accuracy by not having broken paragraphs or paragraph discontinuity across pages. The chapter streaming model 330 may also give the downstream NLP models local context so that the downstream NLP models can be aware of and provided with data from previous and/or subsequent pages, as the case may be. The results from the steps or models 320, 322, 324, 326, 330 may be sent to a second pipeline section 340 as shown and described regarding FIG. 3B.

Figure 3B:
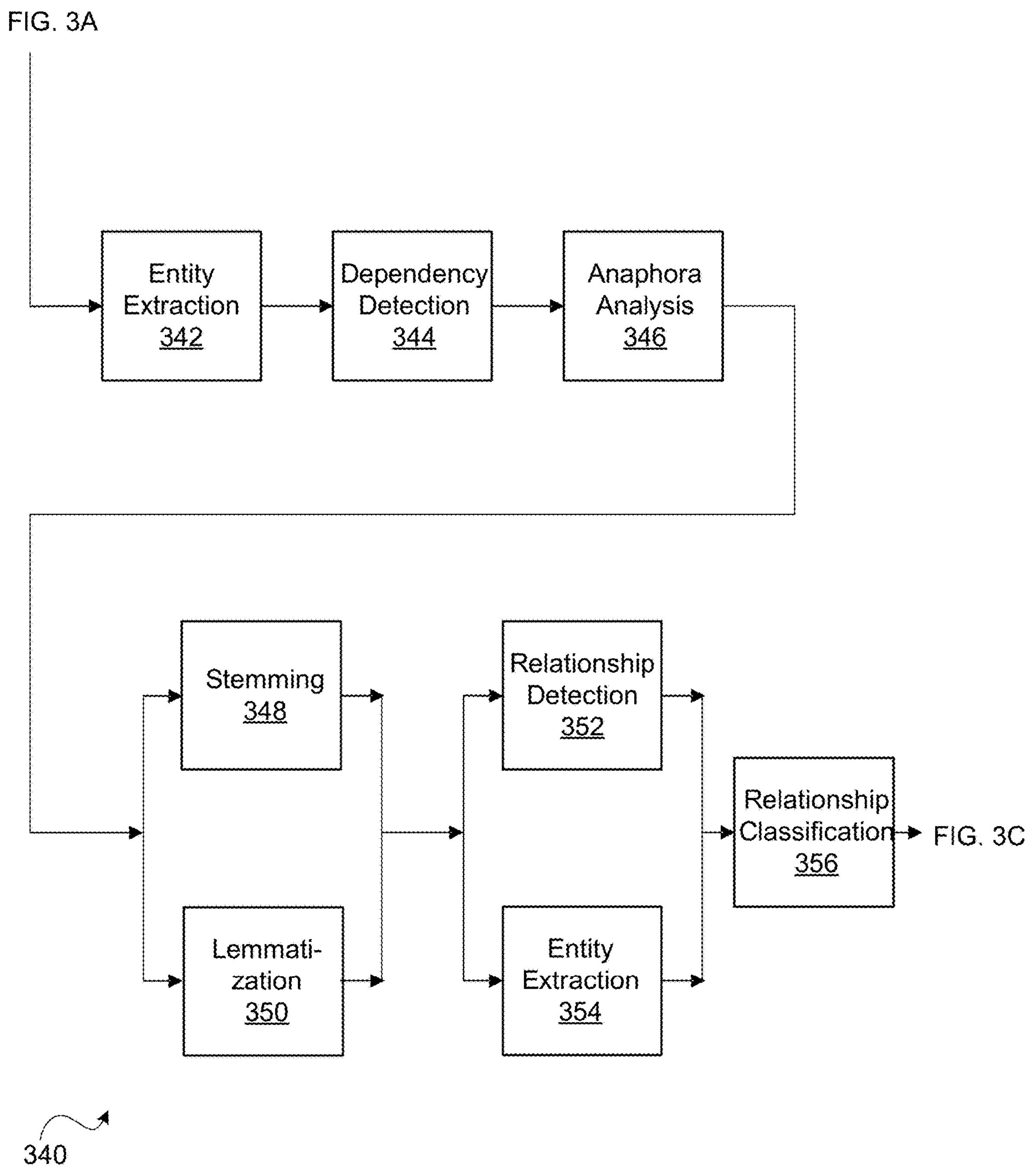
FIG. 3B is a block diagram illustrating the second pipeline section of an example process for automated importing and processing of a document, in accordance with some embodiments.

FIG. 3B is a block diagram illustrating the second pipeline section 340 of an example process for automated importing and processing document, in accordance with some embodiments. A version of the input 301, which may be processed and divided into a portion from any of the components in the pipeline 300, may be inputted into an entity extraction model 342. For example, the OCR-extracted and separately processed data may be processed and transformed to identify and extract entities therefrom. In particular, text identified in or parsed from the OCR-extracted and processed data, which is determined to correspond to an entity such as a name, biographical data such as a person's birth date, birth place, marriage data, marriage place, death date, death place, or otherwise, may be extracted and arranged in a suitable data-storage format.

A dependency detection model 344, an anaphora analysis model 346, a stemming model 348, and/or a lemmatization model 350 may be arranged downstream of the entity extraction model 342. The dependency detection model 344 may be configured to parse the grammar of OCR-extracted text, and in the case of relationship extraction, to identify dependencies such as "who did what to whom." For example, the dependency detection model may be configured to identify parts of speech such as proper noun, verbs, etc. Thus, an OCR-extracted sentence "Job Tyler married Mary in 1630" may be transformed using the dependency detection model 344 to discern that who: [Job Tyler] did what: [married] who: [Mary], and did so at a particular date.

Anaphora analysis 346 may be performed in conjunction with dependency detection. Anaphora analysis at 346 may advantageously resolve coreferences such that relationships are extracted from multiple sentences. Thus, an OCR-extracted text that reads: "Samuel, son of Timothy and Sarah (Cromwell) Wentworth, lived in Berwick, Me., on the hold homestead. He was constable in 1731; collector of taxes for several years; and deacon of the north parish church in Berwick, Me., from its organization 5 Apr. 1755 until his death. He married 49 August 1725 Joanna, daughter of John and Deborah (Church) Roberts of Somersworth, N.H. She was born 40 October 1705. Deacon Samuel died 6 Jul. 1780; his wife died but a few hours after him" may be transformed such that the relationship Samuel Wentworth→he→married Joanna is discerned despite such details being disparately provided in the text. NeuralCoref (Huggingface) may be used to perform anaphora analysis. Alternatively, the anaphora analysis may be a BERT-based, AllenNLP-based, or any other suitable approach.

Alternatively, SpERT (Span-based Entity and Relation Transformer) may be used, which uses light-weight reasoning on BERT embeddings, which features entity recognition and filtering as well as relation classification with a localized, marker-free context representation. Anaphora is uniquely combined with relationship extraction in some embodiments. In some embodiments, "pronoun" becomes a type of relationship just like "father," "mother," etc. In post-processing, each pronoun is resolved to the appropriate person.

The stemming model 348 and/or the lemmatization model 350 may be configured respectively to perform stemming and/or lemmatization analysis using, e.g., the Natural Language Toolkit ("NLTK") and/or spaCy. This advantageously allows for finding relevant results not only for exact expressions, but also for other possible forms of the words that were used. For example, "married" is related to words like "marry," "marriage," "marriages," "marrying," etc. The stemming model 348 may be configured, as a rule-based approach, to cut off the end or beginning of a word and take into account a list of common prefixes and suffixes, whereas the lemmatization model 350 may be configured, as a dictionary-based approach, to take into consideration the morphological analysis of the words and use detailed dictionaries or ontologies to link the form back to its lemma.

The stemming and lemmatization models 348, 350 may be arranged to receive input and perform stemming and lemmatization, respectively, in series, in parallel, simultaneously, separately, or otherwise. In some embodiments, stemming and lemmatization is performed separately on each input, with the output of each checked and the best output therefrom kept/utilized. In other embodiments, one or the other is used on different inputs to improve speed or performance.

The stemming model 348 may alternatively utilize the Porter Stemmer, the Snowball Stemmer, the Lancaster Stemmer, combinations or modifications thereof, or any other suitable modality. The lemmatization model 350 may utilize the NLTK Lemmatizer, the Text Blog Lemmatizer, the SpaCy Lemmatizer, combinations or modifications thereof, or any other suitable modality.

After the anaphora, stemming, and lemmatization models 346, 348, 350, relationship detection and joint entity relationship extraction may be performed by relationship detection model 352 and entity extraction model 354 respectively, in parallel, in series, or alternatively. For example, one or the other of relationship detection model 352 and entity extraction model 354 may be performed based on a determination from one or more preceding models, in response to a user preference, in response to a particular input, or otherwise. Entity-relationship extraction as well as anaphora resolution may be performed using a Span-based Entity and Relation Transformer ("SpERT") model. The SpERT model may advantageously facilitate span classification, span filtering, and/or relation classification using a fine-tuned bidirectional encoder representations from transformers ("BERT") model, with one or more maxpooling layers, span classifiers, span filters, and relation classifiers.

The SpERT model may be modified in some embodiments to utilize pronouns as a type of relationship. Additionally, or alternatively, the SpERT model may be modified with alternatives to the BERT model at the core of conventional SpERT implementations. Rather, DistilBERT, ROBERTa, ALBERT, Longformer, combinations and/or modifications thereof, or other suitable replacements may be utilized. It has been found that Longformer is an advantageous modification to SpERT, given the higher tolerance for number of tokens. Given the number of tokens extracted from documents, such as family history books, which may have long paragraphs that exceed the token limits of SpERT and other models (which are limited to at most 512 words and thus require discarding any tokens beyond 512), the use of Longformer advantageously allows for capturing more data than would be possible using other models. It has also been surprisingly found that adapting the entity extraction and relationship detection models with Longformer results in a performance boost.

In some embodiments, the SpERT model may be modified regarding metrics such as accuracy, precision, recall, f-score, and others. For example, in some embodiments, the metrics for assessing the relationship detection and/or entity extraction models may be configured to account for reciprocity in relationships. For example, sometimes a relationship between a father and a daughter is detected and labeled, e.g., "Joshua is father to Elizabeth," but the reverse relationship is not detected and labeled, e.g., "Elizabeth is daughter to Joshua." This may be because the training data only show one side of the relationship: e.g., that Joshua is father to Elizabeth, with the reverse relationship inferred by the manual labeler.

During training, the model normally learns by comparing predictions against the training data using metrics like true positive, true negative, false positive, and false negative, which allows for determining accuracy, precision, recall, etc. In ordinary implementations the model, during training, would regard a prediction of "Elizabeth is daughter to Joshua" as an error and becomes disposed to not look for and extract such relationships in the future, all because the manual labels only indicate that "Joshua is father to Elizabeth."

In some embodiments, the model is adjusted such that the reverse relationships in the training data labels are considered. This advantageously saves cost and complexity in obtaining labeled data and improves the accuracy of the entity extraction and relationship detection models as they are better enabled to consider nuances in training data, leading to better predictions of relationships.

Figure 3C:
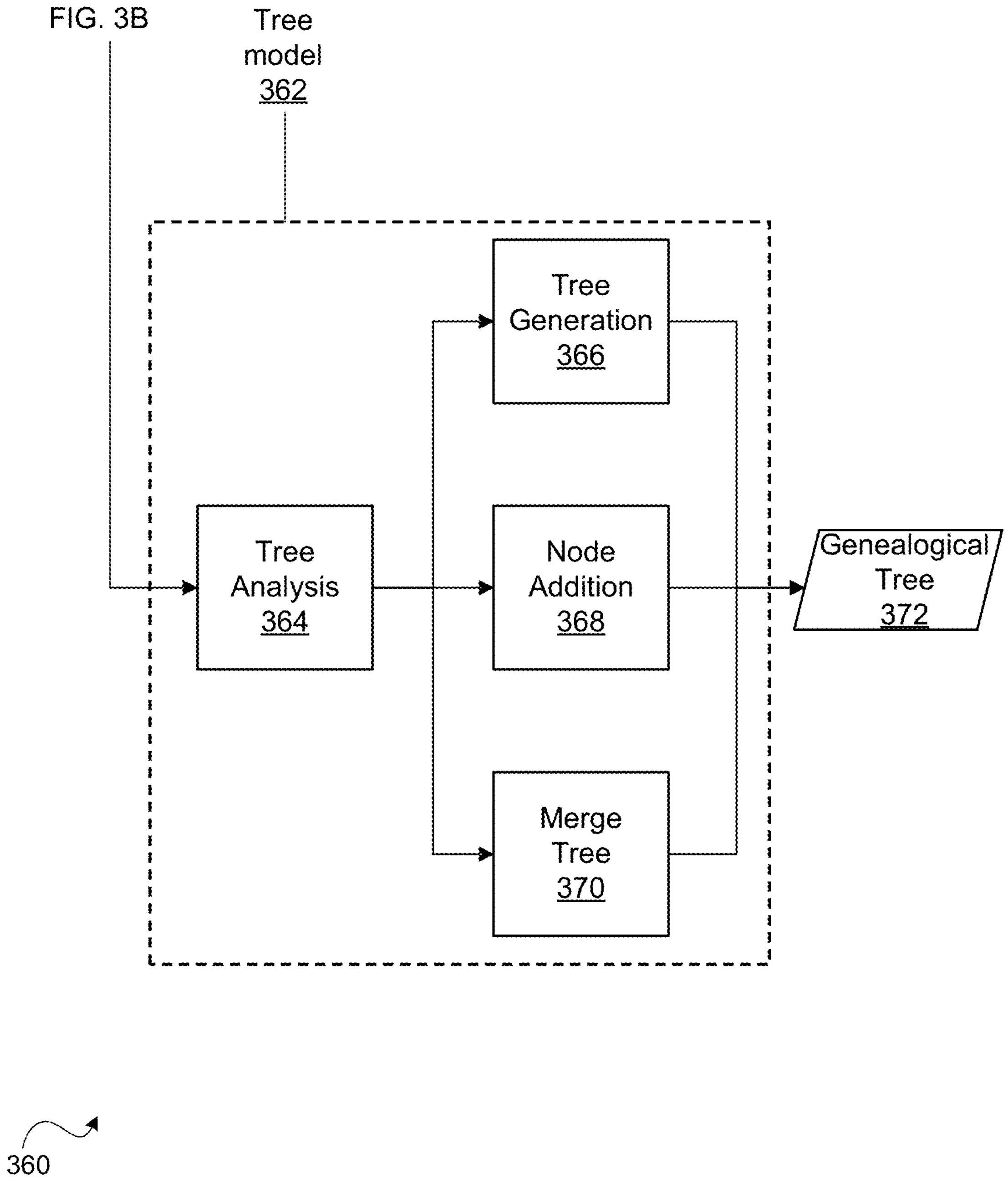
FIG. 3C is a block diagram illustrating the third pipeline section of an example process for automated importing and processing of a document, in accordance with some embodiments.

A relationship classification model 356 may receive the output from one or both of the relationship detection and joint entity relationship extraction models 352, 354, and may output relationship classifications or predictions to a third pipeline section described regarding FIG. 3C.

In embodiments, an ensemble approach is utilized for complementing SpERT or other models. It has been surprisingly found that SpERT poorly performs on detection of location-based entities, and that a spaCy model advantageously may be ensembled together with the SpERT model to improve detection of location-based entities. This improves performance as false negatives are reduced overall. A rule may be utilized that preferentially selects any location-based entity detected by SpERT even when such location-based entity is in conflict with a location-based entity simultaneously or separately detected by spaCy. This advantageously helps resolve the confusing overlap between names of persons and locations; for example, "Lincoln" or "George" could be a first name, a last name, or a location name. In other embodiments, the spaCy- or similar modality-detected location may be preferred over any location detected by SpERT or similar modalities.

In embodiments, if spaCy and SpERT both detect an entity, the confirmation by spaCy (or similar modality) of the SpERT-detected (or similar modality-detected) location may advantageously improve the confidence score associated with the SpERT-detected location.

This ensemble approach is counterintuitive because spaCy is normally very poor at extracting other types of entities and relationships therebetween, given its limited training data, limited support for non-English languages, limited support for domain-specific entities, and limited support for complex relationships. As such, utilizing spaCy in this utilization would not be expected to reduce the rate of false negatives from SpERT (which is geared towards entity detection and relationship extraction), as spaCy is prone to false positives.

Additionally, it has been found that detecting patterns via pattern analysis techniques in individual documents and within entire corpuses of documents, such as a family history books, advantageously improves the detection of entities using a model such as spaCy. Where spaCy detects, e.g., a location, it may be cross-checked against a detected pattern from the pertinent document or collection of documents. The patterns may be detected or represented in a plot or other suitable representation or format. This allows for improving or correcting confidence labels for detected entities, as the detected patterns may be considered "gold labels." That is, confidence labels may be improved by leveraging detected patterns such that erroneously low confidence scores may be increased as appropriate and erroneously high confidence scores may be decreased as appropriate.

In embodiments, context may be extracted between two entities, such as a name and a date, a name and a location, a date and a location, a name and a type of relationship (e.g. "sired by"), or any other suitable entities and combinations thereof. For example, where a model detects a location, context before and after the detected location may be retrieved and compared against analyzed patterns. In embodiments, a threshold of 15 words on one or both sides of entities may be established for retrieving context for comparison.

The retrieved content may then be compared to detect the presence of any patterns; where such patterns (e.g. the phrases "died at," "married at," for locations, or "sired by" or "offspring of" for relationships) are then detected, the confidence score associated with the entity may be adjusted as appropriate. For example, where a detected pattern confirms the label assigned to the entity, the confidence score associated therewith may be correspondingly increased. Where, on the other hand, no patterns are detected, the confidence score may be adjusted as suitable. Where, in other situations, the detected patterns tend to contradict the assigned label, the confidence score associated with the entity may be correspondingly reduced.

In embodiments, an entity resolution model may receive as inputs entity and relations predictions, OCR output tokens, and/or page segmentations from one or more of the above-mentioned modalities. The entity resolution model may be configured to output consolidated person entities from or based on one or more of these variegated inputs. In embodiments, for instance, a family history book may be processed according to embodiments to detect that a Pierre Fauconnier born in 1569 in France (with an unknown death date) was husband to a person named Judith. Pierre and Judith had a son Jean Fauconnier who lived in London, England, and was married to Madeleine de la Touche, who together had a son Pierre of Angouleme, France (identified as a grandson of Pierre and Judith). Further, Pierre had a son Pierre Fauconnier (1658-1749) who was born in Tours, France and died in New York.

Certain rules or assumptions may be utilized to improve performance of the entity resolution model. For example, it may be assumed that a person does not go through a name change except for the last name of a married person. Clusters may be generated for candidate entities, and resolved for entities only within a same page of the family history book. In other embodiments, entity resolution may be performed across pages.

Features may be generated by extracting proximity measures between entities within such a page, for instance using bbox locations), performing surname inference, performing reciprocal relationship derivation (e.g. father, mother→child, husband→wife, siblings, etc.), disambiguating names, normalizing dates and performing fuzzy matching for matching incomplete dates. Names may be disambiguated by leveraging entities and relationships extracted from a document, and by implementing algorithms for applying common-sense logic and probability computations to compare assembled entity pairs.

Dates may be disambiguated using conflicting birth and death dates, in embodiments. Features may be merged into a compliant final resolved JSON file.

Other features that are contemplated as part of the present disclosure include generation number attribute, in-law labels, and other features.

Entity resolution may utilize, as distinguishing factors, birth, marriage, and/or death ("BMD") dates, BMD places, spouses, and/or last names, and as similarity factors birth date, death date, spouses, and children. For each document (e.g. each family history book), effects of upstream prediction errors (e.g. false positives and false negatives) may be measured to produce confidence scores on person entities extracted based on congruency of the data.

In other embodiments, variations of spelling of particular names (e.g. as compared against an index of names) and/or OCR errors may be accounted for. In yet further embodiments, multiple marriages may be considered such that people with different mothers may be considered distinct individuals.

An outstanding limitation in the field of natural-language processing ("NLP") is the standard limit of 512 tokens imposed by most pre-trained language models, particularly as documents such as family history books may have long-form text exceeding the 512 token limit, which severely limits the ability of any such model to properly capture such data with proper context and comprehensiveness. Workarounds to the 512 token limit are generally computationally demanding and therefore infeasible because of the high cost associated therewith. It has been surprisingly found that context may be advantageously cached so as to remember important entities such as parents, dates, places, etc. that extend beyond the industry-standard 512-token limit, thereby allowing the embodiments to capture the entirety or a substantial entirety of content of a particular portion of a document (such as a free-text segment of a family history book) without incurring infeasibly large computational expenses.

In embodiments, this is accomplished by performing identification of important entity markers, caching the identified entity markers (particularly those between parents and children), and computing a scope (i.e. when to remove the cache). The generated cache can then be used to generate relationships between entities in distinct texts.

FIG. 3C is a block diagram illustrating the third pipeline section 360 of an example process for automated importing and processing document, in accordance with some embodiments. The third pipeline section 360 includes a tree model 362 configured to receive the extracted entities and relationships from the first and second pipeline sections 300, 340, and to generate, edit, or augment one or more genealogical trees therewith. One of more trees may be retrieved as input of the tree model 362 from the individual profile store 210 and tree management engine 260. The third pipeline section 360 includes a tree analysis model 364. The tree analysis model 364 may be configured to retrieve, from a genealogical tree database and/or a cluster database, a genealogical tree pertaining to or including a person of interest, e.g., a person identified from an extracted entity and/or relationship. The genealogical tree database and/or cluster database may be configured as described in at least U.S. Patent Application Publication No. 2021/0319003, published Oct. 14, 2021, U.S. Patent Application Publication No. 2020/0257707, published Aug. 13, 2020, U.S. Patent Application Publication No. 2020/0394188, published Dec. 17, 2020, U.S. Pat. No. 10,938,439, granted Jan. 20, 2015, and U.S. Patent Application Publication No. 2018/0189379, published Jul. 5, 2018, each of which is hereby incorporated in its entirety by reference.

A tree generation model 366 may be configured to generate a tree, where none is identified in the tree analysis model 364, based on the extracted entities and relationships therebetween. A node addition model 368 may be configured to add a leaf or node to an existing genealogical tree identified in the tree analysis model 364, and/or to a genealogical tree generated at the tree generation model 366. A merge tree model 370 may be configured to merge genealogical trees, such as a genealogical tree identified in the tree analysis model 364 and a genealogical tree generated and/or augmented using the tree generation model 366 and node addition model 368. The tree model 362 may be configured to output a genealogical tree 372 based on and/or including the extracted entities and relationships identified in the input 301. One or more nodes of the outputted genealogical tree 372 may be populated with additional details or information extracted from the input 301 and transformed using one or more models described above. The output of genealogical trees 372 may be saved in the individual profile store 210 and tree management engine 260.

Figure 3D:
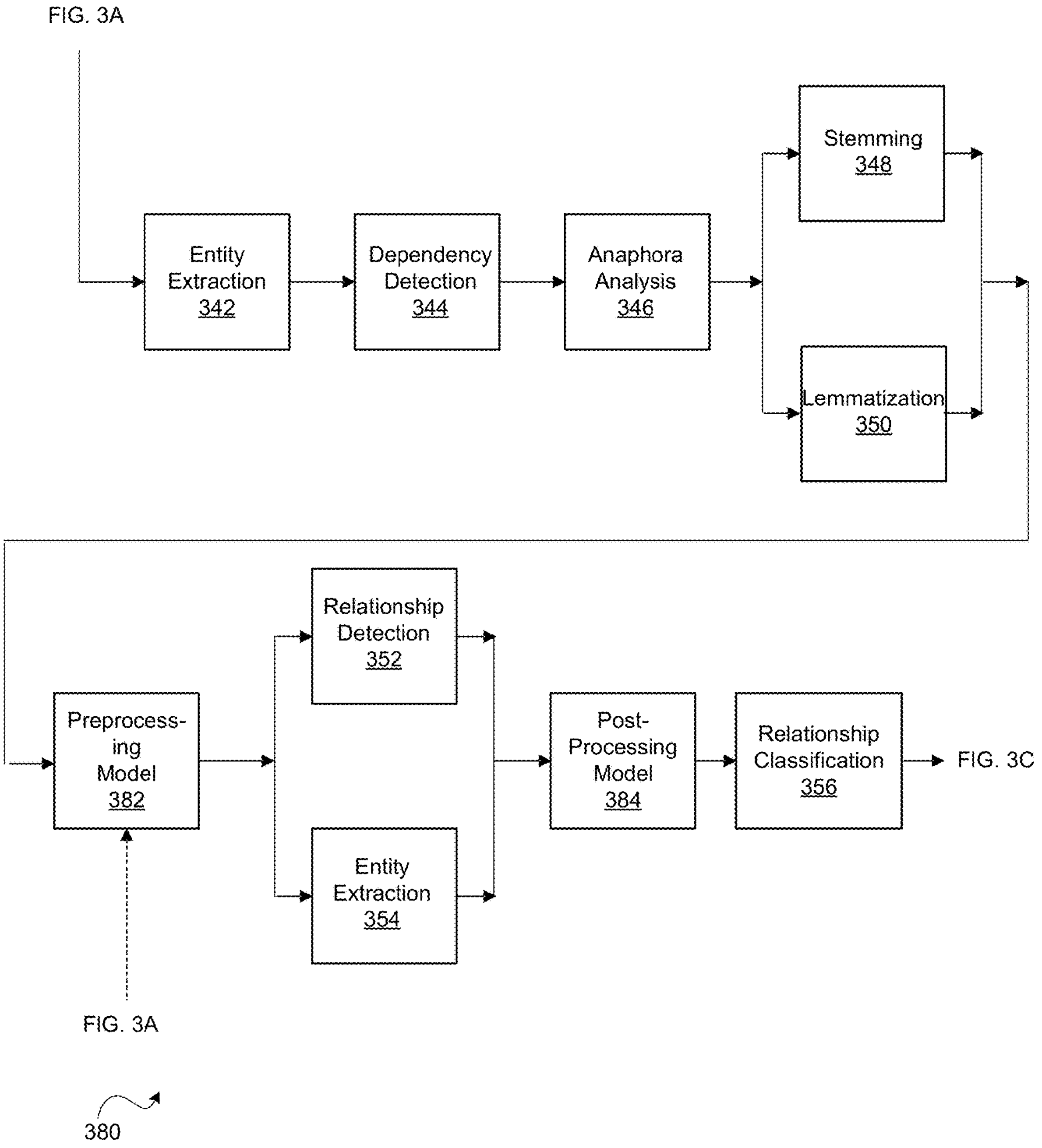
FIG. 3D is a block diagram illustrating another example of a second pipeline section of an example process for automated importing and processing of a document, in accordance with some embodiments.

FIG. 3D is a block diagram illustrating another example of a second pipeline section 380 of an example process for automated importing and processing document, in accordance with some embodiments. The second pipeline section 380 may include, as described above regarding the second pipeline section 340, models/models configured for entity extraction 342, dependency detection 344, anaphora analysis 346, stemming 348, lemmatization 350, relationship detection 352, entity extraction 354, and relationship classification 356.

The second pipeline section 380 may further be configured with a pre-processing model 382. The preprocessing model 382 may be configured to receive an input, e.g., an input such as OCR data, such as OCR-extracted text from the model 304 in FIG. 3A, e.g., segmented page data, such as bounding boxes and associated coordinates, from a segmentation model, such as the model 306 in FIG. 3A. In some embodiments, the segmented page data may have received directly from the segmentation model 306 and/or may be received after the segmented page data has been processed as shown in FIG. 3A and in upstream models of FIG. 3D.

The preprocessing model 382 may be configured to select one or more identified segments to process using the relationship detection and entity extraction models 352, 354. The identified segments may be any one or combination of segments, e.g., a paragraph followed by a list followed by a pedigree chart. Upon identifying segments to process, multiple segments may be combined, e.g., by utilizing the coordinates of the associated bounding boxes. The coordinates of the associated bounding boxes may likewise be used to identify corresponding OCR-extracted text.

The preprocessing model 382 may be configured to select or identify segments for processing based on one or more rule-based heuristics and/or based on or using a machine learned model, such as a recurrent neural network ("RNN"), e.g., a long short-term memory ("LSTM") model. The preprocessing model 382 may determine, for instance, that such segments as headers, graphics, or other components that usually do not have meaningful relationship or entity information to extract should not be selected, whereas lists, paragraphs, and other segments determined to have more-meaningful relationship and entity information may be selected.

A postprocessing model 384 may be configured to resolve pronouns, remove conflicting relationships, add missing relationships, retrieve bounding boxes for extracted entities from OCR-extracted text, or otherwise. The postprocessing model 384 may be configured to resolve pronouns by, for example, removing intermediate pronouns in a detected relationship. Thus, for example, in a paragraph that mentions "Joshua Lazell . . . [was] . . . born at Plymouth 50 September 3719 . . . He married . . . Elizabeth (Prince) Ames . . . ", Joshua Lazell and Elizabeth Prince Ames are extracted as a married couple, with "he" as an intermediate pronoun that refers back to Joshua. Likewise, the paragraph may go on to state "Children, born at Middleborough: Elizabeth, . . . Prince, . . . Mary . . . " with Elizabeth, Prince, and Mary extracted as children of Joshua and Elizabeth.

Pronoun resolution as performed by the postprocessing model 384 may remove "he," and in other examples, other pronouns that may be superfluous, intermediate, confusing, conflicting, or otherwise removable. Postprocessing may entail applying one or more rule-based heuristics, machine learned models, or otherwise to correct relationships extracted by the model that are incorrect. Examples include gender errors (e.g., removing labels from the relationship detection model that classify a person as both a husband and a wife), generational errors (e.g., removing labels from the relationship detection model that classify a person as both a parent and a sibling to a particular child(ren)), missing relationships (e.g., detecting that a reciprocal or inverse relationship between two people is missing, such as the model labeling Joshua as a husband to Elizabeth but failing to also label Elizabeth as a wife to Joshua), and others.

In some embodiments, the postprocessing model 384 may utilize rule-based heuristics and/or machine learned models, or concatenations thereof, to perform one or more of the above-mentioned steps. The postprocessing model 384 may be configured to resolve pronouns, remove conflicting relationships, and/or add missing relationships, and then retrieve bounding boxes from the object detection and/or image segmentation models/components of embodiments for facilitating highlighting of particular elements. For example, the bounding box for a particular entity and/or relationships may be retrieved in order to highlight that particular section of the original page or document from which it was detected to easily guide a user thereto, e.g., in a user interface for reviewing the imported document.

Detecting relationships may entail determining a gender of an entity in order to properly detect the nature of a relationship, which may entail inferring from a downstream relationship label a gender. In some embodiments, bounding boxes for identified entities may be retrieved from the OCR-extracted text data such that a user may visualize where a particular entity is on a page.

The model(s) for importing and transforming family history books and generating genealogical trees therefrom may be trained by providing one or more novel data augmentation and training approaches. It has been found that family history books and other sources of information have diverse categories for which existing object detection algorithms are poorly suited. Even objection detection in text-based contexts focus only on comparatively simple data sets. To address the class imbalance issue in the data set, it has been found that using a weighted loss of the regression and classification loss based on the class label is beneficial. For instance, the model(s) described herein have been found to perform, based on validation data sets and evaluation metrics such as Average Precision ("AP"), to achieve values of AP @0.5 of 308.26, AP @0.75 of 89.41, and COCO AP (an average over the range of threshold values from 0.5 to 0.95 with step size of 0.05) of 86.69.

It has been observed that the AP is inversely related to the class probability threshold, which decreases as the class probability increases. COCO AP captures the average response of the model for different thresholds. The COCO AP for different categories of objects is shown in the Table 2 below.

TABLE 2

| | Title Page | Paragraph | List | Image | Graphic | Page Header | Page sub-header | Page Footer |
|---|---|---|---|---|---|---|---|---|
| Examples in Training Data | 13 | 6535 | 2700 | 80 | 282 | 1093 | 800 | 296 |
| COCO AP | 95.79 | 60.62 | 55.51 | 54.78 | 81.83 | 16.13 | 54.2 | 57.54 |
| | Table | Indexes | Forms | Certificate | Delimiter | Misc. | Blank page | Caption |
| Examples in Training Data | 54 | 57 | 122 | 9 | 217 | 509 | 15 | 46 |
| COCO AP | 66.22 | 88.99 | 99.21 | 70.2 | 42.22 | 68.16 | 97.62 | 16.13 |

As seen the Table 2 above, it has been found that the prevalent categories such as list and paragraphs have AP of about 60, whereas other categories have higher precision despite having fewer examples, which is thought to be due to comparatively little variation in the underrepresented categories versus the high variation in paragraphs and lists. The model(s) of embodiments are able to predict class labels with high confidence and precisely estimate the bounding boxes around the data blocks with minimal overlap, even with variations in the layout of the data, font size, font type, and others. However, when presented with unseen volumes from which no training and validation data were used for training, precision dropped.

Figure 4B:
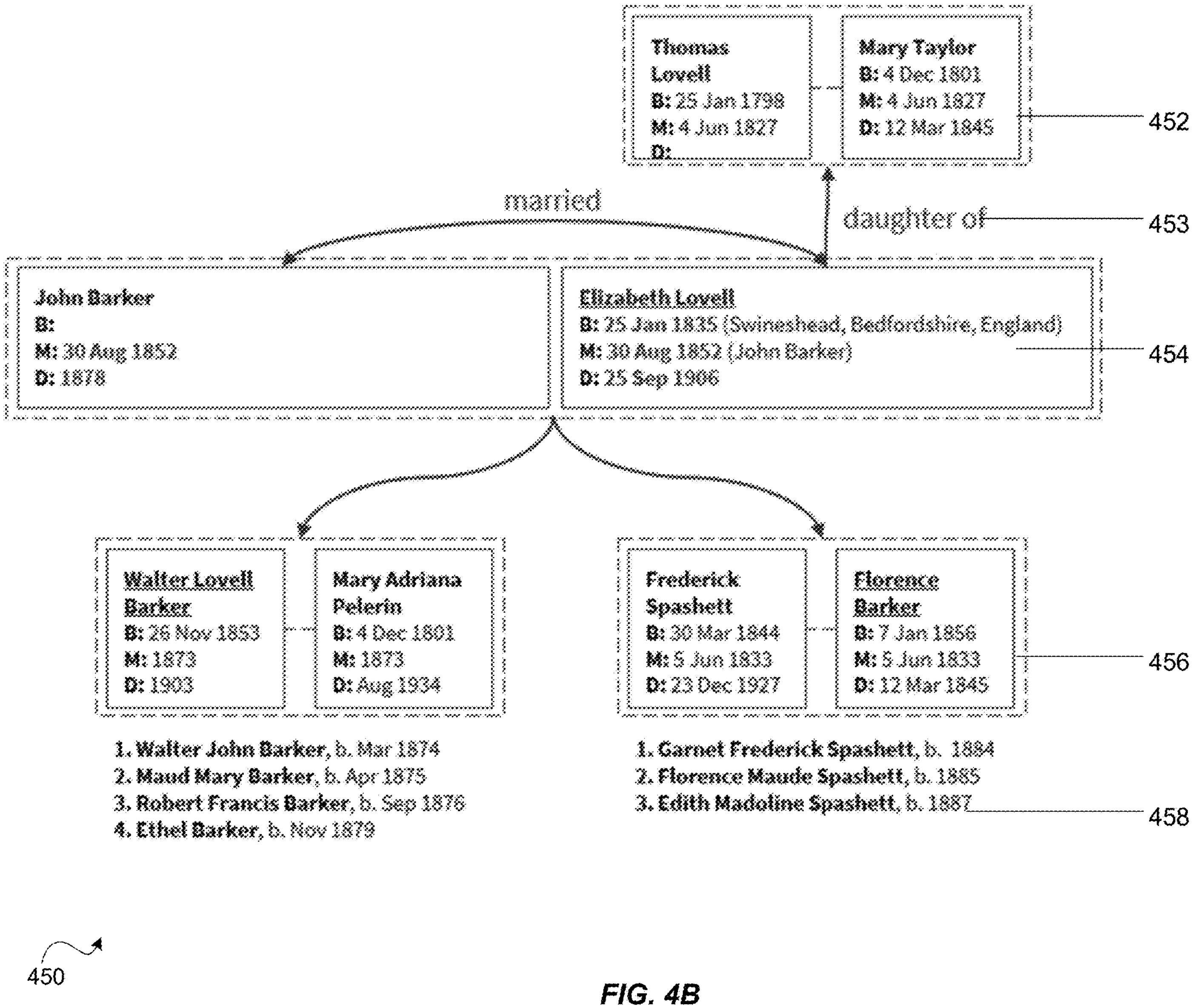
Figure 5E:
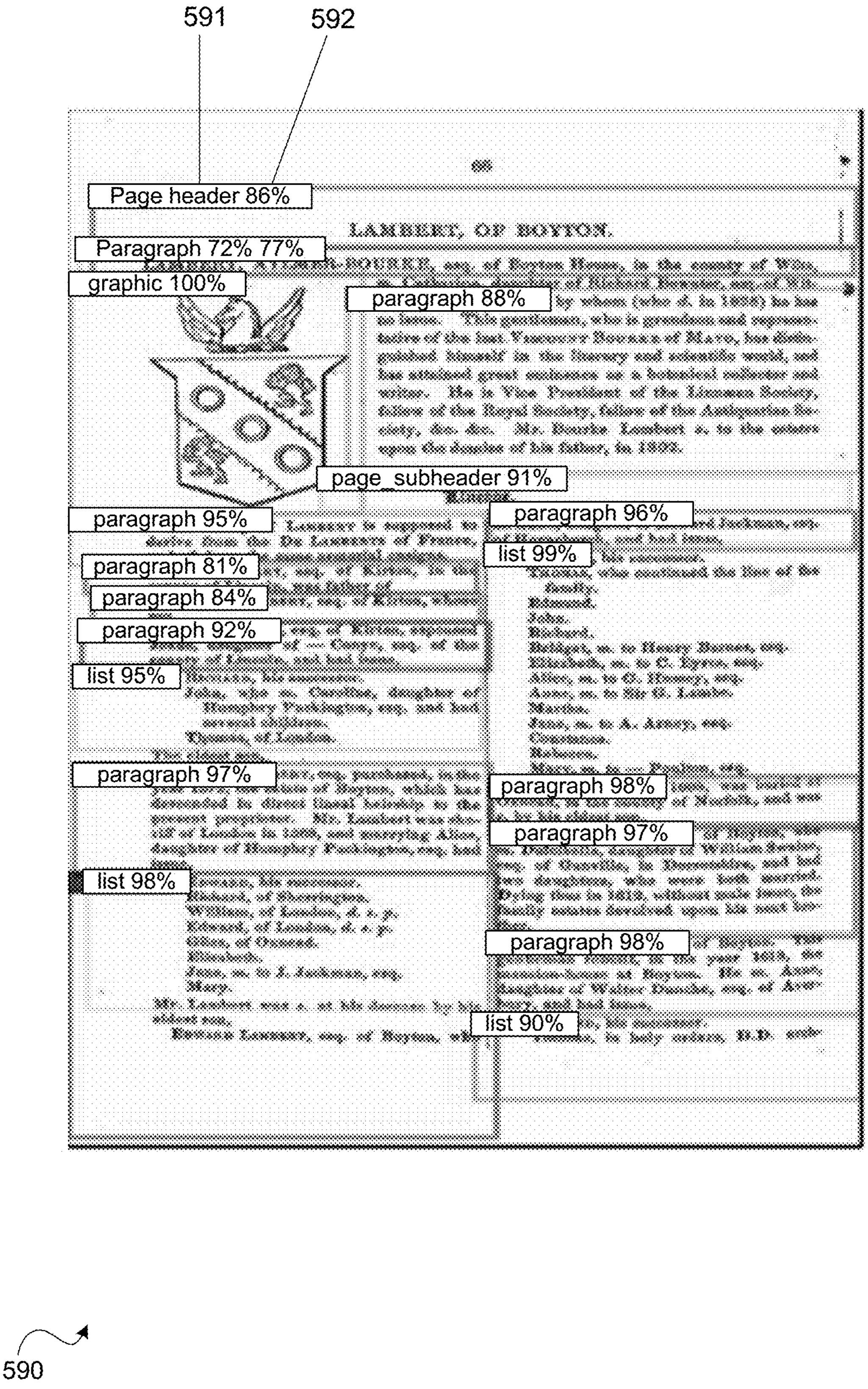

FIG. 4A and FIG. 4B are conceptual diagrams illustrating example historical physical documents digitalized and processed by an importation process, in accordance with some embodiments. As seen in FIG. 4A, an example document 400 is given of a page 402 of a family history book comprising one or more sections 404. The different sections 404 may include a header, a paragraph, a list, or otherwise. The object detection modalities described regarding the embodiments of the present disclosure may be configured to identify, segment, and classify the sections 404 into one or more predetermined categories. The segmented and classified sections 404 may comprise information or data, including entities and relationships therebetween.

For example, as shown in FIG. 4B, an example 450 of extracted entities is shown. Individuals 452 may be identified from the extracted entities, with relationships 453 between the individuals 452 to additional, related individuals 454 automatically determined. For example, Thomas Lovell and Mary Taylor may be determined to be spouses based on extracted data pertaining to the entities, such as the corresponding (e.g., same) marriage dates. Biographical data or any other suitable data associated with the entities may be extracted and considered. Likewise, the related individuals 454 are determined to be married, and one of the individuals, Elizabeth, 454 is determined to be the daughter of the individuals Thomas and Mary 452.

Similarly, the individuals Walter, Florence 456 may be determined to be descendants of the individuals John, Elizabeth 454, with yet further generations 458 of descendants also identified and details pertaining thereto extracted. Such details may include birth dates, marriage dates, death dates, birth locations, marriage locations, death locations, spouses, children, etc. For example, the information in FIG. 4B is automatically extractable by the disclosed embodiments thanks at least in part to the use of the detection, segmentation, and other tools disclosed in some embodiments.

FIGS. 5A, 5B, 5C, 5D, and 5E are conceptual diagrams illustrating example historical physical documents that are processed by an importation process, in accordance with some embodiments. Examples of family history book pages and detection and/or segmentation thereof are shown and described. FIGS. 5A-5E show examples 500, 525, 550, 575, 590 of a page 501 of a family history book. The page 501 has multiple sections, such as a page header section 502 as shown in the example 500, a page sub-heading section 526 as shown in the example 525, a paragraph section 552 as shown in the example 550, a list section 576 as shown in the example 575, and an assortment of objects or sections such as a page header, a graphic, paragraphs, page subheaders, and lists as shown in the example 590. The objects may be assigned a bounding box 591 along with a confidence level 592.

Figure 6B:
Figure 6C:
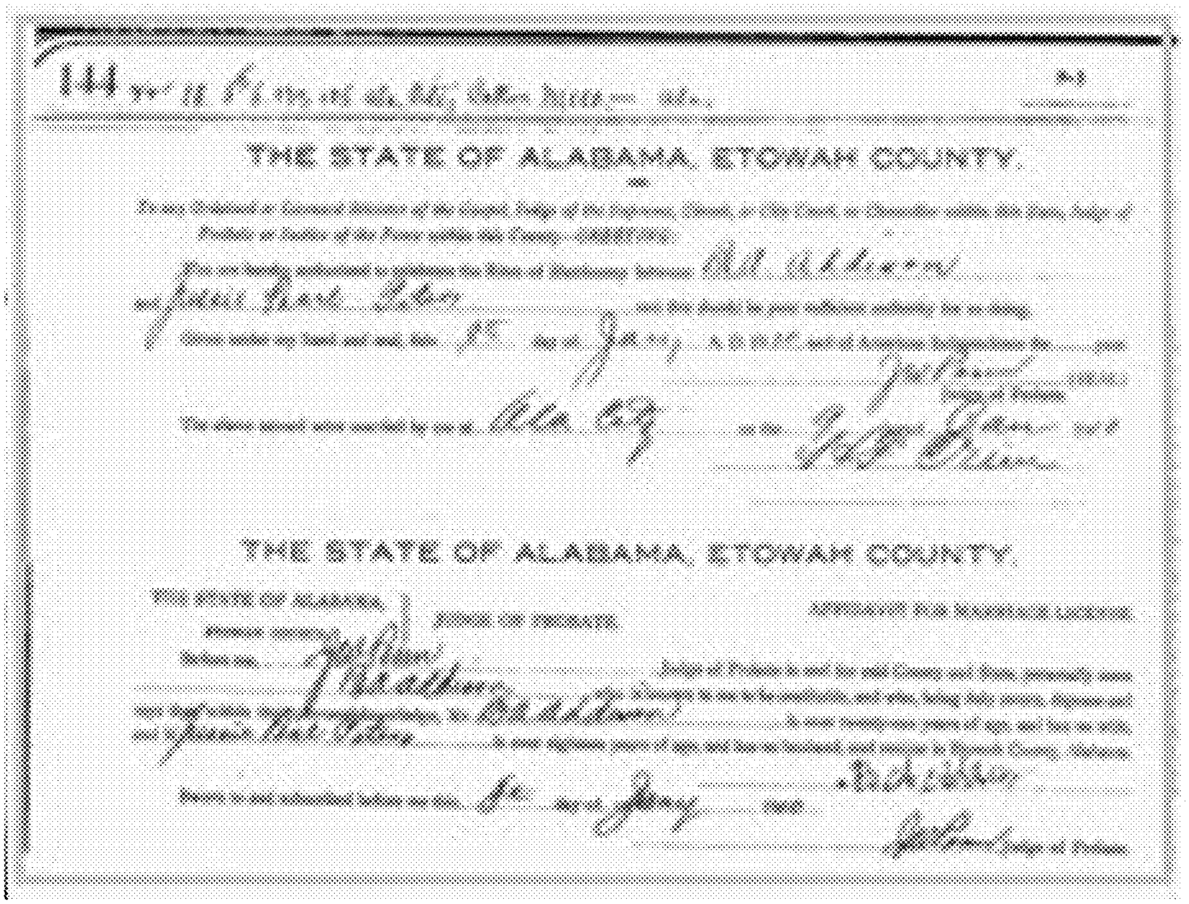
Figure 6D:
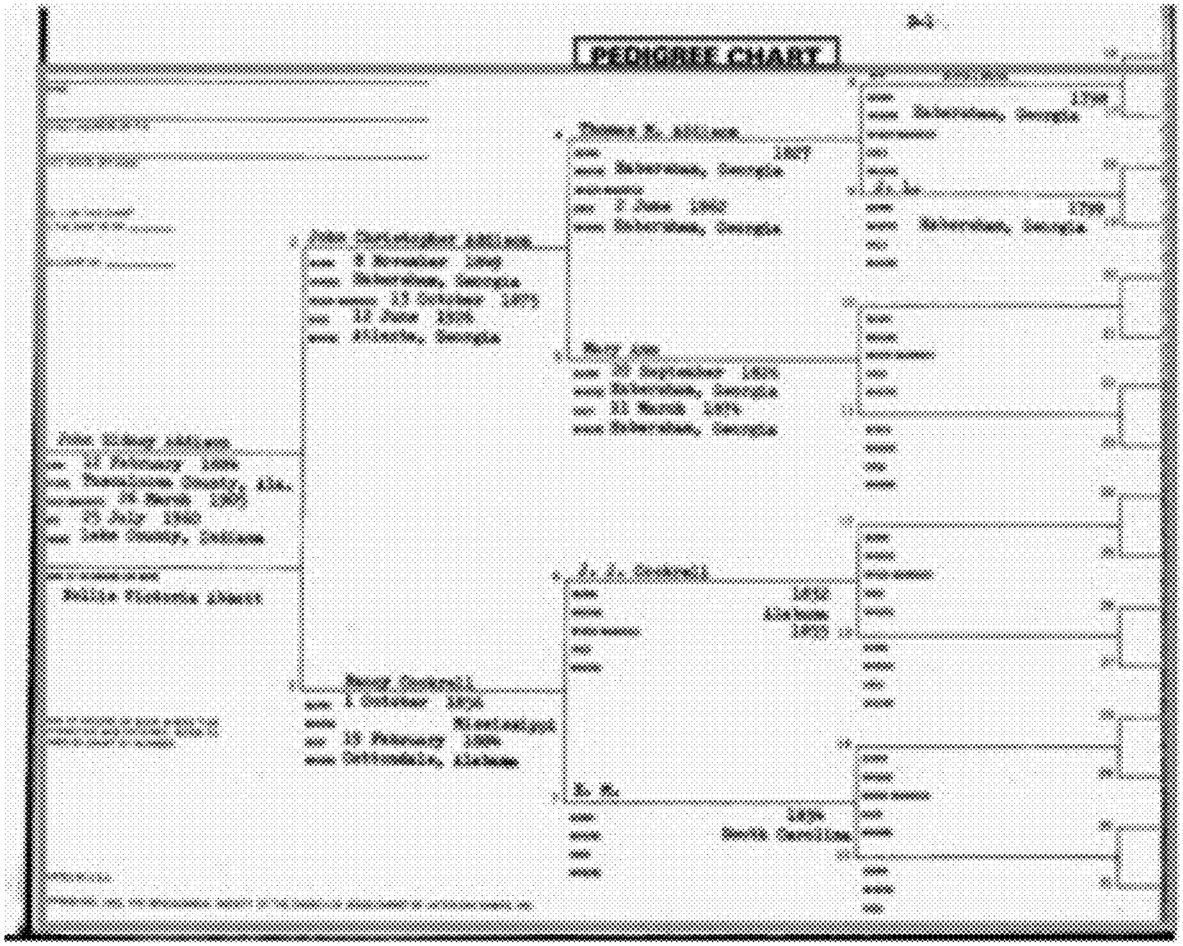
Figure 6F:
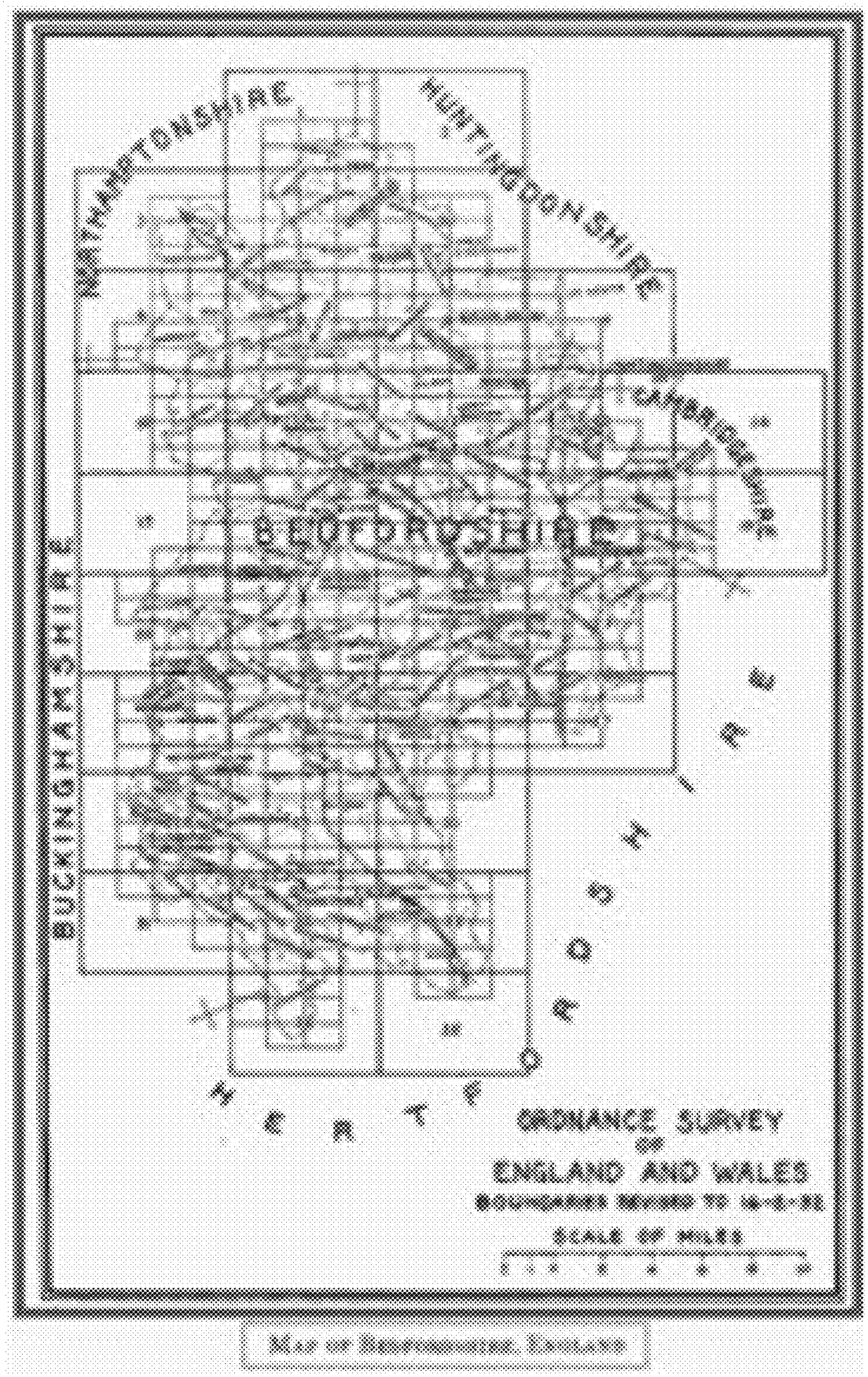
Figure 6G:
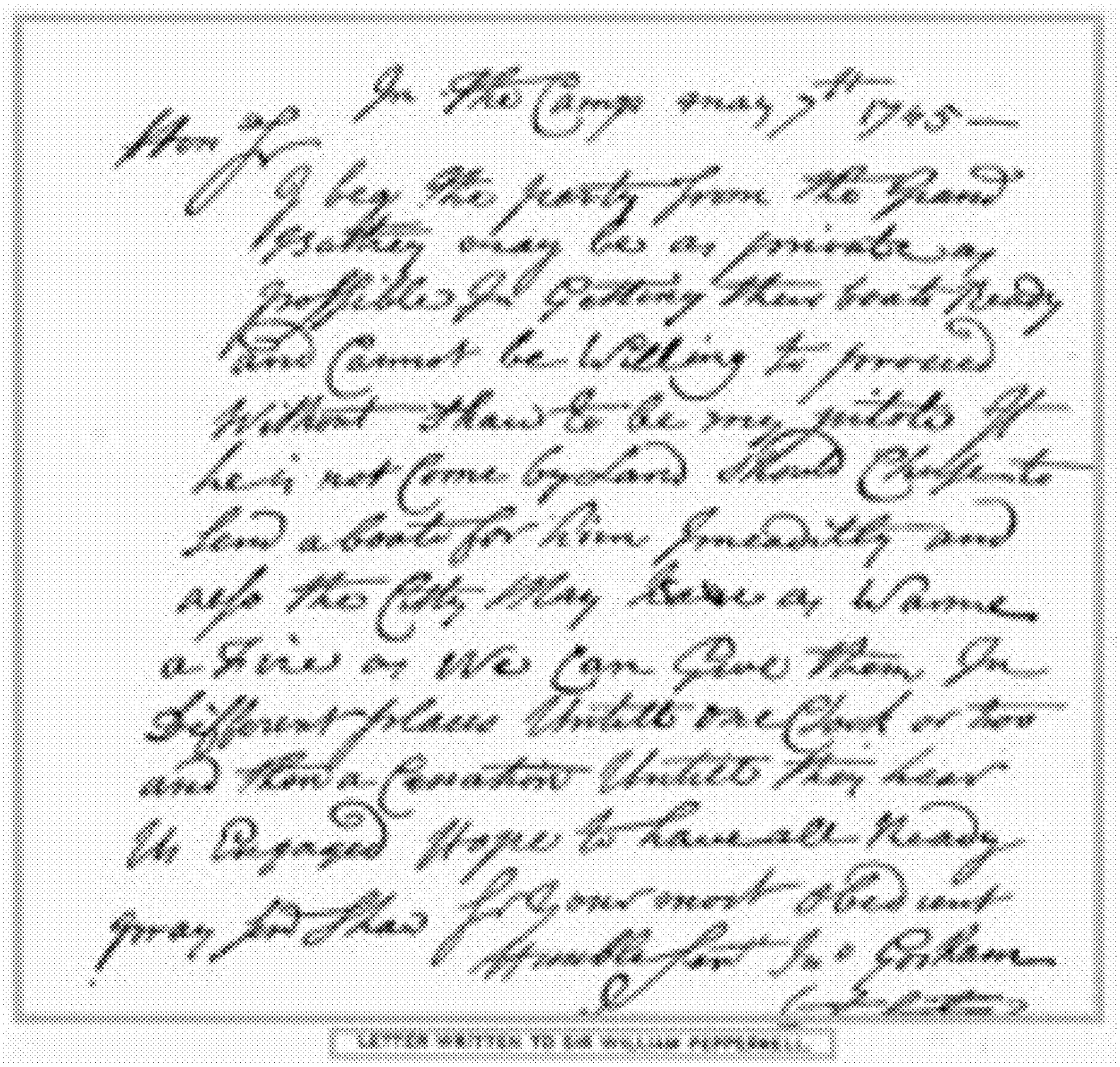
Figure 6I:
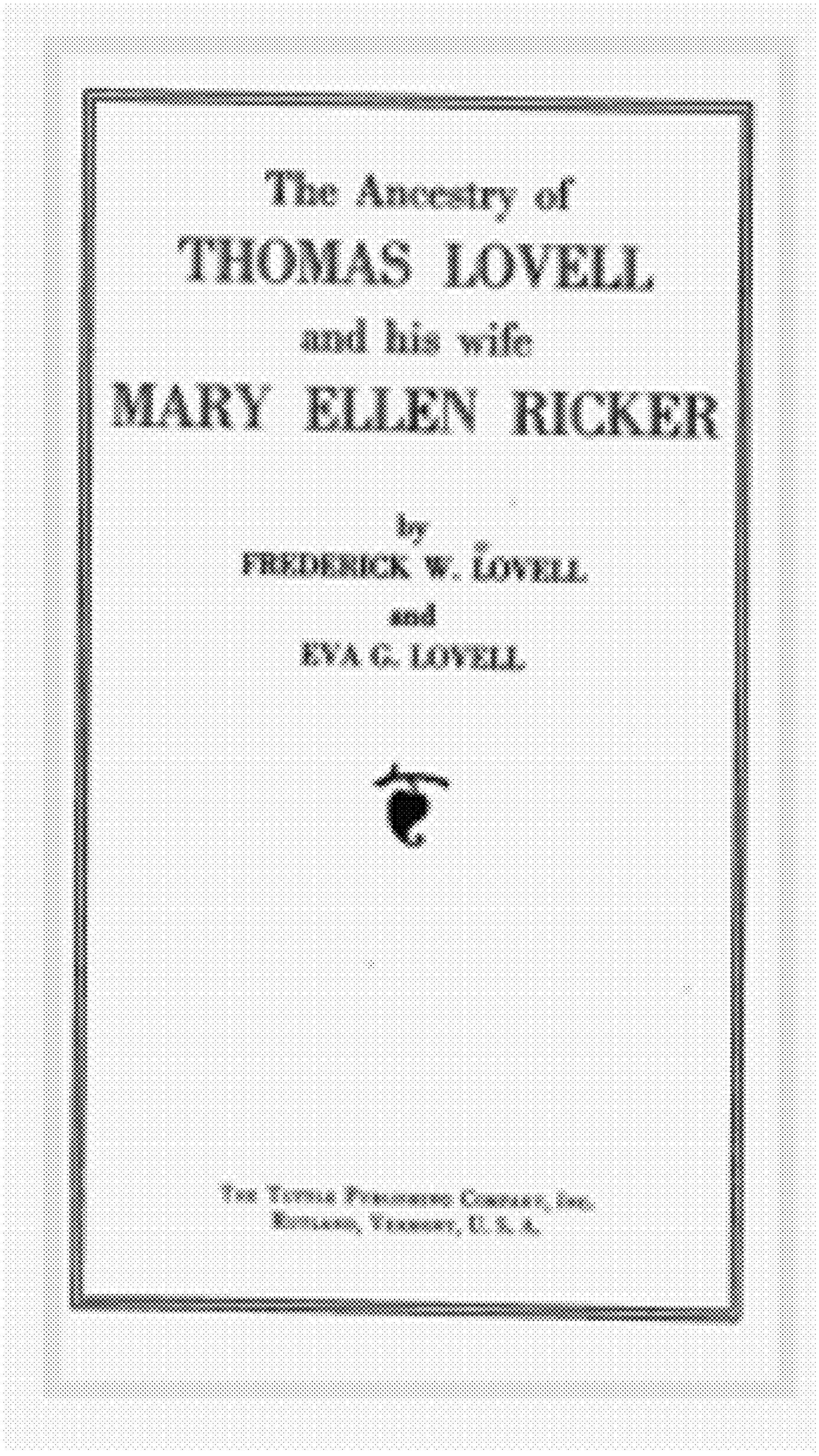
Figure 6J:
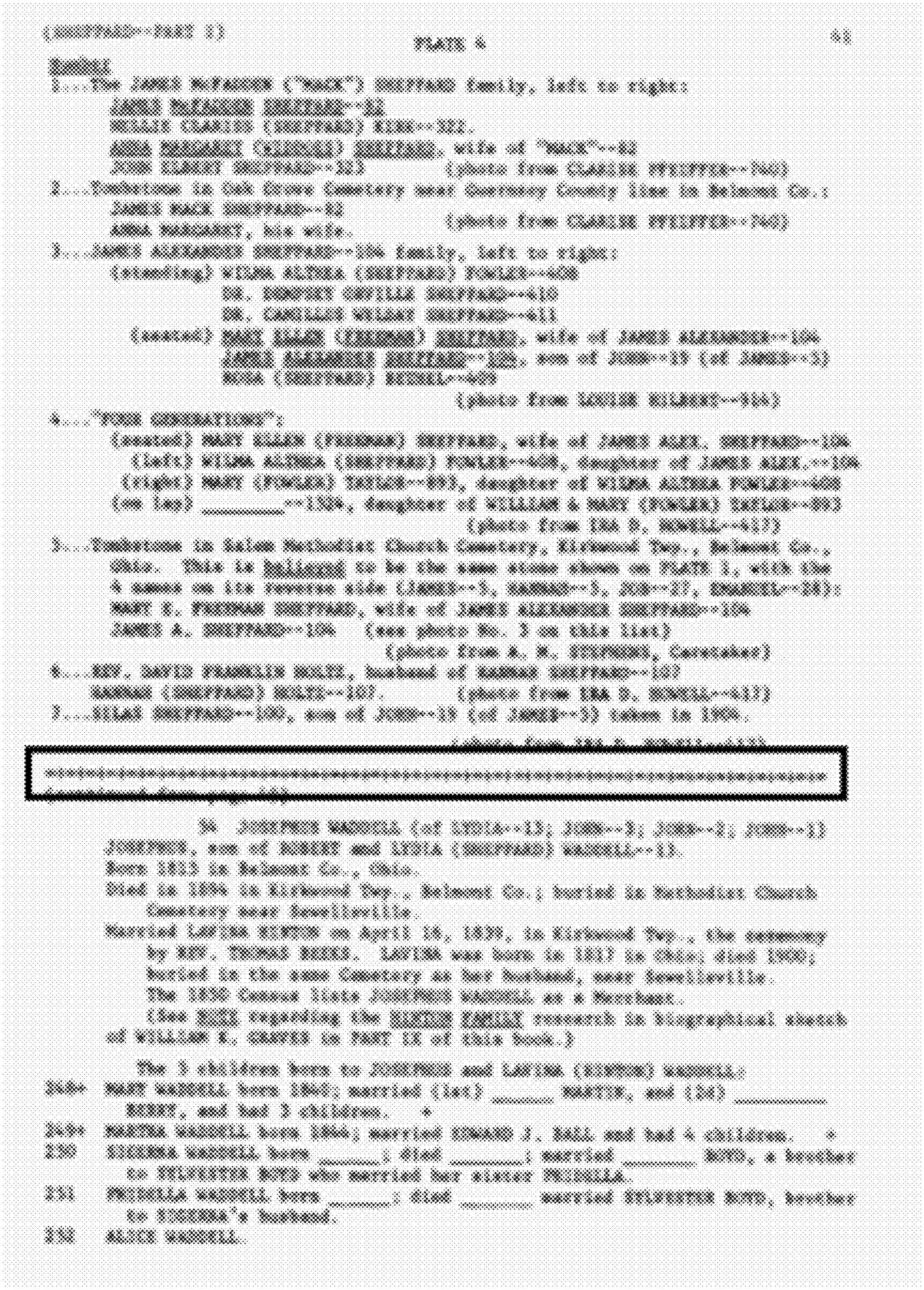
Figure 6K:
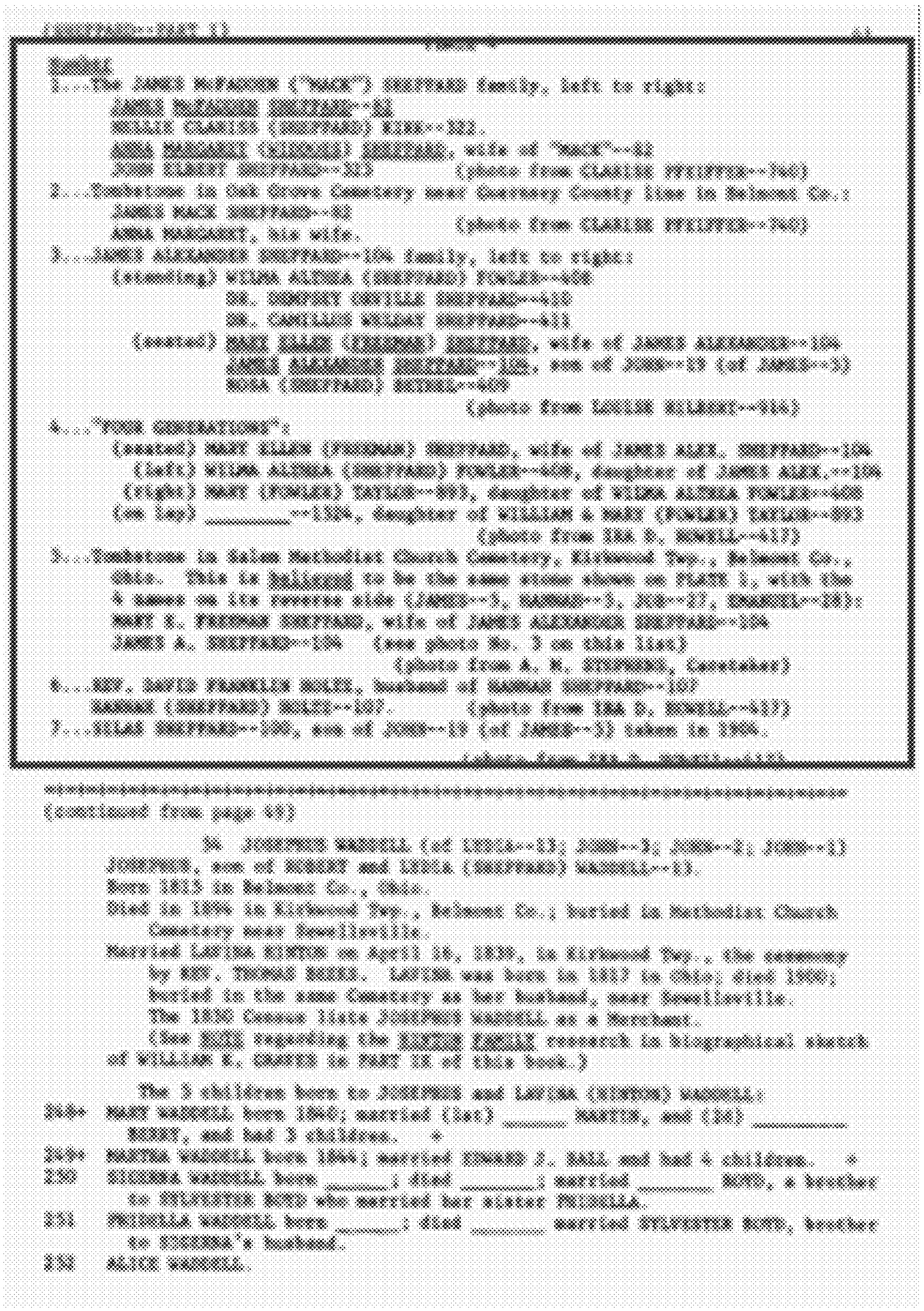
Figure 6L:
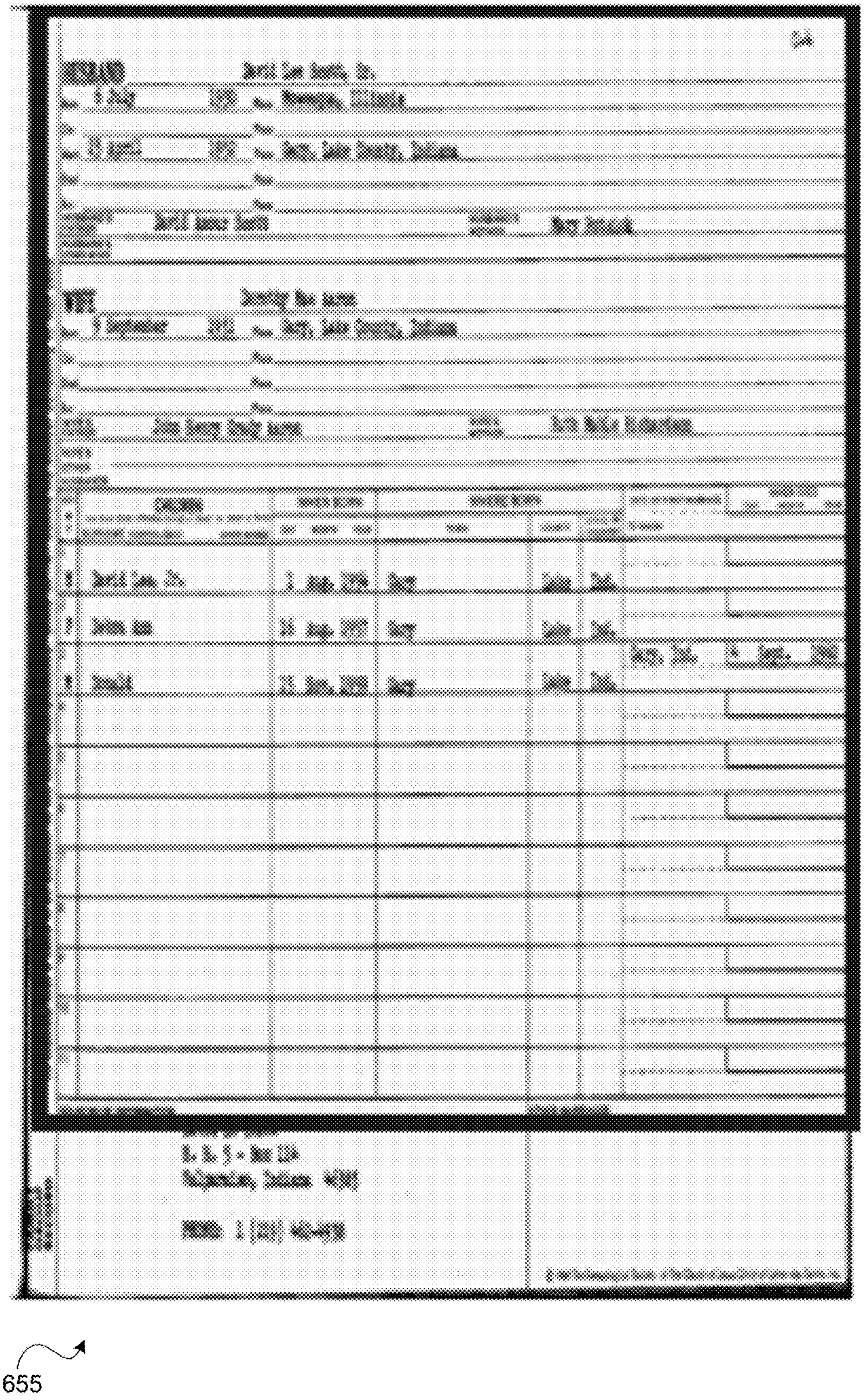

FIGS. 6A, 6B, 6C, 6D, 6E, 6F, 6G, 6H, 6I, 6J, 6K and 6L are conceptual diagrams illustrating additional example historical physical documents that are processed by an importation process, in accordance with some embodiments. Examples of family history book pages and detection and/or segmentation thereof are shown and described. FIG. 6A shows example 600 which includes a table and a corresponding table header. FIG. 6B shows example 605 which includes a plurality of identified images. FIG. 6C shows example 610 which includes an identified certificate. FIG. 6D shows example 615 which includes an identified pedigree chart. FIG. 6E shows example 620 which includes a plurality of identified graphics. FIG. 6F shows example 625 which includes an identified map and a corresponding caption or label. FIG. 6G shows example 630 which includes an identified letter and corresponding label. FIG. 6H shows example 635 which includes an identified index and corresponding index header. FIG. 6I shows example 640 which includes an identified title page. FIG. 6J shows example 645 which includes an identified delimiter. FIG. 6K shows example 650 which includes an identified miscellaneous section. FIG. 6L shows example 655 which includes an identified form.

It has been found that novel data augmentation strategies and/or bootstrapping strategies can be used to increase the variation in the training data. The model(s) of embodiments may be bootstrapped by selecting about 1000 images for annotation from approximately 40 different family history books for which the prediction of the model(s) was poor, increasing the number of annotated examples from approximately 2,000 total to approximately 2,900 total, with approximately 2,340 images for training data and approximately 500 images for validation data.

For example, approximately 25 images from each of the 40 different family history books were selected. It has been found that by providing the additional training and validation images from poorly predicted family history books, COCO AP increased from 35.85 to 60.71 on the new validation data. It has been found that selecting a small number of examples from a larger number of volumes increases the model performance substantially, which allows for a reduction in the cost of data labeling, expedites the processing of volumes in the family history book project, and facilitates a faster and strong impact on existing genealogical trees, genealogical tree databases, and cluster or stitched tree databases.

Further, the model(s) trained with the additional training and validation images/data can be used to make predictions on examples from new unseen volumes to detect instances where the model fails to correctly predict the class labels and/or bounding boxes, providing an indication that more variation is required in the data set. This allows for incremental improvement of the model(s), and this bootstrapping process may be concluded when the trained model(s) have achieved a desired or predetermined AP for one or more categories and/or for any randomly selected example from a volume such as a family history book.

Data augmentation strategies allow for achieving at least baseline or even state-of-the-art performance with a limited amount of data, reducing the cost of data labeling, generalizing model parameters to make better predictions on images from unseen volumes, and/or addressing the class imbalance problem, among other benefits. There are no existing approaches to data augmentation methods for text documents and no systematic study on plausible data augmentation strategies. Some strategies for data augmentation in some embodiments may include cut-out (including randomly selecting a rectangular patch in a data block and filling it with random Gaussian noise or some constant intensity), patch-based Gaussian blurring (including smoothing out a randomly chosen patch in the input image with a Gaussian filter of random bandwidth, the degree of smoothness being proportional to the bandwidth of the Gaussian kernel), and/or image-based Gaussian blurring (including smoothing the content in an input image with a randomly selected fixed-bandwidth Gaussian kernel).

Figure 7C:
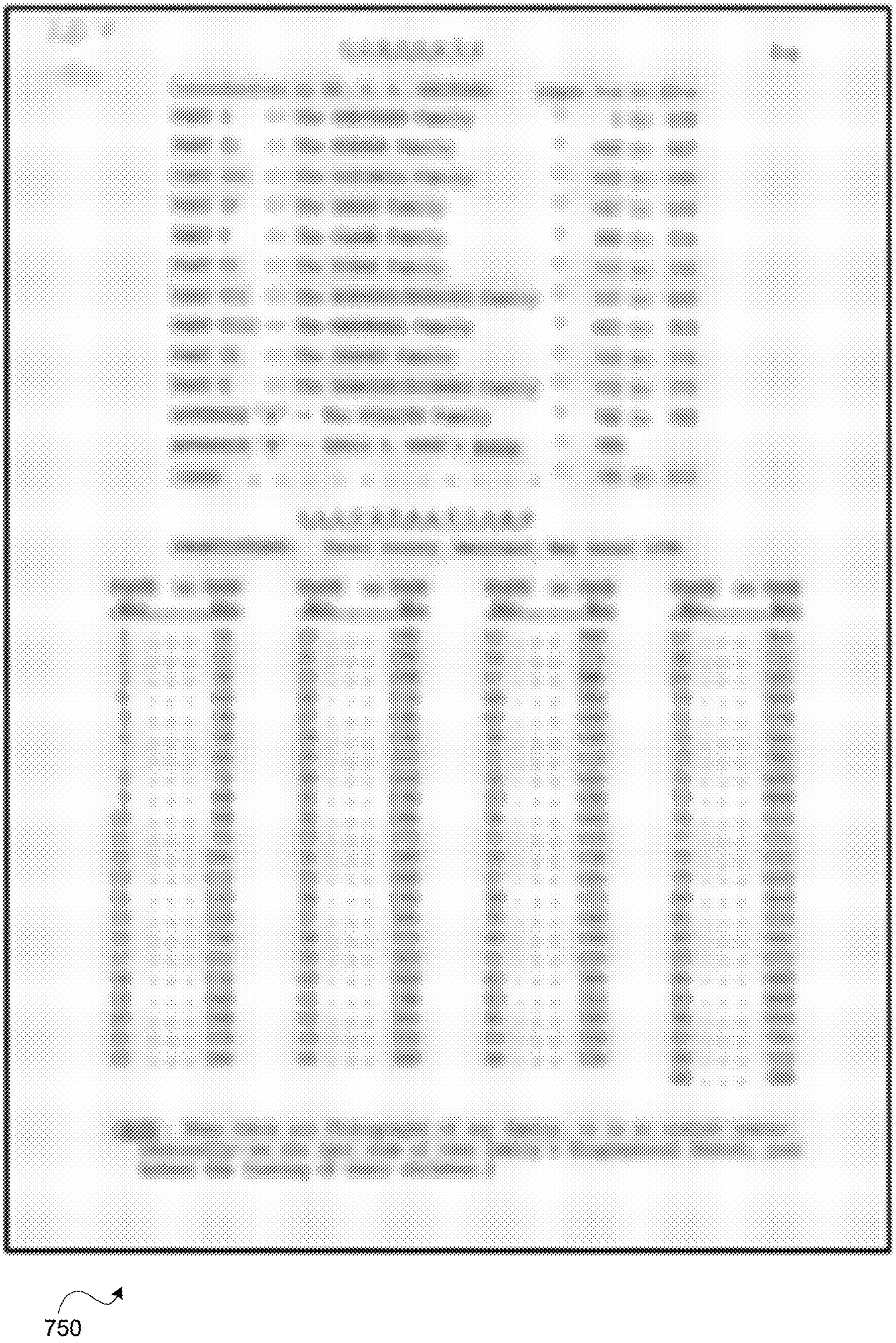

FIGS. 7A, 7B, and 7C are conceptual diagrams illustrating example historical physical documents that are processed by cut-out augmentation methods, in accordance with some embodiments. The cut-out augmentation methods may be applied to training samples of various document processing models described in FIG. 3A through FIG. 3D. In cut-out augmentation methods, random patches from each category (e.g., header, sub-header, paragraph, and/or list) are selected and filled up with Gaussian noise or constant intensity at random, as seen in example 700 of FIG. 7A. This advantageously is a good regularizer of model parameters. In example 725 of FIG. 7B, patch-based Gaussian blurring may be used in some embodiments to smooth out content of a randomly chosen patch in an input image using a Gaussian filter of randomly chosen bandwidth. This takes away valuable information from the input image, a phenomenon likely to occur when recovering data from damaged historical records. In example 750 of FIG. 7C, image-based Gaussian blurring may be used in some embodiments, where a fixed bandwidth Gaussian kernel is randomly chosen and used to smooth the content in the input image. The smoothness depends on the bandwidth of the Gaussian kernel.

Other data augmentation strategies contemplated by the disclosure include compositing examples using statistical evaluation of features in the data. A unique feature of text document images is the substantial lack of overlap between objects. This feature, it has been found, may be used to study the distribution of the height of a particular class of annotated examples (such as paragraphs), and then determine therefrom the height of underrepresented examples. For example, because the height of annotated images is not fixed, a normalized height of the classes in a set of examples may be determined and a frequency distribution of the heights can be obtained. In an embodiment, a height in the Zoneman coordinate system may be used to map the image height to a fixed value, and thereby normalize the height.

Figure 8A:
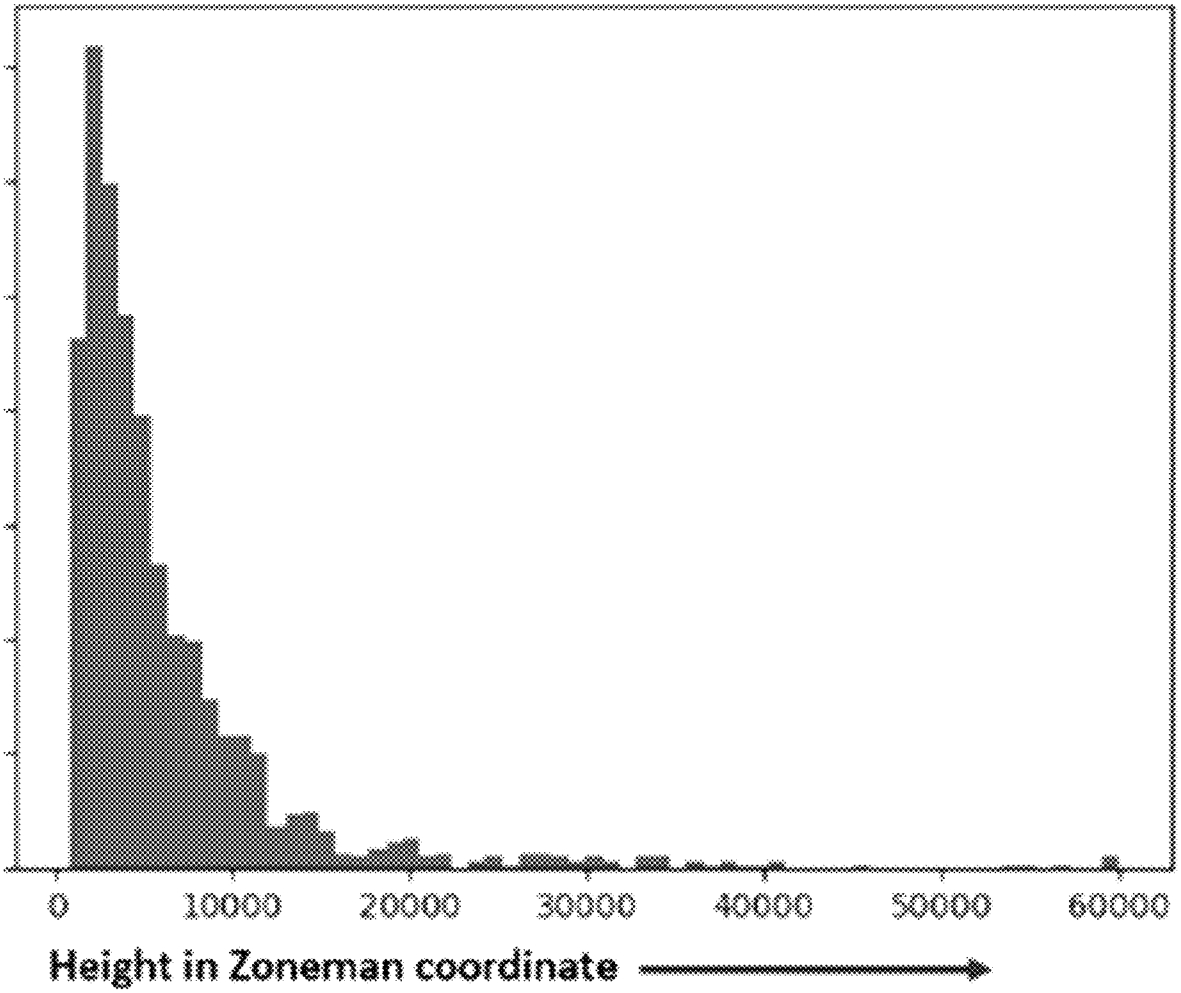
FIGS. 8A, 8B, 8C are conceptual diagram illustrating applying various statistical distributions in performing training of various document processing models, in accordance with some embodiments.
Figure 8B:
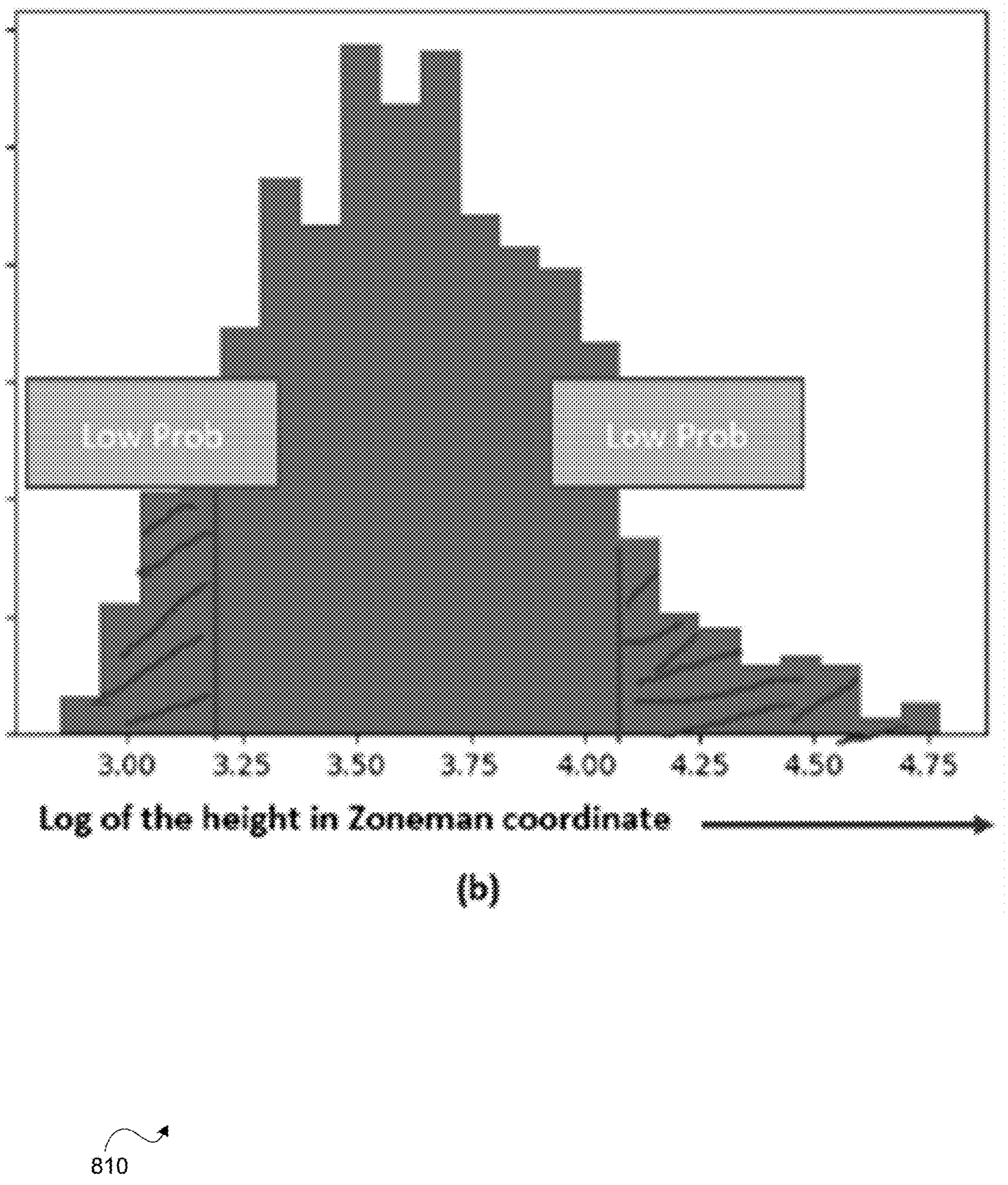
Figure 8C:
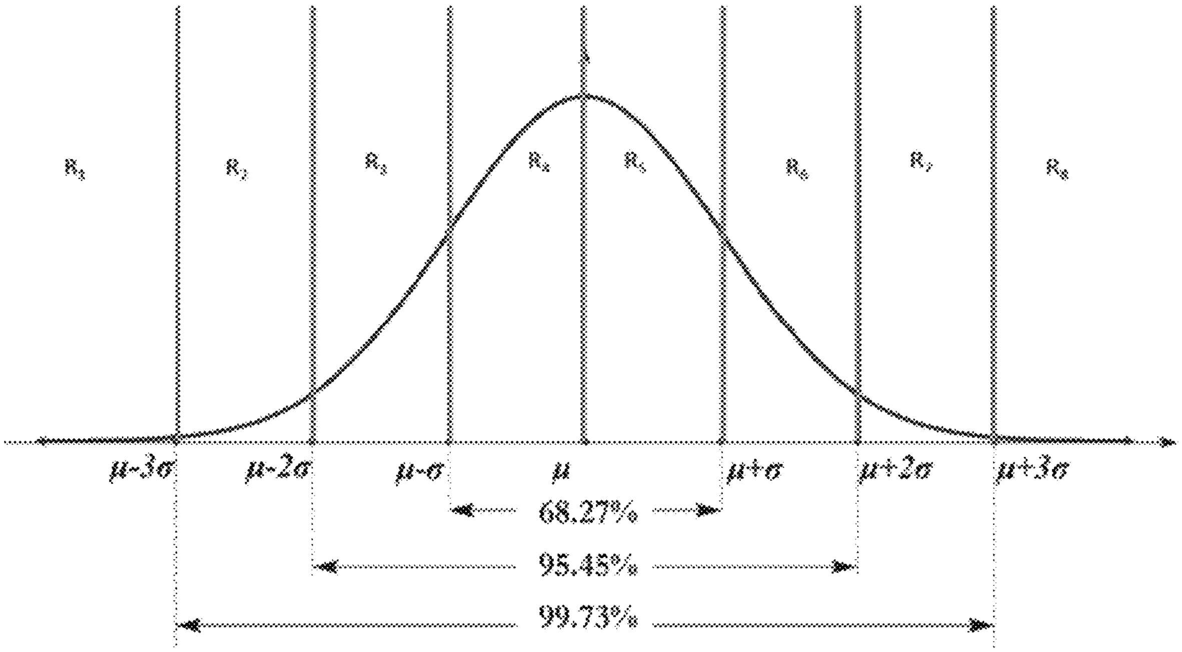

FIGS. 8A, 8B, 8C are conceptual diagram illustrating applying various statistical distributions in performing training of various document processing models, in accordance with some embodiments. As seen in FIG. 8A, a frequency distribution 800 of heights of an object class, in this case paragraphs, is shown, which distribution takes the form of a long-tailed distribution with few long and skinny paragraphs. In some embodiments where the frequency distribution is a long-tailed distribution, a log transformation of the distribution may be performed to yield an approximate Gaussian distribution. This is shown in the distribution 810 of FIG. 8B, which is more informative to detect low probability samples, e.g., skinny and/or long paragraphs.

Figure 8D:
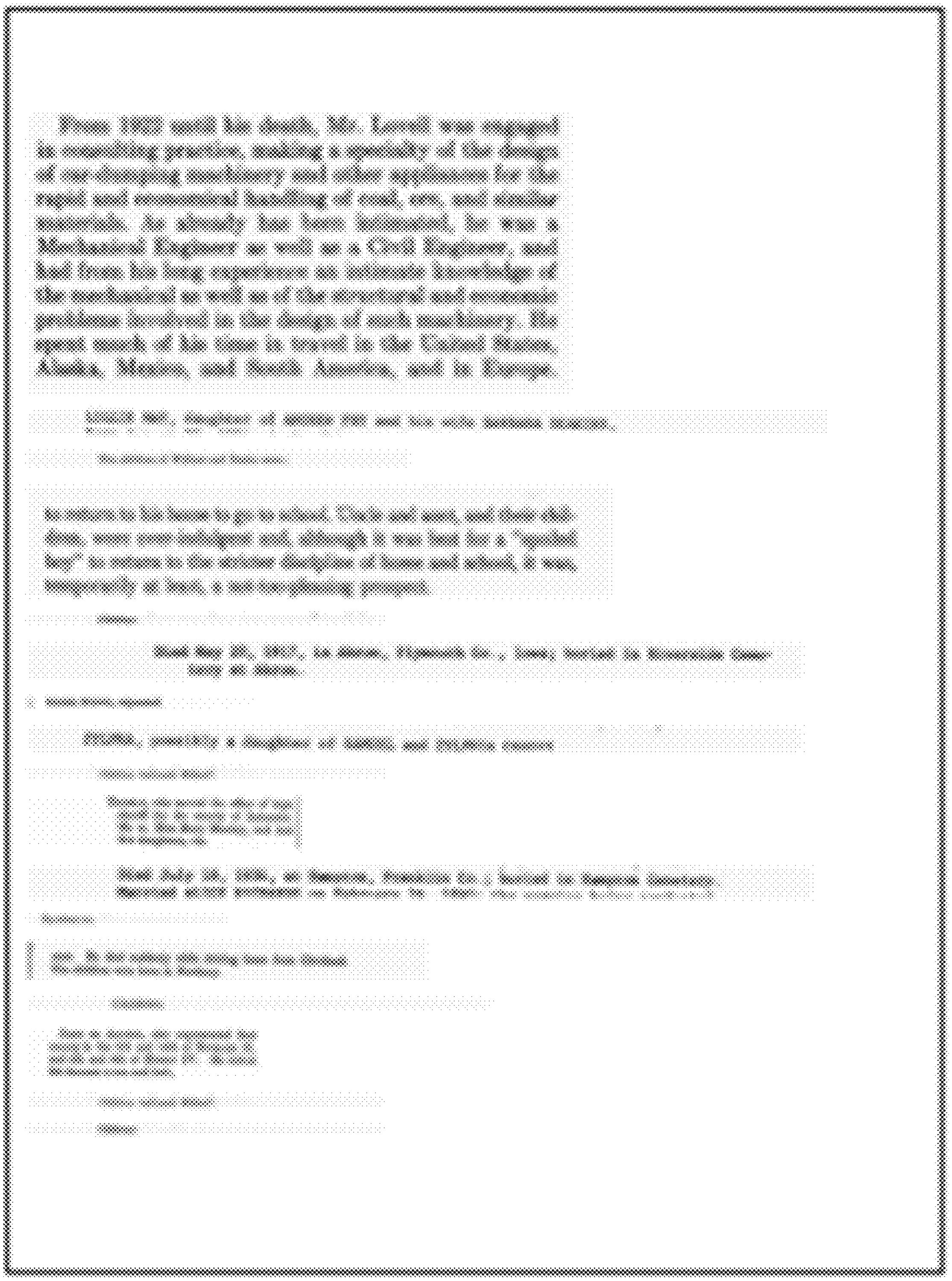
FIG. 8D is a conceptual diagram illustrating paragraph lengths for an example historical document, in accordance with some embodiments.

One or more intervals or bands may be determined within the distribution using three-Sigma rule for Gaussian distribution in one dimension (e.g., 85%, 95%, 99%) to produce an interval-based frequency distribution of paragraph heights, for example. An example 820 is shown in FIG. 8C. Inverse document frequency may be utilized to give greater weight or importance to less-likely events, e.g., paragraph heights in bands R1 and R8. After computing the inverse of the frequency, the values may be normalized by the sum so as to represent a probability distribution, from which sampling may be performed. This technique may be performed for one or more of the data categories identified from family history books. FIG. 8D is a conceptual diagram illustrating paragraph lengths for an example historical document, in accordance with some embodiments. As a result, and as seen in example 830 of FIG. 8D, the less-frequently occurring short and long paragraphs, are selected relatively more than the average-sized paragraphs. Variations can be generated by fusing information from multiple categories, e.g., paragraphs and lists.

Figure 8E:
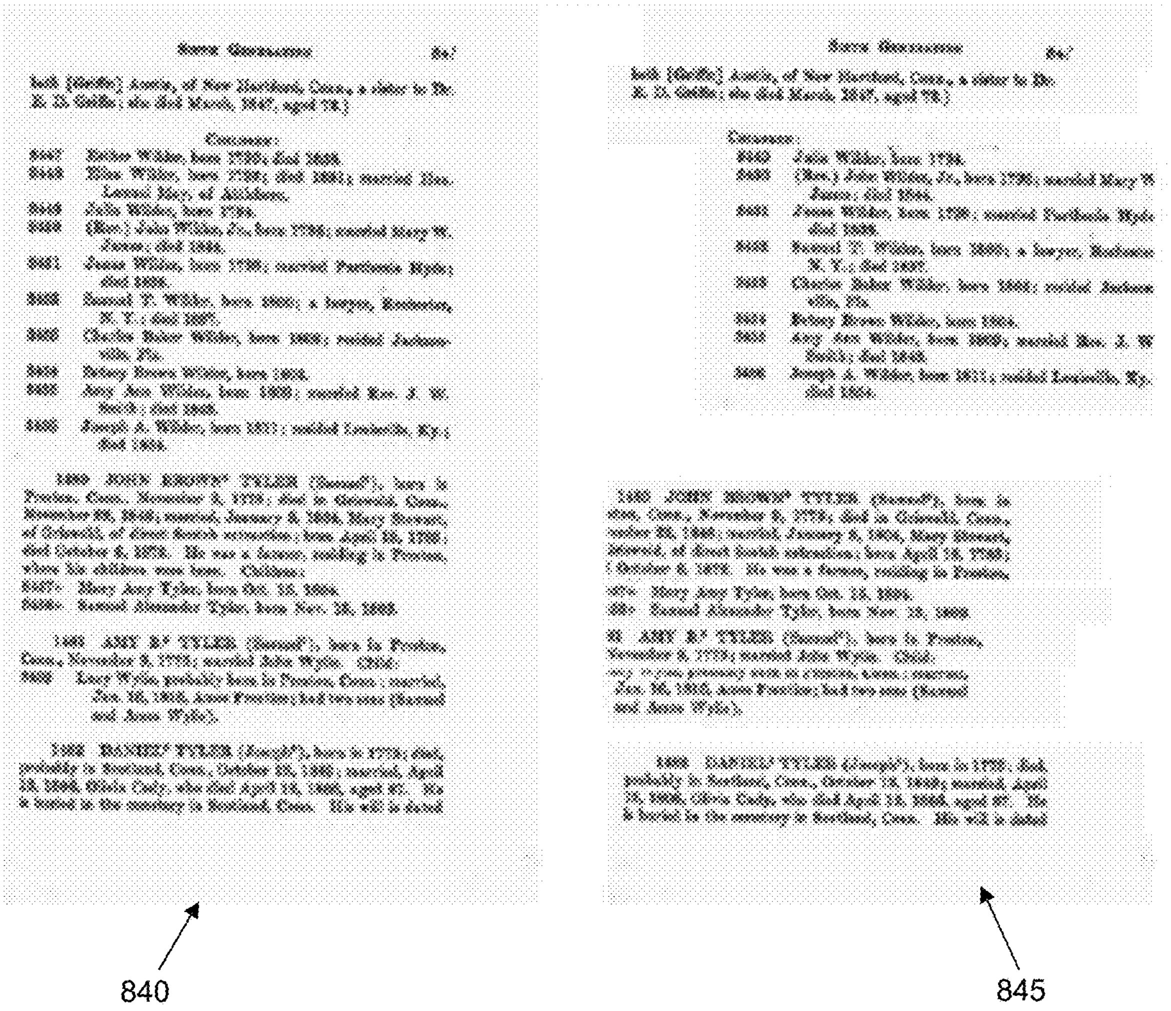
FIG. 8E is a conceptual diagram illustrating pre-processing of training samples in generating models with better results, in accordance with some embodiments.

FIG. 8E is a conceptual diagram illustrating in preprocessing training samples in generating models with better results, in accordance with some embodiments. Another data augmentation technique contemplated by the disclosure includes breaking the correlation in the layout of the data blocks of an image. For example, data blocks are shifted randomly X and/or Y axes so that the indentation details acting as the marker for the start of, e.g., a paragraph, list, or other category are no longer preserved in the image. This allows for breaking the correlation between data blocks, forcing the network(s) to look for other important features that facilitate correct prediction of the class labels and bounding boxes for all categories and not to be hamstrung by damaged or inconsistent historical documents where simple patterns of a list usually starting to the right of a starting point of a paragraph are not followed or present. In FIG. 8E the original document 840 is shifted as seen in the augmented document 845. The technique may be applied to various training samples in training various document processing models described in FIG. 3A through FIG. 3D.

Another data augmentation strategy includes transforming the OCR-extracted data from an image and synthesizing new examples by changing the font size, font type, and layout of the data blocks in the original data, fusing information from multiple OCR-extracted data, and others.

Figure 9A:
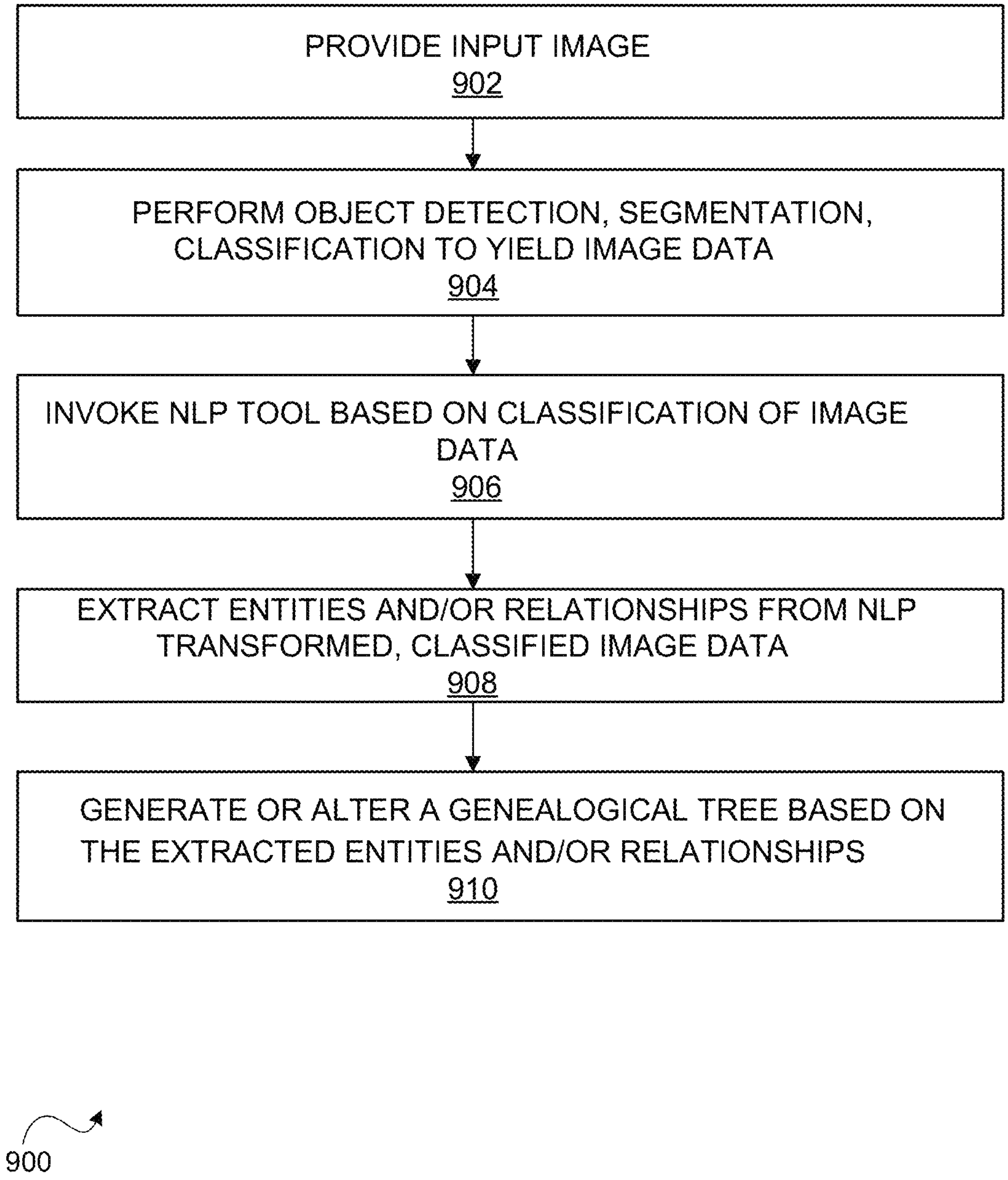
FIG. 9A illustrates a method for generating or altering a genealogical tree based on an input such as a family history book.

FIG. 9A illustrates a method 900 for generating or altering a genealogical tree based on an input such as a family history book. The method 900 includes a step 902 of providing an input image. The input image may be any suitable image, such as from a family history book, local and community history books, yearbooks, newspapers, wills and probates records, historical records, modifications, equivalents, and/or combinations thereof, and others. The method 900 includes a step 904 of performing object detection, segmentation, classification to yield image and processed data. The various models used in step 904 are illustrated and further explained in FIG. 3A. The method 900 also includes a step 906 of invoking various natural language processing (NPL) tools based on classification of image data, such as various NPL models used in FIG. 3A through FIG. 3D. The method 900 also includes a step 908 of extracting entities and relationships from NLP transformed and classified image data. The name entity and relationship extraction are further described in FIG. 3B and FIG. 3D. The method 900 also includes a step 910 of generating or altering a genealogical tree based on the extracted entities and relationships. Further detail of generating or altering a genealogical tree is discussed in FIG. 3C.

By providing a system, method, and/or computer-program product for importing documents such as family history books, the problem of existing objection detection and NLP approaches being ill-suited to the challenges inherent in performing NLP on complex documents, such as genealogy-, law-, finance-, science-, government-, and/or transaction-related documents, is advantageously addressed. Documents imported and transformed according to the disclosed embodiments may be made searchable within, say, a genealogy database or a genealogical research services such that a user performing research about an ancestor can search within the database generally, within a collection of imported family history books specifically, or within a particular family history book, for an ancestor based on one or more of name, location, place, time, etc. Indexed pages and objects of an imported document, for example, can be returned as search results to a user of, say, a genealogical research service. Entities and relationships extracted from an imported document may be linked to a larger database, such as a cluster database and/or a genealogical tree database.

Document importing embodiments may be configured to perform, e.g., entity resolution across pages so as to recognize the same person in different places of a book/document and/or in different documents and/or in linked resources such as a genealogical tree database. Entity resolution methodology may include any of the methods described in, e.g., U.S. Patent Application Publication No. 2020/0394188, published Dec. 17, 2020, and U.S. Pat. No. 11,347,798, granted May 31, 2022, U.S. Patent Application Publication No. 2021/0319003, published Oct. 14, 2021, and/or U.S. Patent Application Publication No. 11,321,361, granted May 3, 2022, which are hereby incorporated by reference in their entirety.

A genealogical tree generated according to the disclosed embodiments may advantageously be added to a genealogical tree database, merged with an existing tree in a genealogical tree database, edited by a user, or otherwise. Entities within the generated genealogical tree, such as individual tree persons, may be clustered within a cluster database with other entities likely corresponding to a same person. In this manner, entities and relationships extracted from a document may be advantageously connected to other entities, yielding additional information about tree persons than was available solely from the imported document. Likewise, information extracted from the imported document, including entities and entity-related information such as birthdate and birth location, death date and death location, etc., may be used to modify one or more nodes or edges of an existing database.

Images identified using the disclosed embodiments may be used to cluster pages based on similar or related images and/or to find photographs, illustrations, or other images based on pages. If a user is interested in, e.g., searches for, information regarding a certain town, images extracted from a family history book and related to that town, as well as pages that describe people in that town, can be retrieved. In some embodiments, parts of pages of an imported document may be categorized as, e.g., narratives or stories vs. pedigrees. Abstracts or summaries may be automatically generated for the document.

Figure 9B:
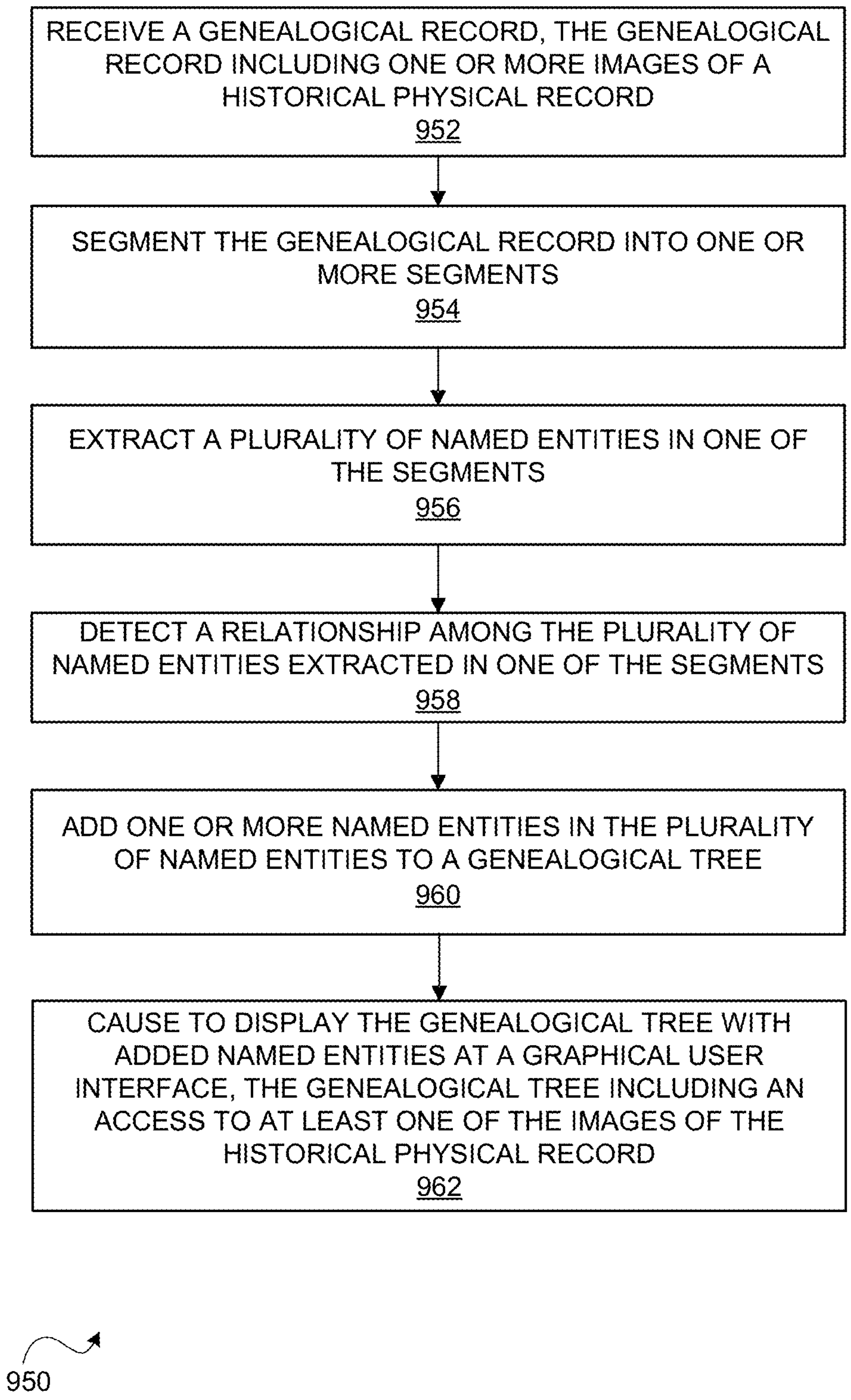
FIG. 9B illustrates a method for connecting a genealogical record to a genealogical tree, in accordance with some embodiments.

FIG. 9B is a flowchart depicting an example process 950 for processing a genealogical record, in accordance with some embodiments. The process may be performed by one or more engines of the computing server 130 illustrated in FIG. 2 or any computing devices that operate various pipelines shown in FIG. 3A through FIG. 3D. The process 950 may be embodied as a software algorithm that may be stored as computer instructions that are executable by one or more processors. The instructions, when executed by the processors, cause the processors to perform various steps in the process 950. In various embodiments, the process may include additional, fewer, or different steps. While various steps in process 950 may be discussed with the use of computing server 130, each step may be performed by a different computing device.

In some embodiments, process 950 can include receiving a genealogical record, the genealogical record including one or more images of a historical physical record (step 952). The genealogical record may include a family history book that includes a plurality of pages. Each page may correspond to one of the images. Example family history book and other genealogical record examples are discussed in FIG. 3A through FIG. 8E. A genealogical record may also be any suitable historical physical record that is digitalized and stored in the genealogy data store 200.

Continuing with reference to FIG. 9B, in some embodiments, process 950 can include segmenting the genealogical record into one or more segments (step 954). The segmenting may include the use of the segmentation model 306 and various other models described in FIG. 3A, including the page wrapping model 308, the form detection 310, the table detection 312, the list detection model 314, the genealogical tree detection 316, and the free-text detection model 318. By way of example, the computing server 130 may identify that two or more segments that are from different images (e.g., two different pages in the historical record) are related. The computing server 130 may connect the two or more segments as a joint segment that is to be processed together, such as by the across-pages model 315A and across-pages model 319A. In some embodiments, the computing server 130 may use one or more document structure detection models to identify one or more types of document structures in the genealogical record. The computing server 130 may generate at least one of the segments based on one of the identified types of document structures. For example, the one or more document structure detection models include the form detection 310, the table detection 312, the list detection model 314, the genealogical tree detection 316, and the free-text detection model 318.

Continuing with reference to FIG. 9B, in some embodiments, process 950 can include extracting a plurality of named entities in one of the segments (step 956). The computing server 130 may use the named entity extraction model 342 to extract the named entity identified in a segment. For example, the computing server 130 may identify a text string that corresponds to a named entity in the segment. The computing server 130 may retrieve data associated with the named entity in the genealogical record. The computing server 130 may match the data to data in a genealogical database to determine that the named entity corresponds to an existing named entity data entity of the genealogical database. For example, the computing server 130 may search for the named entity in the individual profile store 210. In some embodiments, at least one of the plurality of named entities is a deceased historical person, such as an ancestor in a family history book.

Continuing with reference to FIG. 9B, in some embodiments, process 950 can include detecting a relationship among the plurality of named entities extracted in one of the segments (step 958). Further detail in detection of relationship is described in FIG. 3B. By way of example, the computing server 130 may perform an anaphora analysis, a stemming analysis, and/or a lemmatization analysis on data in the one of the segments, such as using the anaphora analysis 346, the stemming model 348, and the lemmatization model 350. The computing server 130 may identify the relationship among the plurality of named entities based on results from the anaphora analysis, the stemming analysis, and/or the lemmatization analysis. In some embodiment, detecting the relationship among the plurality of named entities extracted in one of the segments may include accounting for reciprocity in relationships.

In some embodiments, various machine learning model may be used in performing various steps in the process 950. For example, segmenting the genealogical record into one or more segments may be performed by a first machine learning model, extracting the plurality of named entities in one of the segments may be performed by a second machine learning model, and detecting the relationship among the plurality of named entities may be performed by a third machine learning model.

Continuing with reference to FIG. 9B, in some embodiments, process 950 can include adding one or more named entities in the plurality of named entities to a genealogical tree (step 960). Further detail of the step 960 is described in FIG. 3C. By way of example, the computing server 130 may retrieve an existing genealogical tree from, for example, the individual profile store 210 or the tree management engine 260. The computing server 130 may identify that the existing genealogical tree includes a first named entity that is one of the plurality of named entities extracted in the one of the segments. The computing server 130 may a second named entity of the plurality of named entities as a node of the existing genealogical tree based on the detected relationship between the first named entity and the second named entity. The augmented genealogical tree may be stored back to the individual profile store 210. In some embodiments, the computing server 130 may also generate a new genealogical tree. The computing server 130 may add the plurality of named entities as nodes of the new genealogical tree based on the detected relationship among the plurality of named entities. In some embodiments, the computing server 130 may also merge the new genealogical tree to an existing genealogical tree.

Continuing with reference to FIG. 9B, in some embodiments, process 950 can include causing to display the genealogical tree with added named entities at a graphical user interface, the genealogical tree including an access to at least one of the images of the historical physical record (step 962). For example, for one of the nodes in the tree that is automatically added by the computing server 130 based on the genealogical record that is processed, an end user may click on the node. The tree may indicate that the node (e.g., family member) is automatically added by the computing server 130 based on a certain historical record, such as a family history book, and provide an image of the family history book. In some embodiments, the graphical user interface may also have a link so that the user can select the link to further review details (e.g., extracted text, determined relationships, and original images) of the genealogical record that resulted in the added node.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, various segmentation, division, and document structure type detection tasks performed by the full page segmentation model 306, the page wrapping model 308, the form detection model 310, the table detection 312, the list detection model 314, the genealogical tree detection 316, and the free-text detection model 318, the named entity extraction and relationship detection tasks performed by the named entity extraction model 342, dependency detection model 344, the anaphora analysis 346, the stemming model 348, the lemmatization model 350, the relationship detection model 352 and the entity extraction model 354, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to identify named entities, the training samples may be other historical records' text with named entities labeled. The labels for each training sample may be binary or multi-class. In training a machine learning model for detecting a document structure, the training labels may include a positive label that indicates a certain area is the targeted document structure and a negative label that indicates other areas are not the targeted structure. In some embodiments, the training labels may also be multi-class such as identifying the type of document structure in a particular segment in the training sample.

By way of example, the training set may include multiple past records, such as other historical genealogical record images that have been manually processed to identify the segments there, the type of document structures in the records, interrelationships among those document structures, named entities (e.g., natural persons) already identified, and/or the relationships among those named entities. Each training sample in the training set may correspond to a past and the corresponding outcome may serve as the label for the sample. A training sample may be represented as a feature vector that include multiple dimensions. Each dimension may include data of a feature, which may be a quantized value of an attribute that describes the past record. In various embodiments, certain pre-processing techniques may be used to normalize the values in different dimensions of the feature vector.

In some embodiments, an unsupervised learning technique may be used. The training samples used for an unsupervised model may also be represented by features vectors, but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in identifying a specific target (e.g., a segment, a document structure, a named entity, a relationship), the objective function may correspond to the predicting error in identifying that target. In various embodiments, the error rate may be measured as cross-entropy loss, L1 loss (e.g., the sum of absolute differences between the predicted values and the actual value), L2 loss (e.g., the sum of squared distances).

Figure 10:
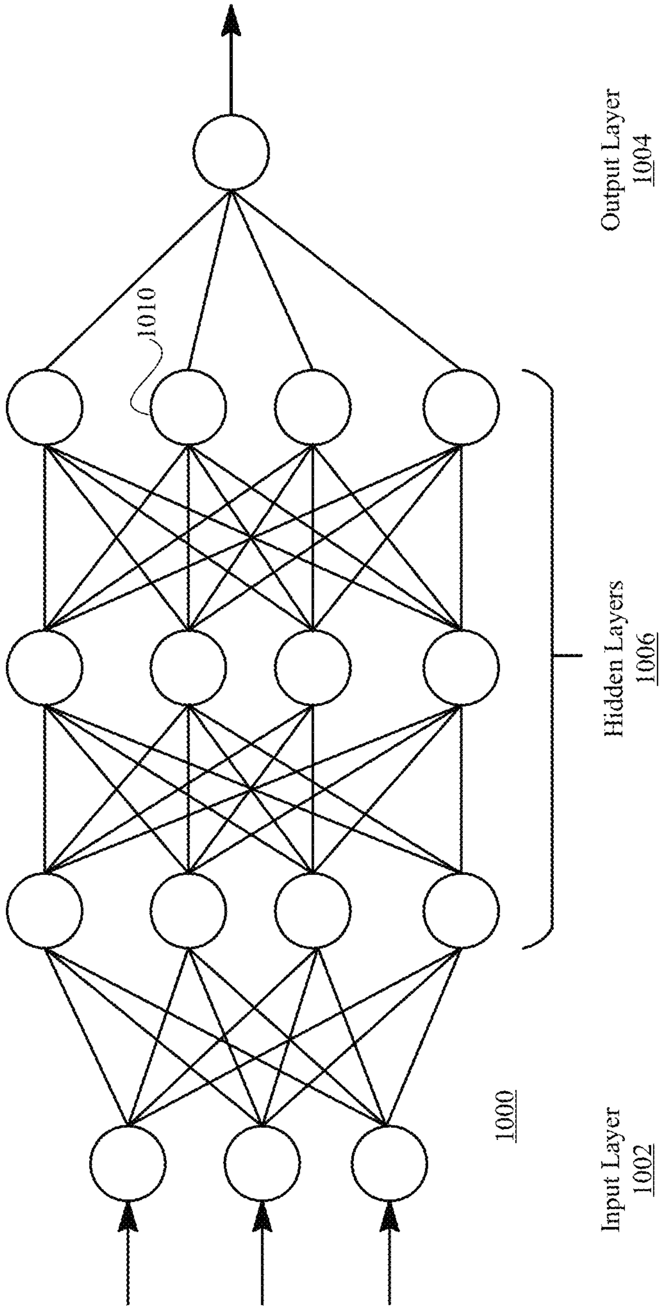
FIG. 10 is a block diagram illustrating an example structure of a machine learning model, in accordance with some embodiments.

Referring to FIG. 10, a structure of an example neural network is illustrated, in accordance with some embodiments. The neural network 1000 may receive an input and generate an output. The input may be the feature vector of a training sample in the training process and the feature vector of an actual case when the neural network is making an inference. The output may be the prediction, classification, or another determination performed by the neural network. The neural network 1000 may include different kinds of layers, such as convolutional layers, pooling layers, recurrent layers, fully connected layers, and custom layers. A convolutional layer convolves the input of the layer (e.g., an image) with one or more kernels to generate different types of images that are filtered by the kernels to generate feature maps. Each convolution result may be associated with an activation function. A convolutional layer may be followed by a pooling layer that selects the maximum value (max pooling) or average value (average pooling) from the portion of the input covered by the kernel size. The pooling layer reduces the spatial size of the extracted features. In some embodiments, a pair of convolutional layer and pooling layer may be followed by a recurrent layer that includes one or more feedback loops. The feedback may be used to account for spatial relationships of the features in an image or temporal relationships of the objects in the image. The layers may be followed by multiple fully connected layers that have nodes connected to each other. The fully connected layers may be used for classification and object detection. In one embodiment, one or more custom layers may also be presented for the generation of a specific format of the output. For example, a custom layer may be used for image segmentation for labeling pixels of an image input with different segment labels.

The order of layers and the number of layers of the neural network 1000 may vary in different embodiments. In various embodiments, a neural network 1000 includes one or more layers 1002, 1004, and 1006, but may or may not include any pooling layer or recurrent layer. If a pooling layer is present, not all convolutional layers are always followed by a pooling layer. A recurrent layer may also be positioned differently at other locations of the CNN. For each convolutional layer, the sizes of kernels (e.g., 3×3, 5×5, 7×7, etc.) and the numbers of kernels allowed to be learned may be different from other convolutional layers.

A machine learning model may include certain layers, nodes 1010, kernels and/or coefficients. Training of a neural network, such as the NN 1000, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Training of a machine learning model may include an iterative process that includes iterations of making determinations, monitoring the performance of the machine learning model using the objective function, and backpropagation to adjust the weights (e.g., weights, kernel values, coefficients) in various nodes 1010. For example, a computing device may receive a training set that includes historical genealogical records that have been manually processed. Each training sample in the training set may be assigned with labels indicating the segments, the document structures, the named entities identified, and/or the relationship among the named entities. The computing device, in a forward propagation, may use the machine learning model to generate predicted outcome. The computing device may compare the predicted outcome with the labels of the training sample. The computing device may adjust, in a backpropagation, the weights of the machine learning model based on the comparison. The computing device backpropagates one or more error terms obtained from one or more loss functions to update a set of parameters of the machine learning model. The backpropagating may be performed through the machine learning model and one or more of the error terms based on a difference between a label in the training sample and the generated predicted value by the machine learning model.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tan h), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing one or more tasks described in various models in FIG. 3A through FIG. 3D.

Computing Machine Architecture

Figure 11:
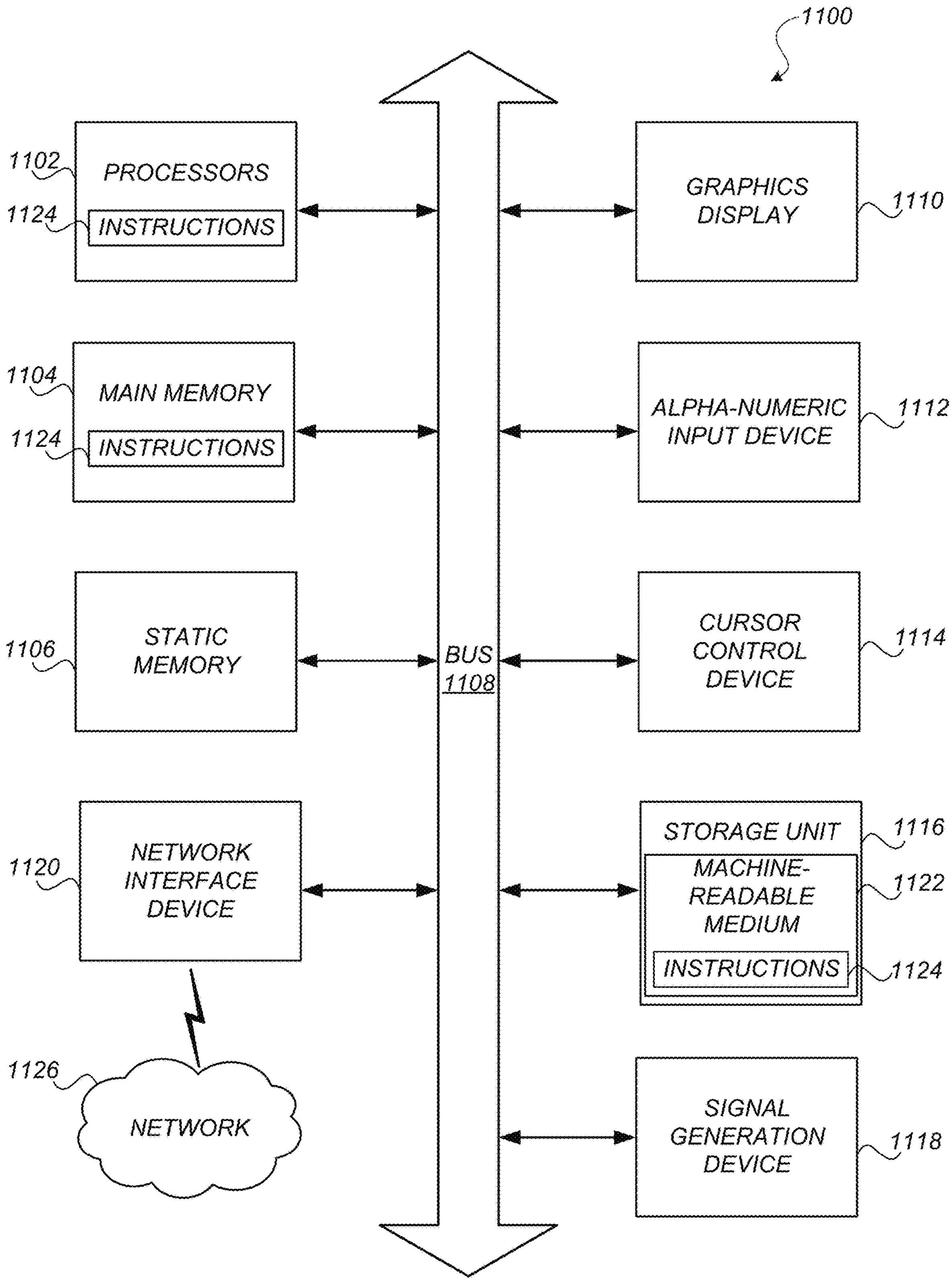
FIG. 11 is a block diagram of an example computing device, in accordance with some embodiments.

FIG. 11 is a block diagram illustrating components of an example computing machine that is capable of reading instructions from a computer-readable medium and execute them in a processor (or controller). A computer described herein may include a single computing machine shown in FIG. 11, a virtual machine, a distributed computing system that includes multiple nodes of computing machines shown in FIG. 11, or any other suitable arrangement of computing devices.

By way of example, FIG. 11 shows a diagrammatic representation of a computing machine in the example form of a computer system 1100 within which instructions 1124 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 11 may correspond to any software, hardware, or combined components shown in FIGS. 1 and 2, including but not limited to, the client device 110, the computing server 130, various engines, interfaces, terminals, and machines shown in FIG. 2, and various engines and models described in FIG. 3A through FIG. 3D. While FIG. 11 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1124 that specify actions to be taken by that machine. Further, while only a single machine is illustrated, the term "machine" and "computer" may also be taken to include any collection of machines that individually or jointly execute instructions 1124 to perform any one or more of the methodologies discussed herein.

The example computer system 1100 includes one or more processors 1102 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1100 may also include a memory 1104 that store computer code including instructions 1124 that may cause the processors 1102 to perform certain actions when the instructions are executed, directly or indirectly by the processors 1102. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1102 and reduces the space required for the memory 1104. For example, the database processing techniques and machine learning methods described herein reduce the complexity of the computation of the processors 1102 by applying one or more novel techniques that simplify the steps in training, reaching convergence, and generating results of the processors 1102. The algorithms described herein also reduces the size of the models and datasets to reduce the storage space requirement for memory 1104.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 1100 may include a main memory 1104, and a static memory 1106, which are configured to communicate with each other via a bus 1108. The computer system 1100 may further include a graphics display unit 1110 (e.g., a plasma display panel (PDP), a liquid crystal display (LCD), a projector, or a cathode ray tube (CRT)). The graphics display unit 1110, controlled by the processors 1102, displays a graphical user interface (GUI) to display one or more results and data generated by the processes described herein. The computer system 1100 may also include alphanumeric input device 1112 (e.g., a keyboard), a cursor control device 1114 (e.g., a mouse, a trackball, a joystick, a motion sensor, or other pointing instruments), a storage unit 1116 (a hard drive, a solid-state drive, a hybrid drive, a memory disk, etc.), a signal generation device 1118 (e.g., a speaker), and a network interface device 1120, which also are configured to communicate via the bus 1108.

The storage unit 1116 includes a computer-readable medium 1122 on which is stored instructions 1124 embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting computer-readable media. The instructions 1124 may be transmitted or received over a network 1126 via the network interface device 1120.

While computer-readable medium 1122 is shown in an example embodiment to be a single medium, the term "computer-readable medium" should be taken to include a single medium or multiple media (e.g., a centralized or distributed database, or associated caches and servers) able to store instructions (e.g., instructions 1124). The computer-readable medium may include any medium that is capable of storing instructions (e.g., instructions 1124) for execution by the processors (e.g., processors 1102) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:

detecting, from a digital image, a set of page elements belonging to one or more document structure types of the digital image by utilizing respective document structure detection models corresponding to the one or more document structure types, wherein the respective document structure detection models comprise a form detection model, a table detection model, a list detection model, a genealogical tree detection model, and a free-text detection model;

segmenting the digital image to generate bounding boxes separating the set of page elements depicted in the digital image;

extracting a plurality of entities from the set of page elements by implementing an entity extraction model on the bounding boxes;

determining relationships among the plurality of entities; and generating genealogy tree data from the plurality of entities and the relationships among the plurality of entities.

2. The computer-implemented method of claim 1, further comprising utilizing an entity resolution model to perform entity resolution to generate consolidated person entities from the plurality of entities.

3. The computer-implemented method of claim 1, wherein:

the digital image comprises a historical record defining genealogical information; and detecting the set of page elements comprises utilizing a convolutional neural network to generating the bounding boxes within the historical record.

4. The computer-implemented method of claim 1, wherein detecting the set of page elements comprises discretizing footnotes as a distinct element class utilizing a segmentation model.

5. The computer-implemented method of claim 4, wherein extracting the plurality of entities from the set of page elements comprises comparing text within the set of page elements with entity names stored in a genealogical database.

6. The computer-implemented method of claim 1, further comprising one or more of:

modifying an existing genealogy tree by updating nodes and edges within the existing genealogy tree to reflect the relationships indicated by the genealogy tree data; or generating a new genealogy tree by generating nodes and edges reflecting the plurality of entities and the relationships indicated by the genealogy tree data.

7. The computer-implemented method of claim 6, further comprising modifying a cluster database storing data clusters corresponding to entities of the existing genealogy tree to include cluster data from the plurality of entities.

8. A system comprising:

at least one processor; and one or more memory devices coupled to the at least one processor, the one or more memory devices storing instructions that, when executed by the at least one processor, cause the at least one processor to:

detect, from a digital image, a set of page elements belonging go one or more document structure types of the digital image by utilizing respective document structure detection models corresponding to the one or more document structure types, wherein the respective document structure detection models comprise a form detection model, a table detection model, a list detection model, a genealogical tree detection model, and a free-text detection model;

segmenting the digital image to generate bounding boxes separating the set of page elements depicted in the digital image;

extract a plurality of entities from the set of page elements by implementing an entity extraction model on the bounding boxes;

determine relationships among the plurality of entities; and generate genealogy tree data from the plurality of entities and the relationships among the plurality of entities.

9. The system of claim 8, wherein the one or more memory devices store further instructions that, when executed by the at least one processor, cause the at least one processor to determine the relationships among the plurality of entities by utilizing a dependency model to determine dependencies among the plurality of entities.

10. The system of claim 8, wherein:

the digital image comprises a historical record defining genealogical information; and the instructions cause the at least one processor to detect the set of page elements by utilizing a convolutional neural network to generate the bounding boxes within the historical record.

11. The system of claim 8, wherein the one or more memory devices store further instructions that, when executed by the at least one processor, cause the at least one processor to detect the set of page elements by discretizing footnotes as a distinct element class utilizing a segmentation model.

12. The system of claim 11, wherein the one or more memory devices store further instructions that, when executed by the at least one processor, cause the at least one processor to extract the plurality of entities from the set of page elements by comparing text within the set of page elements with entity names stored in a genealogical database.

13. The system of claim 8, wherein the one or more memory devices store further instructions that, when executed by the at least one processor, cause the at least one processor to:

modifying an existing genealogy tree by updating nodes and edges within the existing genealogy tree to reflect the relationships indicated by the genealogy tree data; or generating a new genealogy tree by generating nodes and edges reflecting the plurality of entities and the relationships indicated by the genealogy tree data.

14. The system of claim 13, wherein the one or more memory devices store further instructions that, when executed by the at least one processor, cause the at least one processor to modify a cluster database storing data clusters corresponding to entities of the existing genealogy tree to include cluster data from the plurality of entities.

15. A non-transitory computer readable medium storing instructions that, when executed by at least one processor, cause the at least one processor to perform operations comprising:

detecting, from a digital image, a set of page elements belonging to one or more document structure types of the digital image by utilizing respective document structure detection models corresponding to the one or more document structure types, wherein the respective document structure detection models comprise a form detection model, a table detection model, a list detection model, a genealogical tree detection model, and a free-text detection model;

segmenting the digital image to generate bounding boxes separating the set of page elements depicted in the digital image;

extracting a plurality of entities from the set of page elements by implementing an entity extraction model on the bounding boxes;

determining relationships among the plurality of entities; and generating genealogy tree data from the plurality of entities and the relationships among the plurality of entities.

16. The non-transitory computer readable medium of claim 15, wherein determining the relationships among the plurality of entities comprises utilizing a dependency model to determine dependencies among the plurality of entities.

17. The non-transitory computer readable medium of claim 15, wherein:

the digital image comprises a historical record defining genealogical information; and the instructions cause the at least one processor to detect the set of page elements by utilizing a convolutional neural network to generate the bounding boxes within the historical record.

18. The non-transitory computer readable medium of claim 15, wherein detecting the set of page elements comprises discretizing footnotes as a distinct element class utilizing a segmentation model.

19. The non-transitory computer readable medium of claim 18, wherein extracting the plurality of entities from the set of page elements comprises comparing text within the set of page elements with entity names stored in a genealogical database.

20. The non-transitory computer readable medium of claim 15, wherein the operations further comprise one or more of:

modifying an existing genealogy tree by updating nodes and edges within the existing genealogy tree to reflect the relationships indicated by the genealogy tree data; or generating a new genealogy tree by generating nodes and edges reflecting the plurality of entities and the relationships indicated by the genealogy tree data.

* * * * *